(12) United States Patent
Chino et al.

(10) Patent No.: US 7,643,048 B2
(45) Date of Patent: Jan. 5, 2010

(54) IMAGE TRANSFER APPARATUS

(75) Inventors: Naoyoshi Chino, Kanagawa (JP);
Yasunori Tanaka, Kanagawa (JP);
Yasuhito Hiraki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1257 days.

(21) Appl. No.: 10/288,563

(22) Filed: Nov. 6, 2002

(65) Prior Publication Data

US 2003/0128399 A1 Jul. 10, 2003

(30) Foreign Application Priority Data

| Nov. 6, 2001 | (JP) | ............................. 2001-340757 |
| Nov. 22, 2001 | (JP) | ............................. 2001-357637 |
| Nov. 28, 2001 | (JP) | ............................. 2001-362693 |
| Dec. 12, 2001 | (JP) | ............................. 2001-378870 |
| Dec. 20, 2001 | (JP) | ............................. 2001-388009 |

(51) Int. Cl.
*B41J 15/14* (2006.01)
*B41J 2/47* (2006.01)
*B41J 2/435* (2006.01)

(52) U.S. Cl. ..................... 347/239; 347/241; 347/224

(58) Field of Classification Search ................ 347/239, 347/224; 237/241
See application file for complete search history.

(56) References Cited

U.S. PATENT DOCUMENTS

| 4,790,632 A | * | 12/1988 | Miyakawa et al. ............ 349/95 |
| 4,828,366 A | * | 5/1989 | Nelson ........................ 349/22 |
| 5,510,898 A | | 4/1996 | Yoshimura et al. |
| 5,673,059 A | * | 9/1997 | Zavracky et al. ............... 345/8 |
| 5,970,215 A | | 10/1999 | Stephenson |
| 6,072,551 A | * | 6/2000 | Jannson et al. ............... 349/64 |
| 6,141,065 A | | 10/2000 | Furuki et al. |
| 6,161,932 A | * | 12/2000 | Goto et al. ................... 351/208 |
| 6,163,351 A | * | 12/2000 | Nakayama .................... 349/61 |
| 6,204,902 B1 | * | 3/2001 | Kim et al. .................... 349/112 |
| 7,053,921 B2 | * | 5/2006 | Chino ......................... 347/241 |
| 2001/0019390 A1 | * | 9/2001 | Itoh et al. .................... 349/130 |
| 2001/0026263 A1 | * | 10/2001 | Kanamori et al. ........... 345/156 |
| 2001/0028223 A1 | * | 10/2001 | Kimura ...................... 315/160 |

FOREIGN PATENT DOCUMENTS

JP 01-186974 7/1989

(Continued)

OTHER PUBLICATIONS

Japanese Office Action for Application No. 2001-340757.

(Continued)

*Primary Examiner*—Stephen D Meier
*Assistant Examiner*—Sarah Al-Hashimi
(74) *Attorney, Agent, or Firm*—Sughrue Mion, PLLC

(57) ABSTRACT

The image transfer apparatus includes a transmission type image display device, a light source and a parallel rays generating element, and light that is irradiated from the light source, made into substantially parallel rays by the parallel rays generating element, and transmitted through the image display device to expose a photosensitive recording medium and a display image displayed on the image display screen is transferred to the photosensitive recording medium. This apparatus further includes a moving device for moving the parallel rays generating element and the image display device relatively during the transfer.

9 Claims, 18 Drawing Sheets

FOREIGN PATENT DOCUMENTS

| | | |
|---|---|---|
| JP | 04-133046 | 5/1992 |
| JP | 4-149421 A | 5/1992 |
| JP | 04-191833 | 7/1992 |
| JP | 04-101543 | 9/1992 |
| JP | 04-101562 | 9/1992 |
| JP | 08-022086 | 1/1996 |
| JP | 08-029884 | 2/1996 |
| JP | 8-271995 | 10/1996 |
| JP | 10-104752 | 4/1998 |
| JP | 10-309829 | 11/1998 |
| JP | 11-133402 | 5/1999 |
| JP | 11-231427 A | 8/1999 |
| JP | 11-242298 | 9/1999 |
| JP | 11-249239 | 9/1999 |
| JP | 2000-502555 | 2/2000 |
| JP | 2000-310815 | 11/2000 |
| JP | 2000-335011 A | 12/2000 |
| JP | 2001-92016 A | 4/2001 |
| WO | WO 98/18253 | 4/1998 |

OTHER PUBLICATIONS

Japanese Office Action for Application No. 2001-388009.
Japanese Office Action for Application No. 2002-339806.

* cited by examiner

1 BACK LIGHT UNIT

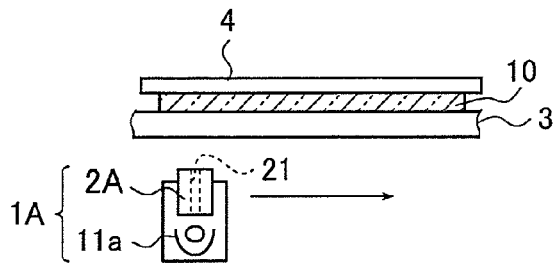
FIG. 24A
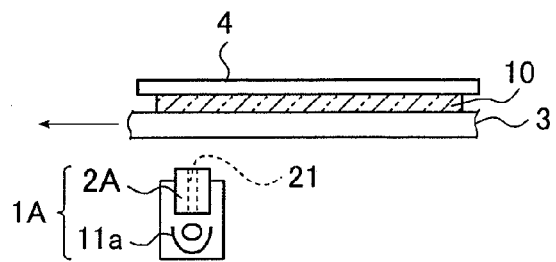
FIG. 24B
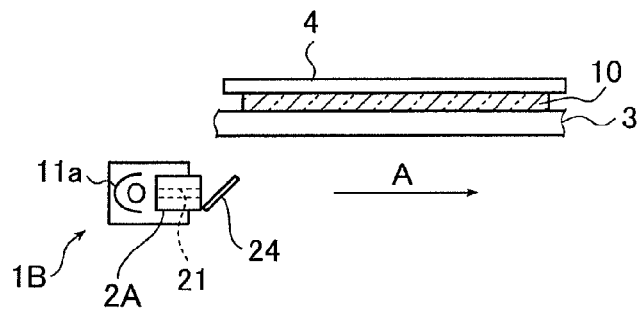
FIG. 25
FIG. 26
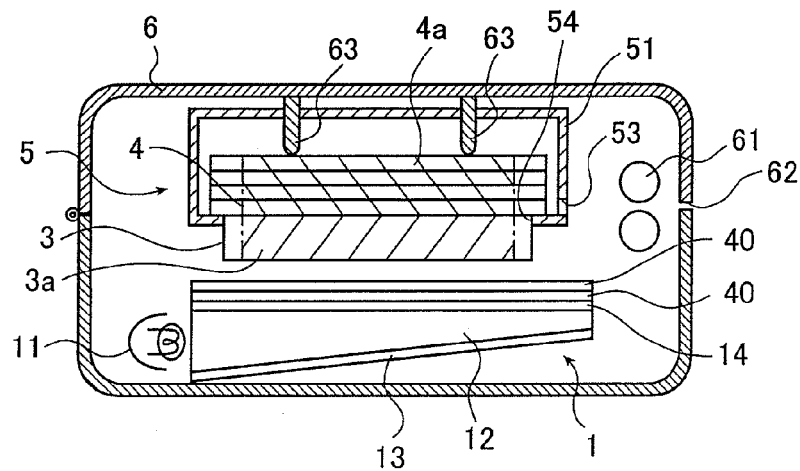

IMAGE TRANSFER APPARATUS

BACKGROUND OF THE INVENTION

The present invention relates to an image transfer apparatus that displays an image on a transmission type image display means (device) for displaying the image based on supplied image data, for example, an image which is digitally recorded by a digital still camera (DSC), a video camera, a PC (personal computer) or the like on a transmission type liquid crystal display (LCD) constituted by a liquid crystal display device and with using the display image and transfers the image to (forms an image on) a photosensitive recording medium such as an instant photographic film on which a latent image is formed by exposure and color is developed by development.

Various examples of conventionally known method for transferring, or recording a digitally-recorded image to or on a recording medium include an ink jet system using a dot-type printing head, a laser recording system, and a thermal recording system.

A printing system like the ink jet system has various problems. For example, printing takes time, ink is likely to cause clogging, and precision printing results in the printed sheet being moistened by ink. The laser recording system involves an expensive optical component such as a lens, resulting in high apparatus cost. Further, the laser recording system and the thermal recording system require considerable power consumption and are not suited to be carried about.

Thus, generally speaking, the transfer apparatuses using these systems, in particular, the ones using the ink jet system have a problem that the more precise the apparatus is, the more complicated the driving mechanism and the control mechanism become, as well as the larger and the more expensive the apparatus become, and printing takes a lot of time.

In this regard, JP 10-309829 A, JP 11-242298 A, JP 2000-502555 A, and the like disclose transfer apparatuses of the type in which a display image is formed on a photosensitive recording medium like an instant film by using a liquid crystal device, thereby achieving simplification in structure and cost reduction.

The electronic printer disclosed in JP 10-309829 A is capable of copying the display screen of a liquid crystal display on a photosensitive medium to produce a hard copy of a quality equal to that of a photograph. However, in order to copy the display screen of the liquid crystal display on the photosensitive medium in this electronic printer, an optical component such as a rod lens array is used to be arranged between the display screen of the liquid crystal display and the photosensitive medium, and there is a problem that the optical component is rather expensive. Further, a predetermined distance (total conjugate length) is required between the liquid crystal display and the photosensitive medium. In the example shown, there is a problem that the requisite distance takes 15.1 mm.

In the case of the transfer apparatus disclosed in JP 11-242298 A, there is no need to use an expensive optical component such as a lens or to secure an appropriate focal length. Thus, as compared with the conventional transfer apparatuses, a further reduction can be achieved in terms of size, weight, power consumption, and cost.

In this transfer apparatus, as shown in FIG. 42, a photosensitive film 400 is closely attached to the display surface of a transmission type liquid crystal display (hereinafter referred to as LCD) 300, and a light source (back light 100) provided on the opposite side of the LCD 300 with respect to the photosensitive film 400 is turned on. That is, a fluorescent lamp 101 is switched on to turn on the back light, whereby the image displayed on the LCD 300 is transferred to the photosensitive film 400.

Here, as shown in FIG. 42, the LCD 300 is constituted by a polarizing plate 301 on the display surface side, a glass substrate 302, a liquid crystal layer 303, a glass substrate 304, and a polarizing plate 305 on the back light 100 side.

In addition, as shown in FIG. 43, the publication discloses, as another embodiment, a transfer apparatus in which a lattice 200 for suppressing diffusion of light from the back light 100 to approximate the light to parallel rays is provided between the back light 100 and the LCD 300, and a spacer 201 constituted of a rectangular hollow pipe is provided between the lattice 200 and the LCD 300.

With such a structure, an image of a frame of the lattice 200 (a shadow due to the frame) is prevented from being taken by the photosensitive film 400, thus improving clarity of an image formed on the photosensitive film 400 to a satisfactory degree from the practical point of view without providing an optical component or securing an appropriate focal length.

Incidentally, in the transfer apparatus shown in FIG. 42, thickness of the LCD 300 (total thickness of the LCD 300), that is, total thickness of the polarizing plate 301 on the display surface side, the glass substrate 302, the liquid crystal layer 303, the glass substrate 304, and the polarizing plate 305 on the back light 100 side is 2.8 mm, and a screen of the LCD 300 displayed with a dot size of 0.5 mm is transferred to the photosensitive film 400. In this case, it is proposed that the distance between the LCD 300 and the back light 100 be enlarged to a degree in which blurring of an image to be transferred is not visually recognized.

Further, in the transfer apparatus shown in FIG. 43, there is provided a 5 mm lattice 200 with a thickness of 10 mm to prevent diffusion of the light from the LCD 300, and a 20 mm spacer 201 is arranged between the lattice 200 and the LCD 300. Further, the LCD 300 and the photosensitive film 400 are closely attached together to effect image transfer without involving blurring (unclarity) of the image.

In this case, an image displayed with a dot size of 0.5 mm originally set is transferred to a surface of the photosensitive film 400 with an enlarged dot size of up to 0.67 mm, which means an enlargement by approximately 0.09 mm on one side, and yet the image obtained is satisfactory from the practical point of view.

In addition, JP 2000-502555 A discloses an electronic still camera having a printing capability. This electronic still camera is capable of displaying (photographing) an image on an LCD panel, adjusting an image characteristic of the displayed (photographed) image, if necessary, and then projecting the image on an instant film via a projection optical system, thereby printing the image.

Incidentally, in the transfer apparatus disclosed in each of the above-mentioned publications, an image displayed on an LCD panel can be transferred to a photosensitive film. In order to make such a transfer apparatus practical, it is necessary not only to eliminate blurring of an image to be transferred and further increase clarity but also to make a structure of the apparatus compact, simple and low-cost.

For example, a transfer apparatus disclosed in JP 11-242298 A (see FIG. 43) can improve clarity of an image formed on the photosensitive film 400 to a satisfactory degree from the practical point of view. However, there still remains a shadow due to the framework of the lattice 200 on a transferred image.

In addition, in recent years, screens of LCDs have progressed in terms of definition and LCDs with an increased number of pixels, that is, a smaller dot size, are being commercialized. For example, as LCDs using low-temperature polysilicon type TFTs, UXGA (10.4 inches; 1200×1600 pixels), XGA (6.3 and 4 inches; 1024×768 pixels) are on the market.

Thus, if the LCD with such a high-definition screen is applied to the above-mentioned transfer apparatus, the shadow due to the framework of the lattice 200 is more conspicuous. It is possible to enlarge a distance between the LCD and a photosensitive film to a degree of making this shadow unclear. However, in this case, an image to be transferred may become unclear as well.

In addition, a spacer 201 is used so as to make the shadow due to the framework of the lattice 200 less conspicuous as much as possible. However, since the thickness of the spacer 201 is approximately 20 mm according to the publication, there is a limitation in realizing a thin, small and light image transfer apparatus.

In addition, an attempt to apply the LCD with such a high-definition screen to the transfer apparatus disclosed in JP 11-242298 A would lead to the following problem. In the case of UXGA, the dot size of each of the RGB pixels is approximately 0.04 mm on the shorter side. As described above, in a state in which enlargement in dot size occurs as in the transfer apparatus disclosed in the publication, it tends to be impossible to transfer an LCD image of such a minute dot size to a photosensitive film with satisfactory clarity in a condition in which the dots of the RGB pixels are clearly distinguishable from each others.

In addition, in the transfer apparatus disclosed in the publication, the back light 100 and the LCD 300 are required to be spaced apart from each other in order to maintain clarity without causing blurring of an image to be transferred to the photosensitive film 400. Thus, the above-mentioned LCD with a high-definition screen must have an increased distance from the back light 100. For example, in the transfer apparatus as shown in FIG. 43, thicknesses of the lattice 200 and the spacer 201 provided between the back light 100 and the LCD 300 are required to be increased. Therefore, it is impossible to realize a compact structure with the thickness of the transfer apparatus reduced.

Further, in the transfer apparatus disclosed in JP 11-242298 A, image transfer is effected, with the liquid crystal display (LCD) 300 and the photosensitive film 400 being closely attached together, to prevent blurring (unclarity) of the image and to obtain an image satisfactory from the practical point of view. It is to be noted, however, that exposure of a display image on the LCD 300 to the photosensitive film 400 being closely attached together involves the following problems.

First, as shown in FIG. 42, on the outermost surface of the LCD 300, there is arranged a film-like polarizing plate 301, which is closely attached to the photosensitive film 400 during exposure. When the photosensitive film 400 is moved to perform a post-processing, the photosensitive film 400 and the polarizing plate 301 are rubbed against each other to thereby flaw the film-like polarizing plate 301, and the flaw on the polarizing plate 301 is transferred to the photosensitive film 400. Further, this flaw causes scattering of light, resulting in deterioration in the image quality.

To cope with this, it might be possible for the polarizing plate 301 and the photosensitive film 400 to be closely attached together during exposure and slightly spaced apart from each other when the photosensitive film 400 is moved. For this purpose, however, it would be necessary to newly provide, apart from the photosensitive film 400 moving mechanism, a mechanism for effecting close attachment and detachment of the photosensitive film 400, which is contradictory to the requirement for reduction in cost and size and the like.

Further, generally speaking, a photosensitive film, for example, an instant film, which is most conveniently used, is kept in a lightproof case until it is loaded in a transfer apparatus. Since this lightproof case is equipped with an opening frame somewhat larger than the film, the following procedures must be followed before the photosensitive film can be brought into close contact with the polarizing plate.

That is, first, prior to exposure, one sheet of photosensitive film is taken out singly from the lightproof case, and brought into close contact with the surface of the polarizing plate on the surface of the LCD. In this condition, exposure is performed, and, after the completion of the exposure, the photosensitive film is separated from the polarizing plate surface, and moved for a processing (in the case of an instant film, a processing liquid tube provided in the photosensitive film is pushed open).

These procedures must be repeated for each sheet of photosensitive film. In particular, separating the photosensitive film from the polarizing plate surface does not square with automation (or mechanization).

Moreover, there is also a problem of scattering of light on the surface of the LCD. That is, usually, the transmission type LCD has a structure for holding a liquid crystal layer with a glass substrate and a polarizing material from both sides thereof. Then, processing such as matting (roughening) is applied to the surface of the LCD, that is, the surface of the polarizing material in order to prevent reflection of external light so as to facilitate observation by an observer.

Here, methods that are usually used as the above-mentioned matting processing include a method of forming unevenness on the surface of the polarizing material (polarizing film) using a mechanical or chemical method, or a method of forming unevenness on the surface of the polarizing material by adding transparent particulates of polyester resin, polyurethane resin and the like to the outermost layer thereof. However, since the transparent particulates and the polarizing material have different optical characteristics, that is, different refractive indexes from each other, and the surface of the polarizing material becomes uneven, light emitted from the polarizing material has a high degree of scattering.

Such an LCD is preferable when it is directly observed. However, as described above, if an image displayed on the LCD is transferred to a photosensitive recording material, there is a problem that clarity of the transfer image is low.

The same problem is found in the electronic still camera having the printing capability disclosed in JP 2000-502555 A. That is, this camera is constituted so as to project an image displayed on an LCD panel onto an instant film and expose the instant film to light via a projection optical system. However, since the display image to be projected is an image displayed on the LCD panel having an ordinary polarizing film subjected to the above-mentioned matting processing, the exposure is performed by light with strong scattering. Thus, it cannot be denied that clarity of the image decreases.

SUMMARY OF THE INVENTION

It is the first object of the present invention to provide, in an attempt to solve the above-mentioned problems, an image transfer apparatus that allows further reduction in size and weight compared with that in the past and, in particular, an image transfer apparatus that, even if a transmission type image display device such as a liquid crystal display with a high-definition screen of a high pixel density is used, can obtain a high-definition image with high clarity without a shadow due to a framework of the above-mentioned lattice or the like falling inside a transfer image, and further can realize reduction in size.

In addition, it is the second object of the present invention to eliminate the above-mentioned problems of the related art and provide an image transfer apparatus that can transfer, with a simple structure, an image with high clarity compared with that in the past.

In addition, it is the third object of the present invention to solve the above-mentioned problems of the related art and provide an image transfer apparatus that can realize, with a simple structure or a thinned compact structure, actual reduction in size, weight, power consumption, and cost, and can also be used as a portable apparatus.

In addition, it is the fourth object of the present invention to provide, in addition to the third object, an image transfer apparatus that allows use of transmission type image display devices ranging from an image display device such as a liquid crystal display of an ordinary pixel density to an image display device such as a liquid crystal display with a high-definition screen of a high pixel density, and can obtain photograph images of desired clarity ranging from a photograph image with satisfactory clarity from the practical point of view to a high-definition photograph image with high clarity.

In addition, it is the fifth object of the present invention to provide, in addition to the third object, a low-cost image transfer apparatus in which scattered light component is removed even when a large-screen transmission type image display device is used, making exclusively components closer to parallel rays to linear and substantially parallel rays uniform in a predetermined direction before causing the components to perpendicularly enter the image display device, whereby it is possible to transfer (form) a high-definition image with high clarity to a photosensitive recording medium with light transmitted through the image display device and adapted to form the display image on a display screen, making it possible to obtain a high-definition-transfer image with high clarity.

In addition, it is the sixth object of the present invention to provide, in addition to the third and fifth objects, a low-cost image transfer apparatus in which there is no need to use an expensive planar light source (back light) which needs a large number of components such as a light guide plate (member), a reflection sheet, for emitting uniform light from the entire plane, a lens sheet, a prism sheet, and a diffusion sheet, making it possible to reduce the cost of the light source itself.

In order to attain the above-mentioned first object, the first aspect of the present invention provides an image transfer apparatus that includes: a transmission type image display device for forming a display image on an image display screen thereof by transmitted light that has transmitted through the image display screen; a light source that is provided on an opposite side of the image display screen of the image display device and irradiates light substantially perpendicularly on the image display screen in order to obtain the transmitted light; and a parallel rays generating element that is provided between the light source and the image display device and makes the light irradiated from the light source into substantially parallel rays, and also includes a moving device for moving the parallel rays generating element and the image display device relatively while the display image displayed on the image display screen is being transferred onto a photosensitive recording medium by exposing the photosensitive recording medium using the transmitted light that has transmitted through the image display device.

Here, the transmission type image display device is preferably a liquid crystal display that has a structure, in which a liquid crystal layer is held by glass substrates from both sides thereof, and is comprised of an image display plate for displaying an image based on supplied image data.

In addition, the parallel rays generating element is preferably a device provided with a plurality of through-holes for emitting light in a substantially perpendicular direction with respect to the image display screen of the image display device. Preferably, in the parallel rays generating element, the through-holes are arranged in a two-dimensional shape at a predetermined pitch interval within a surface parallel to the image display screen.

Moreover, the parallel rays generating element is preferably a porous plate in which a plurality of through-holes are formed in a substantially perpendicular direction with respect to the image display screen of the image display device.

In addition, preferably, the moving device moves the parallel rays generating element relatively to the image display device along an arrangement direction of the plurality of through-holes during exposure, and a moving distance in the arrangement direction of the parallel rays generating element is shorter than a pitch interval in the arrangement direction.

In addition, preferably, the moving device moves the parallel rays generating element relatively to the image display device along the arrangement direction of the plurality of through-holes during exposure of the photosensitive recording medium.

Further, preferably, the relative movement of the parallel rays generating element and the image display device by the moving device and exposure of the photosensitive recording medium by the transmitted light in a stationary state of the parallel rays generating element and the image display device are repeatedly performed to transfer the display image of the image display device to the photosensitive recording medium.

In this case, preferably, the parallel rays generating element is a device provided with a plurality of through-holes for emitting light in a substantially perpendicular direction with respect to the image display screen of the image display device, and positions to which the plurality of through-holes are moved according to the relative movement of the parallel rays generating element and the image display device by the moving device are positions among the plurality of through-holes before the movement.

Further, in order to attain the above-mentioned second object, the second aspect of the present invention provides an image transfer apparatus that includes a light source and a transmission type image display device, wherein light from the light source is transmitted through the image display device to project and display an image, a photosensitive recording medium is exposed using transmitted light that has transmitted through the image display device, and thereby the image displayed on the image display device is transferred to the photosensitive recording medium, and in which at least a (first) outermost layer arranged on an exit side of the transmitted light of the image display device is formed of a homogeneous material and a surface of the (first) outermost layer is a smooth surface.

Here, the transmission type image display device is preferably a liquid crystal display that has a structure, in which a liquid crystal layer is held by glass substrates from both sides thereof, and is comprised of an image display plate for displaying an image based on supplied image data.

Here, preferably, the second outermost layer arranged on the opposite side of the exit side of the image display device is formed of a homogeneous material, and the surface of the second outermost layer is a smooth surface.

In this case, the first and second outermost layers are outermost layers of polarizing films with a multi-layered structure constructing the image display device (e.g., liquid crystal display).

Moreover, in the polarizing film, preferably, both layers of polarizing film holding a polarizing layer having a polarizing function from both sides thereof are formed of a homogeneous material.

Further, the smooth surface preferably has an arithmetic average roughness ($R_a$, JIS B0601-1994) of not more than 0.6 μm from a practical point of view, and more preferably has an arithmetic average roughness of not more than 0.2 μm.

In addition, the smooth surface preferably has a maximum height ($R_y$, JIS B 0601-1994) of 10 μm or less from a practical point of view, and more preferably has a maximum height of 4 μm or less.

In addition, the outermost layer of the image display device is comprised of a homogeneous material, which means that transparent particulates such as polyester resin or polyurethane resin are not added to the outermost layer at all as in the conventional image forming device. Consequently, in this aspect of the present invention, an optical characteristic of refractive index becomes uniform, which means that the optical characteristic is fixed not only in the thickness direction of the image display device but also in the two-dimensional direction on the surface of the image display device.

Further, in the image transfer apparatus of the second aspect of the present invention, the projection optical system may be used or may not be used. If the projection optical system is not used, it is preferable to space apart the image display device and the photosensitive recording medium. Since the image display device and the photosensitive recording medium are spaced apart from each other, even if the polarizing film of the image display device (liquid crystal display) is not matted (roughened) as described above, adhesion of the image display device and the photosensitive recording medium does not occur.

In addition, in the above-mentioned image transfer apparatus that does not use the projection optical system, it is preferable to arrange a substantially parallel rays generating element between the light source and the image display device. This substantially parallel rays generating element is preferably constituted by a porous plate having a plurality of through-holes. The thickness of the porous plate is not less than three times, preferably five times, and more preferably seven times the diameter or equivalent diameter of the through-holes. Here, preferably, the through-holes are parallel through-holes and have a circular or polygonal cross section.

Further, in order to attain the above-mentioned third and fourth objects, the inventors of the present invention have devoted themselves to the study on an image transfer apparatus that is capable of obtaining a photograph image of desired clarity and using a transmission type image display device such as a liquid crystal display with a high-definition screen of a high pixel density, which has a higher practical value and has a structure for holding a liquid crystal layer by substrates from both sides thereof. As a result of the study, it has been found that, in order to make the transmission type image display device and the photosensitive recording medium required for realizing a high practical value with a simple structure in a non-contact state and prevent image blurring (unclearness) inevitably caused by separation of the transmission type image display device and the photosensitive recording medium, it is necessary to provide a transparent member having a refractive index higher than that of the air, that is, a refractive index higher than one. In this way, the inventors have reached the third aspect of the present invention.

That is, the third aspect of the present invention provides an image transfer apparatus that have a light source, a transmission type image display device of a structure for holding a liquid crystal layer by substrates from both sides thereof and a photosensitive recording medium arranged in series along a direction in which light from the light source advances with an image display screen of the image display device and a recording surface of the photosensitive recording medium opposed to each other, and a display image that has passed the transmission type image display device is transferred to the recording surface of the photosensitive recording medium, in which a transparent member having a refractive index larger than one, which covers at least the image display screen, is provided between the image display screen of the image display device and the recording surface of the photosensitive recording medium.

In such an image transfer apparatus of the third aspect of the present invention, it is preferable that a substantially parallel rays generating element is further provided between the light source and the transmission type image display device, which makes light from the light source into substantially parallel rays before causing them to enter perpendicularly the image display screen of the image display device. In addition, it is also preferable that a light linearizing device is provided, which makes light from the light source into linear and substantially parallel rays before causing them to enter perpendicularly the image display screen of the image display device and, at the same time, scans relatively the image display screen of the image display device with the linear and substantially parallel rays.

Moreover, the transparent member is, for example, a plate-like member having fixed thickness. The thickness of the transparent member may be thickness equivalent to a distance between the image display screen of the image display device and the recording surface of the photosensitive recording medium or may be slightly smaller than the thickness equivalent to the distance between the image display screen and the recording surface. In this case, "slightly" means a range from 0.01 mm to about a half of the thickness equivalent to the distance between the image display screen and the recording surface.

Note that it is unnecessary to space apart the image display device and the photosensitive recording medium more than necessary. If the image display device and the photosensitive recording medium are spaced apart from each other, the thickness of the transfer apparatus is increased so much more for that. In addition, if the image display device and the photosensitive recording medium are brought close to each other, blurring of an image is reduced, which makes the transparent member unnecessary. Consequently, the thickness of the transparent member is preferably 0.1 mm to 5 mm, and more preferably 0.5 mm to 3 mm.

Moreover, in this aspect of the present invention, at least total thickness of a substrate and a polarizing plate on the photosensitive recording medium side is preferably not more than 1.0 mm, more preferably not more than 0.8 mm, and yet more preferably not more than 0.6 mm.

In addition, the distance between the transmission type image display device and the photosensitive recording medium is preferably 0.01 mm to 3 mm or less, and more preferably 0.1 mm to 3 mm.

In addition, preferably, the size of the display image is substantially identical to a size of an image to be transferred to the photosensitive recording medium.

In addition, a size of each pixel of the image display device is preferably not more than 0.2 mm.

In addition, in each of the above-mentioned image transfer apparatuses, preferably, a substantially parallel rays generating element is further arranged between the light source and the image display device. This substantial parallel rays generating element is preferably constituted by a porous plate in which a plurality of through-holes are formed. The thickness of the porous plate is preferably not less than three times, more preferably not less than five times, and particularly preferably not less than seven times a diameter or equivalent diameter of the through-holes.

Note that, preferably, the through-holes are parallel through-holes, and a geometry of the through-holes is circular or polygonal.

In addition, in order to attain the third and the fourth objects, the fourth aspect of the present invention provides an image transfer apparatus that have a light source, a transmission type image display device of a structure for holding a liquid crystal layer by substrates from both sides thereof and a photosensitive recording medium arranged in series along a direction in which light from the light source advances with an image display screen of the image display device and a recording surface of the photosensitive recording medium opposed to each other, and a display image that has passed the transmission type image display device is transferred to the recording surface of the photosensitive recording medium, in which at least one prism sheet having on a surface a plurality of prism portions extending in one direction formed at a predetermined interval, is provided between the light source and the image display device.

In such an image transfer apparatus of this aspect of the present invention, it is preferable that a substantially parallel rays generating element is further provided between the light source and the image display device, which makes light from the light source into substantially parallel rays before causing them to enter perpendicularly the image display screen of the image display device.

In addition, it is also preferable that a light linearizing device is provided, which makes light from the light source into linear and substantially parallel rays before causing them to enter perpendicularly the image display screen of the image display device and, at the same time, scans relatively the image display screen of the image display device with the linear and substantially parallel rays.

Moreover, in this aspect of the present invention, if pluralities of prism sheets are used, it is preferable to use the prism sheets in a stacked state and arrange them such that the prism portions are perpendicular to each other. Furthermore, in this aspect of the present invention, at least total thickness of a substrate and a polarizing plate on the photosensitive recording medium side is preferably not more than 1.0 mm, more preferably not more than 0.8 mm, and yet more preferably not more than 0.6 mm.

In addition, in this aspect of the present invention, the image display device and the photosensitive recording medium may be spaced apart from each other. In this case, the distance between the transmission type image display device and the photosensitive recording medium is preferably 0.01 mm to 3 mm or less, and more preferably 0.1 mm to 3 mm.

In addition, preferably, the size of the display image is substantially identical to a size of an image to be transferred to the photosensitive recording medium.

In addition, a size of each pixel of the image display device is preferably not more than 0.2 mm.

In addition, in each of the above-mentioned image transfer apparatuses, preferably, a substantially parallel rays generating element is further arranged between the light source and the image display device. This substantial parallel rays generating element is preferably constituted by a porous plate in which a plurality of through-holes are formed. The thickness of the porous plate is preferably not less than three times, more preferably not less than five times, and particularly preferably not less than seven times a diameter or equivalent diameter of the through-holes.

Note that, preferably, the through-holes are parallel through-holes, and a geometry of the through-holes is circular or polygonal.

In addition, in order to attain the above-mentioned third, fifth and sixth objects, the inventors of the present invention have devoted themselves to the study on a low-cost image transfer apparatus that is capable of using a transmission type image display device such as a liquid crystal display and obtaining a transfer image of high clarity. As a result of the study, it has been found that, in order to prevent image blurring (unclearness) and obtain a transfer image of high clarity in a thin and compact apparatus with a simple and practical structure, it is necessary to remove a scattered light component and cause strip-like substantially parallel rays comprised of components closer to parallel rays to perpendicularly enter the image display device. For this purpose, the inventors of the present invention has found that it is desirable to convert light from the light source into strip-like substantially parallel rays by a parallel rays generating element provided with a plurality of through-holes in one direction, which also leads to reduction in cost. Moreover, the inventors of the present invention has found that, by forming the light source itself as a linear light source, it is possible to obtain strip-like substantially parallel rays of uniform intensity in one direction and to achieve the reduction in cost. In this way, the inventors have reached the fifth aspect of the present invention.

That is, the fifth aspect of the present invention provides an image transfer apparatus that includes: a transmission type image display device for forming a display image of an image display screen therof by transmitted light that has transmitted through the image display screen thereof; a linear light source for emitting light in parallel with the image display screen of the image display device; a parallel rays generating element for making emitted light from the linear light source into substantially parallel rays; a reflection device for reflecting the substantially parallel rays from the parallel rays generating element so as to transmit the substantially parallel rays through the image display screen substantially perpendicular thereto; and a moving device for moving the linear light source, the parallel rays generating element and the image display device relatively with respect to the image display device and in parallel with the image display screen to scan and expose a photosensitive recording medium, in which the display image of the image display screen is transferred by exposing the photosensitive recording medium using the transmitted light that has transmitted through the image display screen of the image display device.

Here, the reflection device is preferably a reflection plate that is arranged to be inclined at 45° with respect to the image display screen and has a reflection plane for reflecting the substantially parallel rays from the parallel rays generating element substantially perpendicularly toward the image display screen.

In addition, the reflection device is preferably a reflection member having a reflection curved surface for reflecting the substantially parallel rays from the parallel rays generating element substantially perpendicularly toward the image display screen.

In addition, the reflection curved surface is preferably a quadratic curved surface or preferably a curved surface having a predetermined curvature.

Further, the parallel rays generating element is preferably a porous plate in which a row of a plurality of through-holes are pierced toward a direction along the display image surface of the image display device, the plurality of through-holes being arranged in a direction perpendicular to a moving direction by the moving device, is arranged in at least one stage, that is, one stage or a plurality of stages in a vertical direction with respect to the image display screen. Here, the porous plate preferably has a plurality of stages of rows of through-holes, and more preferably has an even number of stages of rows of through-holes.

Moreover, when the reflection device is a reflection member having a reflection curved surface for reflecting the substantially parallel rays from the parallel rays generating element substantially perpendicularly toward the image display screen, the reflection member preferably has a plurality of sub-reflection curved surface having a predetermined curvature, which are provided in association with the plurality of rows of through-holes, respectively.

In addition, preferably, the moving device moves as a unit the image display device and the photosensitive recording medium or the linear light source, the parallel rays generating element and the reflection device.

In addition, preferably, the moving device moves the linear light source, the parallel rays generating element and the reflection device, or the image display device in a direction along one side of the image display screen of the image display device.

Further, the image display device is preferably a transmission type liquid crystal display. In the present invention, the transmission type liquid crystal display refers to a transmission type image display plate that has a structure, in which a liquid crystal layer is held by glass substrates from both sides thereof, and displays an image based on supplied image data.

That is, the fifth aspect of the present invention provides an image transfer apparatus that includes: a transmission type image display device for forming a display image of an image display screen by transmitted light that has transmitted through the image display screen; a linear light source for emitting light in parallel with the image display screen of the image display device; a parallel rays generating element for making emitted light from the linear light source into substantially parallel rays; a reflection device for reflecting the substantially parallel rays from the parallel rays generating element so as to transmit the substantially parallel rays through the image display screen substantially perpendicular thereto; and a moving device for moving the linear light source, the parallel rays generating element and the image display device relatively with respect to the image display device and in parallel with the image display screen to scan and expose a photosensitive recording medium, in which the display image of the image display screen is transferred by exposing the photosensitive recording medium using the transmitted light that has transmitted through the image display screen of the image display device.

Here, the parallel rays generating element is preferably a porous plate having a plurality of through-holes that are pierced toward the direction along the image display screen of the image display device, the plurality of through-holes being arranged in a direction perpendicular to the moving direction by the moving device. This porous plate has the through-holes arranged in one row or a plurality of stages in the vertical direction with respect to the image display screen of the image display device. If the through-holes are arranged in a plurality of stages, the porous plate more preferably has the through-holes arranged in an even number of stages.

The moving device preferably moves as a unit the image display device and the photosensitive recording medium or the linear light source, the parallel rays generating element and the reflection device.

In addition, the movement by the moving device is preferably movement in a direction along one side of the image display screen of the image display device.

The image display device is, for example, a transmission type liquid crystal display.

The transmission type liquid crystal display means a transmission type image display plate that has a structure, in which a liquid crystal layer is held by glass substrates from both sides thereof, and displays an image based on supplied image data.

BRIEF DESCRIPTION OF THE DRAWINGS

In the accompanying drawings:

FIG. 24A is a schematic view showing an operation of the image transfer apparatus of this embodiment; and FIG. 24B is a schematic view showing an example of modification of the operation of the image transfer apparatus of this embodiment;

FIG. 25 is a schematic view showing another example of modification of the third embodiment of this aspect of the present invention;

FIG. 26 is a schematic sectional view showing an image transfer apparatus in accordance with the first embodiment of the fourth aspect of the present invention;

DETAILED DESCRIPTION OF THE INVENTION

An image transfer apparatus in accordance with the present invention will be hereinafter described in detail based on preferred embodiments shown in the accompanying drawings.

Note that an image transfer apparatus to be described below is based on a system not using a projection optical system, which is proposed by the applicant before in US 2002-0067440 A (U.S. Ser. No. 09/972,964) and the like.

First, an image transfer apparatus in accordance with the first aspect of the present invention will be described with reference to FIGS. 1 to 6D.

Figure 1:
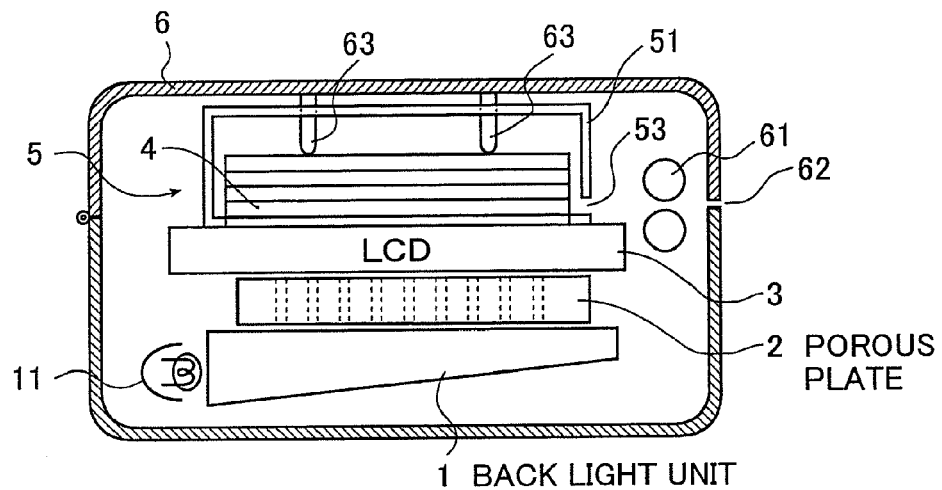
FIG. 1 is a schematic side sectional view of an embodiment of an image transfer apparatus in accordance with the first aspect of the present invention.

FIG. 1 is a schematic side sectional view of an embodiment of the image transfer apparatus in accordance with the first aspect of the present invention.

As shown in FIG. 1, the transfer apparatus according to the first aspect of the present invention includes a back light unit 1 serving as a light source, a porous plate 2 for generating substantially parallel rays, a liquid crystal display (LCD) 3 for displaying an image based on supplied image data, a film case 51 accommodating photosensitive films 4, and a main body case 6 containing the back light unit 1, the porous plate 2, the LCD 3, and the film case 51.

Here, the porous plate 2, the LCD 3, and the photosensitive film 4 are arranged in series along a direction in which light from the back light unit 1 advances, and at least LCD 3 and the photosensitive films 4 are arranged in a non-contact state.

As described above, this image transfer apparatus includes the transmission type LCD 3 for displaying an image based on supplied image data, the back light 1 that is provided on one side of the LCD 3 (opposite side to the photosensitive film 4) and irradiates light (projection light) on the LCD 3 in order to cause transmitted light to carry the image, and the porous plate 2 that is provided between the back light 1 and the LCD 3 and makes light from the back light 1 into substantially parallel rays.

Note that, when it is that the LCD 3 and the photosensitive film 4 are arranged in a non-contact state, it means that the display surface of the LCD 3 and the photosensitive surface of the photosensitive film 4 are spaced apart from each other by a predetermined distance and are not in direct contact with each other. It is also possible to adopt an arrangement, in which while the film case 51 is in contact with the LCD 3 outside the effective range of the image of the photosensitive film 4, there is a space between the photosensitive surface of the photosensitive film 4 and the display surface of the LCD 3. In addition, this includes a case in which the display surface of the LCD 3 and the photosensitive surface of the photosensitive film 4 are in contact with each other via a transparent glass plate or a film of predetermined thickness but are not in direct contact with each other, thus substantially maintaining a predetermined distance between them.

The back light unit 1 serving as a light source is for irradiating uniform light over the entire surface of the LCD 3 from behind thereof, and is a planar light source having a light emitting surface (illuminating surface) that is substantially the same as the display screen of the LCD 3. It comprises a rod type lamp 11 such as a cold-cathode tube, and a back light assembly having a light guide plate (not shown) for introducing the light emitted from the rod type lamp 11 in a predetermined direction, a reflection sheet (not shown) for reflecting the light introduced by the light guide plate in a direction substantially perpendicular thereto, a diffusion sheet (not shown) or prism sheet for uniformalizing the light reflected by the reflection sheet, and the like. The light irradiated on the display surface of the LCD 3 is also referred to as projected light.

There are no particular limitations regarding the back light unit 1 used in the present invention. It may be of any type as long as it is a planar light source which uniformly diffuses light emitted from the rod type tube 11 such as a cold-cathode tube by using a back light assembly comprising a light guide plate, a reflection sheet, a diffusion sheet, a prism sheet and the like. It is possible to use a publicly-known LCD back light unit. Here, in the example shown, the size of the (illuminating) surface (light emitting surface) may be the same as the size of the display screen of the LCD 3 or the photosensitive surface of the photosensitive film 4. However, the size of the (illuminating) surface is not limited to this. It may be somewhat larger than the size of the display screen of the LCD 3 or the photosensitive surface of the photosensitive film 4.

An LED array light source, a light source using an organic or inorganic EL panel or the like can be utilized as the back light unit 1 used in the present invention as long as it is a planar light source capable of emitting light of a desired intensity.

The porous plate 2 is arranged between the back light unit 1 and the LCD 3 in parallel with the display surface of the LCD 3, and serves as an elemnt that makes light from the back light unit 1 into substantially parallel rays and makes the projected light entering the LCD 3 into substantially parallel rays. In the porous plate 2, through-holes 21 of a predetermined size are arranged two-dimensionally in a vertical direction with respect to the surface of the LCD 3 at a predetermined interval on a rectangular plate of predetermined thickness. That is, the porous plate 2 is a parallel rays generating element in which a plurality of emission openings are provided to emit projected light in a substantially vertical direction with respect to the surface of the LCD 3, and the emission openings are arranged two-dimensionally at a predetermined pitch interval within a surface parallel with the display surface of the LCD 3.

Figure 2:
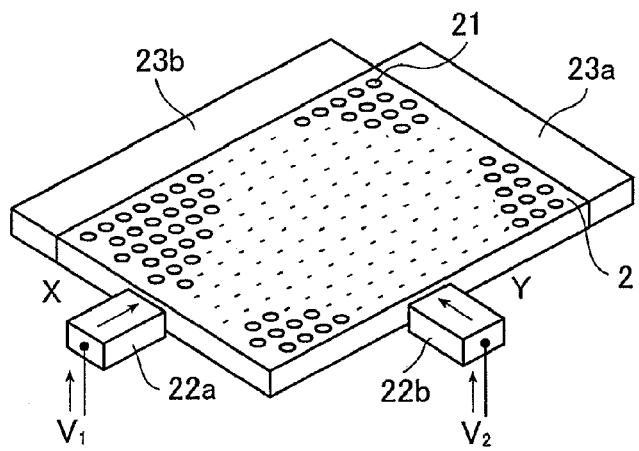
FIG. 2 is a perspective view showing a porous plate that is an embodiment of a (substantially) parallel rays generating element used in the image transfer apparatus shown in FIG. 1.

As shown in FIG. 2, the porous plate 2 is provided with piezoelectric actuators 22a and 22b on two different sides of the porous plate 2. On the other hand, elastic members 23a and 23b such as rubber members are provided on two other sides opposed to the two sides where the piezoelectric actuators 22a and 22b are provided, whereby the porous plate 2 is supported. The porous plate 2 may be supported by springs instead of the elastic members 23a and 23b.

The piezoelectric actuators 22a and 22b are constituted so as to expand and contract in an X direction and a Y direction by the application of voltages $V_1$ and $V_2$, respectively, thereby displacing the porous plate 2 according to the voltages $V_1$ and $V_2$. That is, the porous plate 2 is constituted so as to move relatively to the LCD 3.

Note that, in the first aspect of the present invention, the porous plate 2 only has to move relatively to the LCD 3. Contrary to the embodiment shown in FIGS. 1 and 2, the porous plate 2 may be fixed and the LCD 3 may move. In this case, the photosensitive film 4 moves integrally with the LCD 3 such that exposure is performed in a state in which an image displayed on the LCD 3 remains stationary on the photosensitive film 4.

The porous plate 2 is moved relatively to the LCD 3 for the purpose of preventing a shadow of an arrangement pattern of the through-holes 21 of the porous plate 2 from being imprinted on a transfer image with the porous plate 2 as described later.

Figures 3A, 3B, 3C:
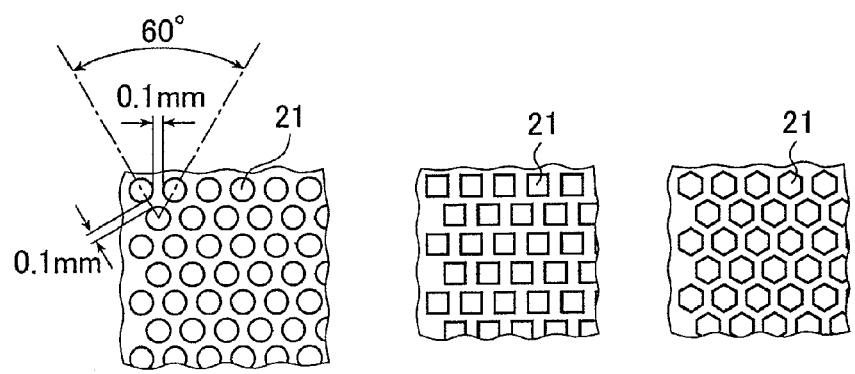
FIGS. 3A, 3B and 3C are views illustrating an example of an arrangement of through-holes of the porous plate, respectively.

In addition, there are no particular limitations regarding the parallel rays generating element used in the present invention as long as it has the same function as the porous plate 2. The parallel rays generating element is not limited to the porous plate 2. Other than the porous plate 2 comprising the through-holes 21 having circular emission openings shown in FIG. 3A, a lattice such as one forming square emission openings (square lattice) as shown in FIG. 3B, one forming hexagonal emission openings (hexagonal lattice) as shown in FIG. 3C or the like can be used. That is, the parallel rays generating element may be any type as long as a plurality of emission openings for emitting projected light in a substantially vertical direction with respect to the surface of the LCD 3 are provided.

However, from the viewpoint of easiness of production, the porous plate 2 shown in FIG. 3A is preferable.

In addition, in the first aspect of the present invention, there are no limitations regarding an arrangement interval of the porous plate 2 and the LCD 3.

Here, there are no particular limitations regarding the material of the porous plate 2. It is possible, for example, to use a metal plate such as an aluminum plate, a resin plate or a carbon plate having predetermined thickness. Nor are there any particular limitations regarding the thickness of the porous plate 2. It may be appropriately selected in accordance with the requisite clarity of a transfer image or with a size of the display screen of the LCD 3 and the photosensitive surface of the photosensitive film 4. In addition, as a method of producing the porous plate 2, a method of stacking porous sheets together, a molding method by use of resin, or the like is practical. However, there are no particular limitations regarding the method as long as processing can be performed. It may be produced by any processing method including a method by which holes are formed by machining.

Further, a shape of arrangement and a pitch interval of arrangement of the plurality of through-holes 21 provided in the porous plate 2 are not limited as long as the through-holes 21 are uniformly arranged. For example, the shape of arrangement may be a grid shape or a zigzag shape (a close-packed shape), with the zigzag shape being preferable. In addition, the pitch of arrangement is preferably as fine as possible, and a distance between the through-holes are 0.05 to 0.5 mm, preferably 0.05 to. 0.3 mm.

Further, there are no particular limitations regarding the cross-sectional configuration (cross-sectional configuration when cut along a surface parallel to a surface of the porous plate 2) of the through-holes 21 provided in the porous plate 2. It may be, for example, cylindrical, elliptic cylindrical, or prism-like. That is, the cross section of the through-holes 21 is not limited particularly and may be, for example, circular, elliptical or polygonal. However, to facilitate the preparation, it is desirable for the cross section of the through-holes 21 to be circular or polygonal. Further, while it is desirable for the through-holes 21 to be parallel to the thickness direction of the porous plate 2, they may be substantially parallel to the thickness direction.

In addition, there are no particular limitations regarding a size of the through-holes 21 either. A diameter (in the case of a circle) or an equivalent diameter (in the case of an ellipse, a polygon, etc.) of the through-holes 21 in the porous plate 2 is preferably not more than 5 mm. Thickness of the porous plate 2 is preferably not less than three times the diameter or the equivalent diameter of the through-holes 21. Note that the above-mentioned equivalent diameter is a length expressed as "4×area/total-sides-length (or total circumferential length)". The diameter or equivalent diameter of the through-holes 21 of the porous plate 2 is set to not more than 5 mm, and the thickness of the porous plate 2 is set to not less than three times the diameter or equivalent diameter of the through-holes 21 because these conditions are effective in obtaining parallel rays by means of the porous plate 2. A ratio of the thickness of the porous plate 2 with respect to the diameter or equivalent diameter of the through-holes 21 is not less than three times, preferably not less than five times, and particularly preferably not less than seven times.

In addition, it is desirable to provide a reflection preventing film over the entire surface of the porous plate 2 including inner surfaces of the through-holes 21. There are no limitations regarding the reflection preventing film as long as its reflectance is equal to or lower than a predetermined value. For example, there are a black plating film, a film subjected to blackening processing, a black coated film and the like. In the present invention, the above-mentioned reflectance is preferably not more than 2%. This is because if the reflectance is not more than 2%, scattered light other than parallel rays entering from the back light unit 1 can be efficiently absorbed, so that only substantially parallel rays (including parallel rays) can be efficiently emitted from the back light 1 and caused to enter the LCD 3. Note that the reflectance can be measured at a wavelength of 550 nm using a spectroreflectometer MPC3100 manufactured by Shimadzu Corporation.

Further, in the above-mentioned embodiment, the piezoelectric actuators 22a and 22b are used as means for moving the porous plate 2. However, a publicly-known moving device may be used instead of using the piezoelectric actuators 22a and 22b. For example, the porous plate 2 may be displaced by a solenoid, or may be vibrated to be moved using a vibrator, or may be moved mechanically using a stepping motor.

Figure 4:
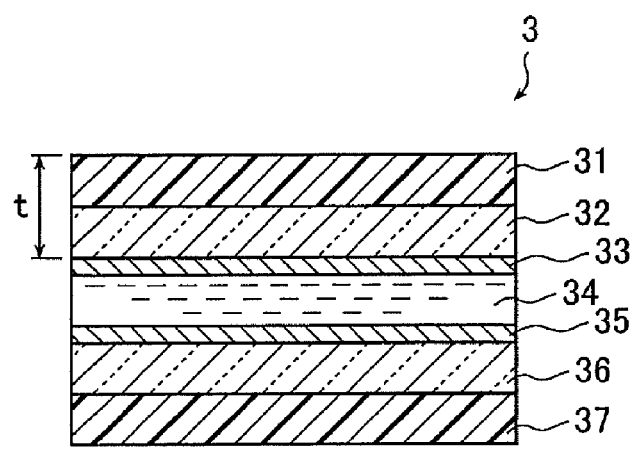
FIG. 4 is a side view showing a structure of an embodiment of a transmission type liquid crystal display used in the image transfer apparatus shown in FIG. 1.

As shown in FIG. 4, the LCD 3 has a plate-like structure in which a film-like polarizing material or a film-like polarizing plate (hereinafter also referred to as the polarizing film) 31, a glass substrate 32, an electrode 33, a liquid crystal layer 34, an electrode 35, a glass substrate 36, and a film-like polarizing plate (polarizing film) 37 are stacked together from the photosensitive film 4 side toward the porous plate 2 side (the back light unit 1 side), the liquid crystal layer 34 being held by the glass substrates 32 and 36 and the polarizing films 31 and 37 from both sides thereof. It goes without saying that, although not shown, the LCD 3 has a black matrix, an RGB color filter, an orientation film, and the like as is well known in the art. Here, for example, in the case of a TFT type LCD, the electrode 33 is a common electrode, and the black matrix, the RGB color filter, and the like are arranged between the electrode 33 and the glass substrate 32, and the electrode 35 comprises a display electrode, a gate electrode, and the like. Note that resin substrates or the like may be used instead of the glass substrates 32 and 36.

As the structure of the LCD 3, an LCD having a well-known liquid crystal display mode and driven by a well-known driving system, except total thickness of the polarizing film 31 and the glass substrate 32 on the side of a photosensitive film 4 discussed later, can be used as long as it can display an image. Examples of the liquid crystal display mode include TN mode, STN mode, CSH mode, or liquid crystal display modes using a polarizing plate, such as FLC mode, and OCB mode. Examples of the driving system include active matrix driving systems such as a TFT type and a diode type, and direct matrix driving systems comprised of XY stripe electrodes.

In addition, there are no limitations regarding the size of the LCD 3, and any size may be adopted. It is possible to select an appropriate size in accordance with a size of a photosensitive film. Further, there are no particular limitations regarding a dot size of each RGB pixel of the LCD 3. However, in order to obtain a clearer photographic image with high quality, it is preferable that a size of each pixel at least on the shorter side be not more than 0.2 mm. This is because, if the size is not more than 0.2 mm, it is possible to obtain a clearer transfer image.

Note that there are no particular limitations regarding the number of pixels (or pixel density) of the LCD 3. In order to transfer and obtain a high-quality image of high definition and high clarity, it is preferable to use an LCD having a high-definition screen with a small RGB pixel dot size that is recently commercialized. Examples of such an LCD include TFT type LCDs such as UXGA (10.4 inches; 1200×1600 pixels) and XGA (6.3 and 4 inches; 1024×768 pixels).

Note that, in the LCD 3 used in the present invention, it is desirable that at least total thickness t of the substrate 32 and the polarizing film 31 on the photosensitive film 4 side be as small as possible. It is desirably set to not more than 1.0 mm, preferably not more than 0.8 mm, and more preferably not more than 0.6 mm. Still more preferably, the total thickness of the substrate 36 and the polarizing film 37 on the back light unit 1 (the porous plate 2) side is also small. It is desirably set to not more than 1.0 mm, preferably not more than 0.8 mm, and more preferably not more than 0.6 mm.

In addition, there are no particular limitations regarding a lower limit value of the total thickness t. However, for example, since a limit of reducing thickness of the glass substrate 32 itself is considered to be approximately 0.5 mm, the total thickness t may be not less than 0.5 mm. Note that the lower limit value of the total thickness t is not limited to this. As a structure for realizing the above-mentioned conditions, it is effective to consider use of a resin substrate instead of the glass substrate so that the lower limit value of approximately 0.5 mm can be further reduced.

In this way, it is preferable to set the total thickness t of the substrate 32 and the polarizing film 31 on the photosensitive film 4 side to not more than 1.0 mm. This condition of the total thickness is equivalent to suppressing diffusion of projected light in a section from the back light unit 1 to the LCD 3 and is based on a fact that a clearer transfer image can be obtained even if the LCD 3 and the photosensitive film 4, strictly speaking, the display surface of the LCD 3 and the photosensitive surface of the photosensitive film 4 are held in a non-contact state.

A plurality of photosensitive films 4 are contained in the film case 51, which is constituted such that, from a viewpoint of actual easiness of handling, the photosensitive surface of the photosensitive film 4 closest to the LCD 3 is arranged to be opposed to the display screen of the LCD 3 with a predetermined distance apart therefrom.

The film case 51 accommodates a plurality of photosensitive films 4. Note that, it is possible to load one set (pack) of photosensitive films 4 in the film case 51 mounted inside the main body case 6 or to load a film pack 5 in which a plurality of photosensitive films 4 are accommodated in the detachable film case 51 in the main body case 6 as it is. However, it is desirable to adopt a construction in which the film pack 5 including the film case 51, that is, the film case 51 itself accommodating a plurality of photosensitive films 4 can be loaded.

The photosensitive film 4 is used as the photosensitive recording medium in the present invention. Any type of a photosensitive recording medium will do as long as it allows formation of a visible positive image by exposure printing of a transmitted display image on the LCD 3, and there are no particular limitations in this regard. For example, it is desirable to use a so-called instant photographic film or the like. Examples of the photosensitive film 4 used as the photosensitive recording medium include "instax mini" and "instax" (both manufactured by Fuji Photo Film Co., Ltd.), which are mono-sheet type instant photographic films.

Such instant photographic films are commercially available in the form of a film pack in which a predetermined number of films are set or accommodated in a film case.

Then, by utilizing the thickness of this film case, the distance between (the image display surface of) the LCD 3 and (the photosensitive surface of) the photosensitive film 4 is preferably set to 0.01 mm to 3 mm, and more preferably 0.1 mm to 3 mm. As stated above, this arrangement is rather disadvantageous from the viewpoint of obtaining a clear transfer image. However, it is a condition necessary for realizing an apparatus that is actually easy to handle. The disadvantage of light diffusion due to this arrangement can be compensated for by an advantage of the suppression of light diffusion, which can be achieved by making the total thickness t of the glass substrate 32 and the polarizing film 31 on the photosensitive film 4 side of the LCD 3 mentioned above not more than a predetermined dimension and by increasing a ratio of the thickness of the porous plate 2 with respect to the diameter or the equivalent diameter of the through-holes 21.

Thus, in the present invention, if an arrangement is possible in which the gap between the photosensitive surface of the photosensitive film 4 and the display screen (image display surface) of the LCD 3 satisfies the above-mentioned condition, it is possible to load the film pack 5 as it is in the main body case 6, as shown in FIG. 1.

Figure 5:
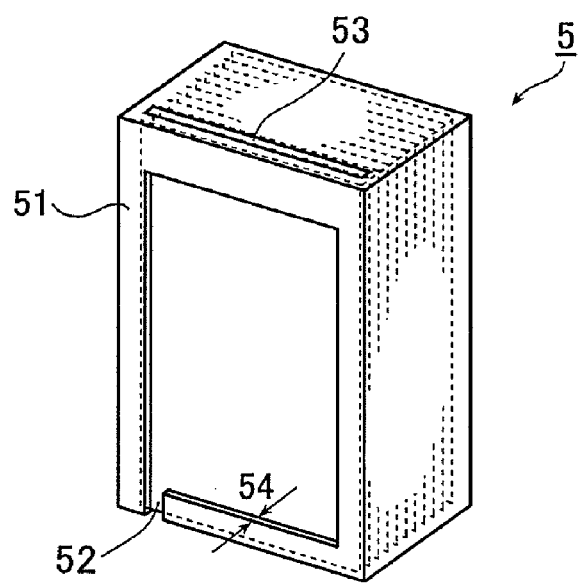
FIG. 5 is a perspective view showing a structure of an embodiment of a film pack used in the image transfer apparatus shown in FIG. 1.

FIG. 5 shows the construction of an embodiment of the film pack 5.

At one end of the film case 51 of the film pack 5 having the construction shown in the figure, there is provided a cutout 52 which admits a claw member (claw) for extracting the photosensitive film 4 from (the film case 51 of) the film pack 5, and the photosensitive film 4 which has undergone exposure is extracted from an outlet 53 of the film case 51 of the film pack 5 by the claw member, and is transferred to a processing step by a conveying mechanism (not shown).

Here, the "processing" means pushing open a processing liquid (developer) tube (not shown) provided at one end of the photosensitive film 4 beforehand and causing the developer to be uniformly spread over the entire inner surface of the photosensitive film 4. It is executed substantially simultaneously with the extraction of the photosensitive film 4 from the film pack 5 and the conveyance thereof. After the processing, the photosensitive film 4 is conveyed to the exterior of the apparatus through an outlet port 62 of the main body case 6 (See FIG. 1).

As is well known, an instant photographic film of this type makes it possible to form a complete image for appreciation in about several tens of seconds after the above-mentioned processing. Thus, in the transfer apparatus of the present invention, the function of performing up to the above-mentioned processing is required. After one photosensitive film has been sent out, the next photosensitive film appears, realizing a preparation state for the next exposure (transfer).

Regarding the method of handling this film pack described above, the instant camera using an instant photographic film disclosed in commonly assigned JP 4-194832 A, is to be referred to.

In FIG. 5, reference symbol 54 indicates the height of the edge (stepped portion) of the film case 51 of the film pack 5. By setting the height 54 of this edge at a desired dimension, it is possible to set the distance between the display surface of the LCD 3 and the photosensitive surface of the photosensitive film 4 at a predetermined value as mentioned above.

Thus, in the present invention, apart from the fact that the height 54 of this edge is adjusted to a desired dimension, the film pack of a well-known conventional instant photographic film is applicable.

Also in the case in which the film case 51 is mounted in the main body case 6 beforehand and in which only one set of photosensitive films 4 is loaded in the film case 51, it is possible to set the distance between the image display surface of the LCD 3 and the photosensitive surface of the photosensitive film 4 to a predetermined range as mentioned above by setting the height 54 of this edge at a desired dimension.

While, in the example shown in FIG. 1, the film case 51 is in direct contact with the display surface of the LCD 3 outside the effective image range of the photosensitive film 4, this should not be construed restrictively. When the height 54 of the edge of the film case 51 is small, the film case 51 may be mounted or loaded so as to be spaced apart from the display surface of the LCD 3 by a predetermined distance. Further, in the present invention, the film case 51 may be brought into contact with the holding panel externally holding the display surface of the LCD 3 as long as the above-mentioned conditions are satisfied.

In the image transfer apparatus of the present invention, it is desirable that the size of the image displayed on the LCD 3 be substantially the same as the size of the image transferred to the photosensitive film 4. This is due to the fact that, in the present invention, a direct transfer system is adopted in which no enlargement or reduction using a lens system is effected, thereby making it possible to achieve reduction in the size and weight of the apparatus.

The main body case 6 is a case containing the above-mentioned components of the image transfer apparatus according to the present invention, that is, the back light unit 1, the porous plate 2, the LCD 3, the film pack 5 (or the film case 51), a pair of rollers 61 for transferring a film which has undergone exposure and spreading out the processing liquid, etc. In the main body case 6, the pair of rollers 61 for transferring a film which has undergone exposure and spreading out the processing liquid are mounted at a position where they face the exposed-film extraction outlet 53 of the loaded film pack 5 (or the film case 51). Further, the main body case 6 has at a position facing this pair of rollers 61 the outlet 62 for extracting the exposed photosensitive film 4 from the main body case 6. Further, the main body case 6 is provided with a back-up pressurizing pin 63 which is inserted from an opening on the back side of the film pack 5 and which presses the photosensitive film 4 against the front edge of the film case 51, that is, the LCD 3 side.

Although not shown, it goes without saying that the image transfer apparatus of the present invention includes a drive source (motor) for driving the roller pair 61, a power source for driving the drive source and lighting up the rod type lamp 11 of the back light unit 1, electrical equipment for controlling these components, a data processing device which receives digital image data from a digital image data supply section in order to display an image on the LCD 3 and which converts the received data into image data for LCD display, and a control unit.

Moreover, as described above, when an image is transferred to the photosensitive film 4, the porous plate 2 is used as a parallel rays generating element for generating substantially parallel rays so as not to decrease clarity of a transfer image. However, a shadow of the arrangement pattern of the through-holes 21 of the porous plate 2, which is recorded on the transfer image due to the use of the porous plate 2, is imprinted on the transfer image. Thus, the image transfer apparatus of the first aspect of the present invention moves the porous plate 2 relatively to the LCD 3 using the piezoelectric actuators 22a and 22b in order to suppress this imprinting.

In this movement of the porous plate 2, as shown in FIGS. 6A, 6B, 6C and 6D, during exposure, the through-holes 21 are moved from an initial position L0 to an intermediate position L1 of an arrangement interval in an arrangement direction A using the piezoelectric actuator 22a and, thereafter, moved to an intermediate position L2 of the arrangement interval in an arrangement direction B using the piezoelectric actuator 22b, further moved to an intermediate position L3 of the arrangement interval in the arrangement direction A using the piezoelectric actuator 22a and, thereafter, returned to the position L0 using the piezoelectric actuator 22b. That is, projected light can be projected to all the parts on the LCD 3 by moving the through-holes 21 three times while changing the moving direction.

In this way, the movement in the arrangement direction of the through-holes 21 is performed during exposure. A moving distance in the arrangement direction at the time of this movement is shorter than a pitch interval in the arrangement direction of the through-holes 21. In addition, the porous plate 2 changes moving directions to move in different arrangement directions.

Consequently, the shadow of the porous plate 2 that is imprinted on the transfer image due to the use of the porous plate 2 can be suppressed.

Note that the circulating movement starting from the position L0 and returning to the position L0 via the intermediate positions L1, L2 and L3 may be repeated a plurality of times during exposure. The above-mentioned movement of the porous plate 2 is carried out by the plurality of times of movements along the arrangement direction starting from the position L0 and returning to the position L0 via the intermediate positions L1, L2 and L3. On the LCD 3, there are some parts on which the projected light is projected only at the time of one movement among the plurality of times of movements along the arrangement direction (area $R_1$ in FIG. 6D) and some parts on which the projected light is still projected even if the moving direction is changed, that is, the projected light is projected even at the time of the plurality of times of movements (areas $R_2$ and $R_3$ in FIG. 6D). An amount of exposure at the time of transfer to the photosensitive film 4 varies depending upon a part. Thus, during exposure, the above-mentioned circulating movement starting from the position L0 and returning to the position L0 via the intermediate positions L1, L2 and L3 is repeated a plurality of times, whereby unevenness of a transfer image due to variation of the amount of exposure can be suppressed.

Note that the above-mentioned plurality of times of movements of the porous plate 2 along the plurality of arrangement directions is only an example, and a movement may be any type. However, it is preferable from the viewpoint of suppressing a shadow of the porous plate 2 that the movement in the arrangement direction of through-holes 21 is performed, the moving distance in this arrangement direction is made shorter than the pitch interval in the arrangement direction and, when moving, the porous plate 2 changes moving directions to move in different arrangement directions.

Transfer to the photosensitive film 4 can be performed in approximately 0.1 second as an example, although the time varies depending upon sensitivity of the photosensitive film 4 or intensity of projected light. In this case, in the example of the movement of FIGS. 6A and 6B, voltages $V_1$ and $V_2$ are applied to vibrate the piezoelectric actuators 22a and 22b such that the through-hole 21 starts moving from the position L0 and returns to the position L0 via the intermediate positions L1, L2 and L3 in approximately 0.1 second.

In addition, other than such a movement, when an image is transferred to the photosensitive film 4, it is also possible to split exposure to the photosensitive film 4 into a plurality of times, move the porous plate 2 to a predetermined moving position each time exposure is performed, and perform exposure in a stationary state of the porous plate 2. In this case, it is desirable to set the above-mentioned moving position in a position in the arrangement of the through-holes 21 before moving, for example, an intermediate position in the arrangement direction. Imprinting of the shadow of the arrangement pattern of the through-holes 21 of the porous plate 2 to the transfer image can also be suppressed by performing the transfer with this method.

Note that, as described above, the porous plate 2 is used as the parallel rays generating element in the above-mentioned example. However, an optical component such as a planar microlens array, in which a plurality of microlenses for emitting substantially parallel rays in a substantially vertical direction with respect to the surface of the LCD 3 are arranged two-dimensionally at a predetermined pitch interval on a substrate, may be used instead of the porous plate 2 as the parallel rays generating element. Examples of a microlens array include SELFOC lens array (trademark) manufactured by Nippon Sheet Glass Co., Ltd.

In such an image transfer apparatus, projected light is irradiated from the back light unit 1.

This projected light is diffused light and this diffused light is made into substantially parallel rays using the porous plate 2. The substantially parallel rays refer to rays in which a degree of spread of light beams within a range of a distance from an exit of the porous plate 2 to the film surface of the photosensitive film 4, for example, several tens mm, is narrower than spread of light beams that decreases clarity of an image. The spread of light beams that decreases clarity of an image is set according to a resolution of the LCD 3.

When the diffused light passes through the through-holes 21 of the porous plate 2, of the diffused light, light entering the through-holes 21 with inclination equal to or larger than a predetermined angle with respect to the surface of the porous plate 2 is absorbed by a reflection preventing film provided on the inner surfaces of the through-holes 21. As a result, rays whose exit angle emitted from the porous plate 2 does not exceed the above-mentioned predetermined angle with respect to the surface of the porous plate 2, that is, substantially parallel rays are generated.

The substantially parallel ray generated in this way is projected on the display image of the LCD 3, and transmitted light carrying a display image is formed. The photosensitive film 4 is exposed by this transmitted light and the image is transferred.

Figure 6A:
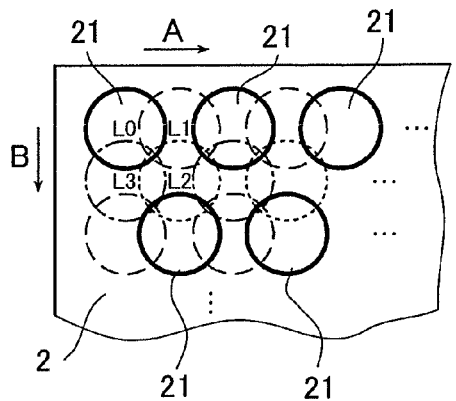
FIGS. 6A, 6B, 6C and 6D are views illustrating an example of movement of the porous plate shown in FIG. 1.
Figure 6B:
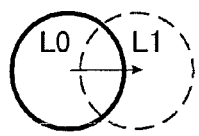
Figure 6C:
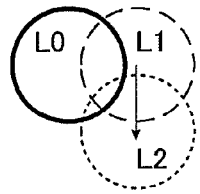
Figure 6D:
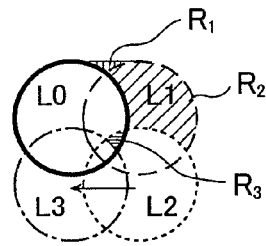

On the other hand, during this exposure, since the porous plate 2 moves as shown in FIG. 6A, imprinting of the arrangement pattern of the through-holes 21 of the porous plate 2 in the transfer image as a shadow is suppressed. That is, the arrangement pattern of the through-holes 21 never appears on the transfer image as shading.

Figure 42:
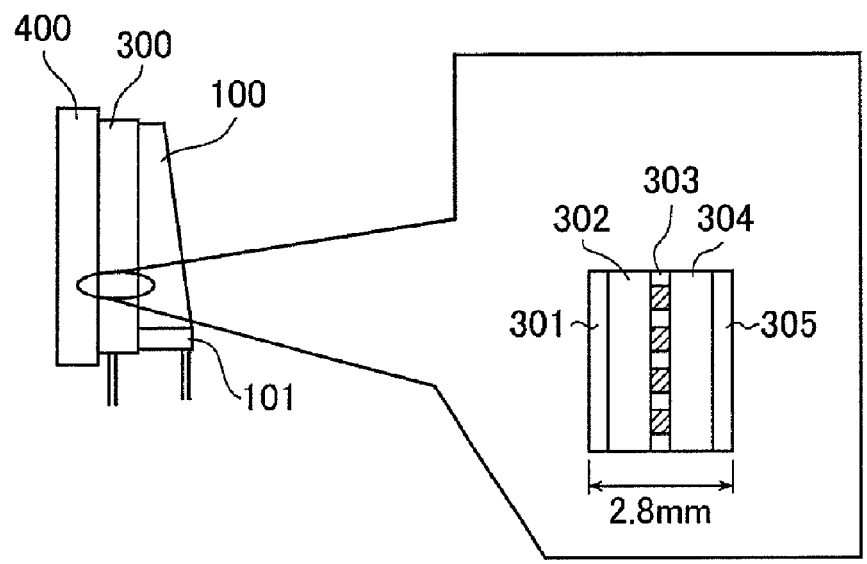
FIG. 42 is a side view showing a structure of an example of a conventional transfer apparatus.
Figure 43:
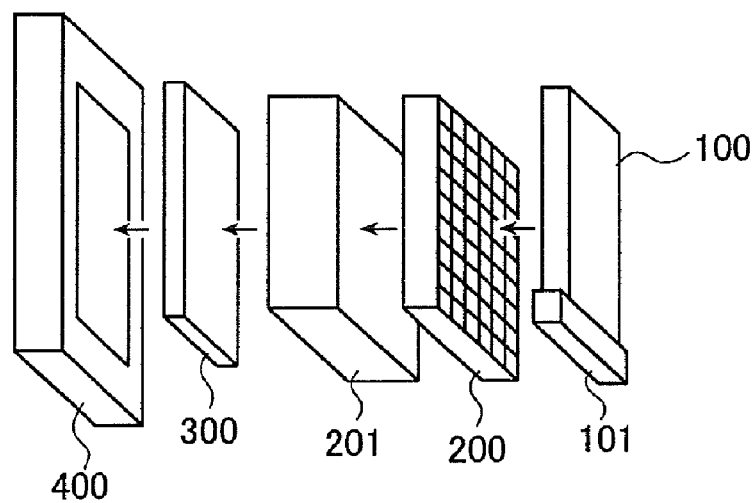
FIG. 43 is a perspective view showing a structure of another example of the conventional transfer apparatus.

In all the above-mentioned embodiments, the image transfer apparatus is an apparatus for performing transfer of an image with the LCD 3 and the film surface of the photosensitive film 4 spaced apart from each other. However, as shown in FIGS. 42 and 43, the image transfer apparatus of this aspect of the present invention may be an apparatus for transferring an image with an LCD and a photosensitive film closely attached to each other, or may be an apparatus including an optical system for focusing an image on a film surface of a photosensitive film.

In addition, in the above-mentioned embodiments, the image transfer apparatus is an apparatus for uniformly exposing an entire photosensitive film using a planar light source to transfer an image. However, the image transfer apparatus may be an apparatus for transferring an image for scanning a display screen of an LCD in one direction with linear projected light of a linear light source. In this case, a parallel rays generating element may be a linear parallel rays generating element that moves in a scanning direction together with the linear light source. This parallel rays generating element is constituted to vibrate (move) in a direction perpendicular to the scanning direction during scan movement.

In this way, substantially parallel rays generated by using the parallel rays generating element is used as projected light, and a shadow of an arrangement pattern of through-holes of the parallel rays generating element never appears as shading of a transfer image. Therefore, the shadow due to the arrangement pattern of the parallel rays generating element is not imprinted in an image even if a liquid crystal display having a high-definition screen with a high image density is used, and a high-definition image with high clarity can be obtained. Moreover, since the parallel rays generating element is moved during exposure, as shown in FIG. 43, it is possible to dispense with the spacer 201 with a thickness of approximately 20 mm, and a thin, small and light image transfer apparatus can be realized.

The image transfer apparatus in accordance with the first aspect of the present invention is basically constituted as described above.

Now, an image transfer apparatus in accordance with the second aspect of the present invention will be described with reference to FIGS. 7 to 11.

Figure 7:
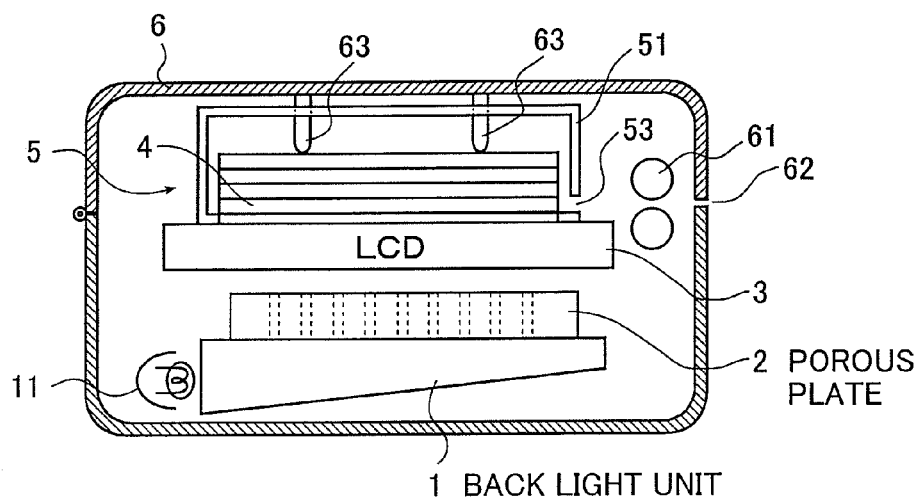
FIG. 7 is a schematic side sectional view of an embodiment of an image transfer apparatus in accordance with the second aspect of the present invention.
Figure 8:
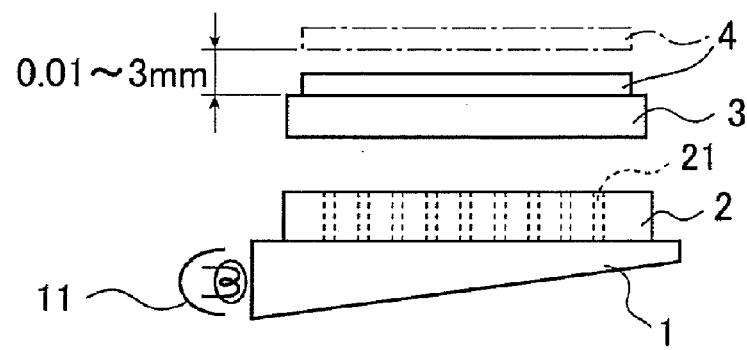
FIG. 8 is a conceptual side sectional view showing a main portion of the image transfer apparatus shown in FIG. 7.

FIG. 7 is a schematic side sectional view of an embodiment of the image transfer apparatus in accordance with the second aspect of the present invention. FIG. 8 is a conceptual side sectional view showing a main portion of the image transfer apparatus shown in FIG. 7.

Here, the image transfer apparatus of the second aspect of the present invention shown in FIGS. 7 and 8 basically has the same structure as the image transfer apparatus of the first aspect of the present invention shown in FIGS. 1 and 2 except the structure in which the porous plate 2 is stationary with respect to the back light unit 1, the outermost layer of the polarizing film 31 of the LCD 3 on the photosensitive film 4 side is comprised of a homogeneous material, and a surface thereof is comprised of a protective film 31a having a smooth surface that is not matted instead of the structure in which the porous plate 2 is provided with the piezoelectric actuators 22a and 22b and is movable with respect to the back light unit 1, and the surface on the photosensitive film 4 side of the polarizing film 31 of the LCD 3 is usually formed of a protective film having a matted surface. Thus, identical components are denoted by the identical reference symbols, and detailed descriptions of such components will be omitted and differences will be mainly described.

As shown in FIGS. 7 and 8, the image transfer apparatus in accordance with the second aspect of the present invention has a back light unit 1 serving as a light source, a porous plate 2 for generating substantially parallel rays, an LCD (liquid crystal display) 3 for displaying an digitally-recorded image, a film case 51 for accommodating a photosensitive film 4, and a main body case 6 for containing these back light unit 1, porous plate 2, LCD 3 and film case 51.

The porous plate 2 used in the embodiment of this aspect of the present invention is arranged between the back light unit 1 and the LCD 3, if necessary, and serves as a substantially parallel rays generating element that makes light from the back light unit 1 into substantially parallel rays to cause the light entering the LCD 3 as parallel as possible. It is comprised of a rectangular plate of a predetermined thickness in which a large number of through-holes 21 of a predetermined size are provided at a predetermined pitch.

In addition, in this embodiment, the distance between the porous plate 2 and the LCD 3 is set to preferably 0.05 mm to 10 mm, and more preferably 0.1 mm to 5 mm. This measure is taken for the purpose of preventing a pattern of the through-holes 21 of the substantially parallel rays generating element, typified by the porous plate 2, from appearing in the form of a "shadow" due to diffused light. Note that the above-mentioned distance set here is a condition under which the above-mentioned "shadow" can be prevented but clarity of the transfer image is not decreased.

In this embodiment, the LCD 3 is a transmission type image display device for displaying a digitally-recorded image, and is connected to a digital image data supply section of a digital still camera, a digital video camera, a personal computer or the like to display a display image as a transmitted image in accordance with digital image data supplied. Further, the digital image data supply section of a digital camera or the like connected to the LCD 3 is constituted such that an arbitrary image can be selected out of images prepared beforehand to be supplied. Note that, other than the above-mentioned case, the digital image data to be supplied to the LCD 3 may also be data read from a transparent original or a reflection original by a scanner or the like. In addition, the LCD 3 may be of any type as long as it can display an image as a transmitted image. It may be of a type which displays an image on the basis of analog image data of an image photographed by an ordinary video camera rather than digital image data.

Note that a predetermined gap is provided between the LCD 3 and the porous plate 2. As stated above, this gap is preferably 0.05 mm to 10 mm, and more preferably 0.1 mm to 5 mm. It is preferable that the gap be adjustable to an arbitrary dimension.

In such an LCD 3, light projected from a side where the polarizing film 37 is arranged passes through the liquid crystal layer 34, and transmitted light carrying an image formed on the liquid crystal layer 34 is emitted from the polarizing film 31.

In the embodiment of this aspect of the present invention, the polarizing film 31 is arranged on the outermost side of a surface where the photosensitive film 4 is arranged of both surfaces of the LCD 3, that is, the outermost side of a surface where transmitted light is emitted. However, whereas a surface of a general LCD is covered by a matted (roughened) protective film, this polarizing film 31 is characterized in that it is covered by a protective film having a surface that is not matted and is formed as a smooth surface.

Figure 9:
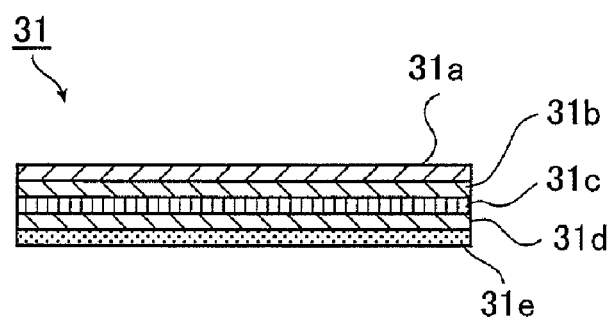
FIG. 9 is a sectional view showing an example of a structure of a polarizing film of a liquid crystal display used in the image transfer apparatus of this aspect of the present invention.

FIG. 9 is a sectional view of the polarizing film 31. As shown in FIG. 9, in the polarizing film 31 on the side where transmitted light emitted of the LCD 3 used in the image transfer apparatus in accordance with this embodiment, a surface of the protective film 31a is smooth and acts such that transmitted light is emitted from the LCD 3 in a state of less scattering. Further, in FIG. 9, reference symbols 31a and 31d denote supports (e.g., TAC films), 31c denotes a polarizing layer and 31e denotes an adhesive layer.

Among the above-mentioned characteristics of the polarizing film 31 in accordance with this embodiment, detailed descriptions of a function of the polarizing layer 31c itself will be omitted because the function is an ordinary polarizing function. As a characteristic other than this, the polarizing film 31 is characterized in that scattering of light passing through the polarizing film 31 is prevented as much as possible.

That is, in the polarizing film 31 in accordance with this embodiment, at least the protective film 31a which is an outermost layer thereof is comprised of a homogeneous material and does not contain transparent particulates such as polyester resin and polyurethane resin.

In addition, each film (support) of the lower layer of the protective film 31a may also comprise a homogeneous material. Moreover, the supports 31b and 31d or the adhesive layer 31e may comprise a homogeneous material. That is, both layers that hold the polarizing layer 31c having the polarizing function from both sides thereof may comprise a homogeneous material.

Moreover, the polarizing film 37 may be formed in the same manner as the polarizing film 31. That is, the outermost layer of the LCD 3 arranged on the opposite side of the side where transmitted light emitted is the outermost layer of the polarizing film 37 arranged on the opposite side of the side where transmitted light emitted, and is comprised of a homogeneous material in the same manner as the outermost layer of the polarizing film 31 arranged on the side where transmitted light emitted and, at the same time, the surface of the outermost layer may be a smooth surface.

Moreover, in the polarizing film 37, all of the layers including the layers that hold the polarizing layer having the polarizing function from both sides thereof, that is, the supports, the adhesive layer and the like may comprise a homogeneous material.

In addition, in the polarizing film 31 in accordance with this embodiment, the surface on the side where transmitted light emitted of the protective film 31a is formed as a smooth surface (flat surface), which prevents scattering of the transmitted light as much as possible. More specifically, the smooth surface preferably has an arithmetic average roughness ($R_a$, JIS B0601-1994) of not more than 0.6 μm from a practical point of view, and more preferably has an arithmetic average roughness of not more than 0.2 μm. In addition, the smooth surface preferably has a maximum height ($R_y$, JIS B 0601-1994) of not more than 10 μm from a practical point of view, and more preferably has a maximum height of not more than 4 μm.

As described above in the first aspect of the present invention before, in this aspect of the present invention, the LCD 3 and the photosensitive film 4 are arranged in a non-contact state. When it is that the LCD 3 and the photosensitive film 4 are arranged in a non-contact state, this means that there is a predetermined gap between the image display surface of the LCD 3 and the photosensitive surface of the photosensitive film 4, and they are spaced apart from each other by a predetermined distance and are not in direct contact with each other. Actually, it is also possible to adopt an arrangement in which, while the film case 51 of the film pack 5 is in contact with the LCD outside the effective range of the image of the photosensitive film 4, there is a space maintained between the photosensitive surface of the photosensitive film 4 and the image display surface of the LCD 3.

In addition, this also includes a case in which, unlike the above-mentioned case, the image display surface of the LCD 3 and the photosensitive surface of the photosensitive film 4 are in contact with each other via a transparent glass plate or film of predetermined thickness but are not in direct contact with each other, thus substantially maintaining a predetermined distance between them.

In the image transfer apparatus of this aspect of the present invention, as in the first aspect, the distance between (the image display surface of) the LCD 3 and (the photosensitive surface of) the photosensitive film 4 is preferably 0.01 mm to 3 mm, and more preferably 0.1 mm to 3 mm. As stated above, this arrangement is rather disadvantageous from the viewpoint of obtaining a clear transfer image. However, it is a condition necessary for realizing an apparatus being actually easy to handle. This is because the disadvantage of light diffusion due to this arrangement can be compensated by an advantage of the suppression of light diffusion, which can be achieved by making the total thickness t of the glass substrate 32 and the polarizing film 31 on the photosensitive film 4 side of the LCD 3 mentioned above not more than a predetermined dimension and by increasing a ratio of the thickness of the porous plate 2 with respect to the diameter or the equivalent diameter of the through-holes 21 not less than three times, preferably not less than five times, and more preferably not less than seven times. Moreover, clarity of the transfer image is further increased by the suppression of diffusion of light stated above and suppression of scattering of light by the polarizing film 31.

In such an image transfer apparatus of this aspect of the present invention, as in the case of the first aspect, projected light is irradiated from the back light unit 1. As described above, this projected light is diffused light, and this diffused light is made into substantially parallel rays using the porous plate 2.

The substantially parallel rays generated in this way is projected on a display image of the LCD 3, and transmitted light carrying the display image is formed. The photosensitive film 4 is exposed by this transmitted light and the image is transferred.

In this case, in this aspect of the present invention, the transmitted light is emitted from the protective film 31a that comprise a homogeneous material and whose surface is a smooth surface. Thus, scattering of the transmitted light emitted from the polarizing film 31 is suppressed and the transmitted light reaches the photosensitive film 4 to expose.

Consequently, in this aspect of the present invention, an image of high clarity can be transferred to the photosensitive film 4.

As described above, in the image transfer apparatus of this aspect of the present invention, in the polarizing film 31 positioned on the photosensitive film 4 side, the outermost layer is comprised of a homogeneous material not containing transparent particulates, and the surface of the polarizing film 31 on the side where transmitted light emitted is formed as a smooth surface that is not matted. Thus, clarity of a transfer image can be improved significantly with a simple structure of the apparatus compared with that in the past.

Next, another embodiment of the present invention will be briefly described.

Figure 10:
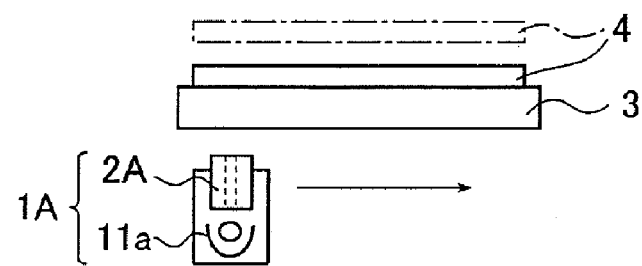
FIG. 10 is a conceptual side sectional view showing a main portion of an image transfer apparatus in another embodiment of this aspect of the present invention.

FIG. 10 is a conceptual side sectional view showing a main portion of an image transfer apparatus in accordance with another embodiment of the present invention. Basically, the image transfer apparatus corresponds to an image transfer apparatus with the improvement of an LCD of an image transfer apparatus described in the specification of US 2002-0063909 A (U.S. Ser. No. 09/972,961) filed by the applicant of this application. In the above-mentioned embodiment shown in FIG. 8, a back light unit 1 comprises a rod type lamp 11 such as a cold-cathode tube, and a back light assembly having a light guide plate for introducing the light emitted from the rod type lamp 11 in a predetermined direction, a reflection sheet for reflecting the light introduced to the light guide plate in a direction substantially perpendicular thereto, the diffusion sheet or prism sheet for uniformalizing the light reflected by the reflection sheet, and the like. In this embodiment, the image transfer apparatus is constituted such that substantially parallel rays are projected on the LCD 3 by a linear substantially-parallel-rays generating unit (light source unit) 1A comprising a linear light source 11a such as a rod type lamp and a porous plate 2A for causing light emitted from the linear light source 11a to enter the LCD 3 as substantially parallel rays.

Note that details of the linear substantially-parallel-rays generating unit 1A will be described later.

Here, as the LCD 3, like the one used in the above-mentioned embodiment, a polarizing film is stacked on the outermost side on a side where transmitted light emitted, and the outermost layer on the side where transmitted light emitted in this polarizing film comprises a protective film comprised of a homogeneous material not containing transparent particulates and, moreover, has a surface that is not matted and is formed as a smooth surface.

This embodiment is different from the above-mentioned embodiment in that, whereas light is two-dimensionally projected on the image display surface of the LCD 3 at one time in the above-mentioned embodiment, light is linearly projected by sequentially moving the linear substantially-parallel-rays generating unit 1A from one end in this embodiment. However, in other points, the same effects are obtained by the same actions as those in the above-mentioned embodiment.

Also in the image transfer apparatus in accordance with this embodiment, a polarizing film in which a material forming at least an outermost layer on a side where transmitted light emitted is a homogeneous material and a surface is a smooth surface (flat surface) is used as a polarizing film of an LCD. Consequently, clarity of a transfer image is obviously improved compared with the case in which a polarizing film, a surface of which on a side where transmitted light emitted is matted and forms an uneven surface, is used.

That is, clarity of a transfer image can also be improved significantly by an apparatus with a simple structure of the image transfer apparatus in accordance with this embodiment.

Figure 11:
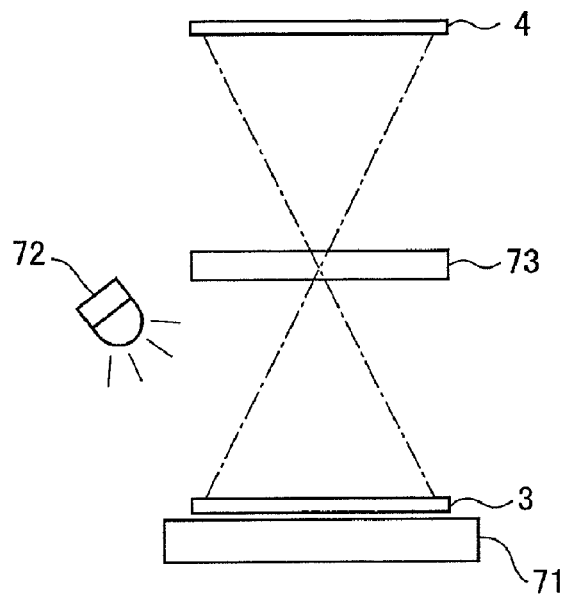
FIG. 11 is a conceptual side sectional view showing a main portion of an image transfer apparatus in another embodiment of this aspect of the present invention.

In addition, as another embodiment of the present invention, an image transfer apparatus as shown in FIG. 11 may be used.

That is, a reflection mirror 71 is arranged on one surface side of the LCD 3, and a white light source 72 is arranged so as to uniformly irradiate light on a surface of the reflection mirror 71 from a predetermined position. On the other hand, a polarizing film that is comprised of a homogeneous material not containing transparent particulates and has a surface formed as a smooth surface is stacked on the outermost side of the LCD 3 opposed to the reflection mirror 71 side. In addition, the photosensitive film 4 is arranged on the opposite side of the side where the reflection mirror 71 is arranged, and a projection optical system 73 is arranged between the LCD 3 and the photosensitive film 4.

Since this image transfer apparatus is constituted in this way, light reflected by the reflection mirror 71 and projected on the LCD 3 is emitted from the LCD 3 as transmitted light. Since this transmitted light is transmitted through a polarizing film having an outermost layer comprised of a homogeneous material that does not contain transparent particulates and, more over, having a surface formed as a smooth surface, scattered light is suppressed compared with that in the past.

Note that, although some of polarizing films used in this embodiment have a reflection preventing film formed in an outermost layer thereof in order to prevent reflection of incident light, a liquid crystal display in which polarizing films excluding such a polarizing film are stacked is preferably used.

In this way, the present invention can be applied to any apparatus as long as it is an apparatus that at least projects light from a light source and transfers an image to a photosensitive recording medium using transmitted light that has transmitted through a liquid crystal display.

For example, the present invention may be applied to an instant printer disclosed in JP 11-249239 A which transmits light irradiated from a fluorescent lamp through a liquid crystal array, causes the transmitted light to pass through a SELFOC lens array, and exposes an instant film to record an image thereon.

In addition, in a photosensitive recording apparatus disclosed in JP 8-271995 A, that is, a photosensitive recording apparatus including a light emitting element that has a large number of light emitting dots, a gradient index lens array that is arranged in the vicinity of the light emitting element such that its central axis crosses an irradiation direction of the light emitting element, a first optical device for causing light from the light emitting element to enter the gradient index lens array, and the second optical device for causing the light that has passed through the refractive index distribution lens array to reach a photosensitive recording medium, the light emitting element may be constituted using a light source and a liquid crystal display as in the present invention, and an outermost layer arranged on a side where transmitted light emitted of this liquid crystal display may comprise a homogeneous material and, at the same time, a surface of this outermost layer may be formed as a smooth surface.

EXAMPLE 1

In all of the above-mentioned embodiments an outermost layer arranged on a side where transmitted light emitted of a liquid crystal display is formed by a homogeneous material and, at the same time, a surface of this outermost layer is formed as a smooth surface. Thus, in order to clarify a degree of smoothness of this smooth surface, clarity of an image to be transferred to a photosensitive recording medium was checked using an image transfer apparatus of a structure shown in FIG. 7 while changing the degree of smoothness of the smooth surface.

A cold-cathode tube of 3.5 inches was used as the rod type lamp 11, and a light guide plate for introducing light emitted from the rod type lamp 11 in a predetermined direction, a reflection sheet for reflecting the light introduced by the light guide plate in a substantially perpendicular direction, and a prism sheet for uniformalizing the light reflected by the reflection sheet were provided in the back light unit 1.

The thickness of the porous plate 2 was set to 6 mm, the diameter of the through-holes 21 was set to 0.5 mm and the arrangement pitch of the through-holes 21 was set to 0.7 mm, and a black coated film was formed as a reflection preventive film on the surface of the porous plate 2.

An LCD of 3.5 inches with 120,000 pixels (pixel size of 0.12 mm×0.24 mm) was used as the LCD 3, and the porous plate 2 was arranged 3 mm apart from the image display surface of the LCD 3.

Further, the polarizing films 31 and 37 are provided on both sides of the LCD 3, and five types of LCDs with different arithmetic average roughness of the surface of the polarizing film 31, respectively, were prepared as the LCD 3. On the other hand, the arithmetic average roughness (JIS B0601-1994) of the surface of the polarizing film 37 of all the five types of LCDs was 0.01 μm and the maximum height (JIS B0601-1994) thereof was 0.5 μm. The arithmetic average roughness of the surface of the polarizing film 31 of the prepared five types of LCDs 3 was 1 μm, 0.6 μm, 0.2 μm, 0.05 μm and 0.01 μm, respectively.

A film for instant photographs "instax mini" (manufactured by Fuji Photo Film Co., Ltd.) and a film pack therefor were used as the photosensitive film 4 and the film case 51, and clarity of a transfer image was checked while changing a distance between the photosensitive surface of the photosensitive film 4 and the image display surface of the LCD 3. Note that, although an image of high clarity is obtained as the distance between the photosensitive surface of the photosensitive film 4 and the image display surface of the LCD 3 is reduced, since the photosensitive film 4 tends to be closely attached to the image display surface of the LCD 3, the photosensitive surface of the photosensitive film 4 and the image display surface of the LCD 3 cannot be brought closer than necessary. In addition, the photosensitive surface of the photosensitive film 4 cannot be brought closer to the image display surface of the LCD 3 than a predetermined distance depending upon a height of an edge of the film pack of the above-mentioned "instax mini".

In the case of the LCD with the polarizing film 31, whose surface had the arithmetic average roughness of 1 μm, a clear image could not be obtained even in the case in which the image display surface of the LCD and the photosensitive surface of the photosensitive film 4 were brought closest to each other, that is, the distance between them was 2 mm.

On the other hand, in the case of the LCD with the polarizing film 31, whose surface had the arithmetic average roughness of 0.6 μm, a clear image could be obtained even if the distance between the image display surface of the LCD and the photosensitive surface of the photosensitive film 4 was set to 2.5 mm.

Moreover, in the case of the LCD with the polarizing film 31, whose surface had the arithmetic average roughness of 0.2 μm, 0.05 μm and 0.01 μm, a clear image could be obtained even if the distance between the image display surface of the LCD and the photosensitive surface of the photosensitive film 4 was set to 3.0 mm.

From the above results, in a practical aspect of using a film pack, as a preferable form of the polarizing film 31, the arithmetic average roughness of the smooth surface is preferably not more than 0.6 μm, and more preferably not more than 0.2 μm.

On the other hand, the smooth surface of the above-mentioned polarizing film with the arithmetic average roughness of 0.6 μm had the maximum height of 10 μm in the surface roughness, and the smooth surface of the above-mentioned polarizing film with the arithmetic average roughness of 0.2 μm had the maximum height of 4 μm in the surface roughness.

Consequently, in a practical aspect of using a film pack, as a preferable form of the polarizing film 31, the maximum height in the surface roughness of the smooth surface is preferably not more than 10 μm, and more preferably not more than 4 μm.

Note that there are no particular limitations regarding a digitally-recorded image (digital image data) to be used in the image transfer apparatus of the present invention. It may be, for example, a digitally-recorded image that is read by a scanner or the like from a transparent original such as a photograph film, e.g., a negative film or a reversal film, or a reflection original such as a photograph.

The image transfer apparatus in accordance with the second aspect of the present invention is basically constituted as described above.

Now, an image transfer apparatus in accordance with the third aspect of the present invention will be described with reference to FIGS. 12 to 25.

Figure 12:
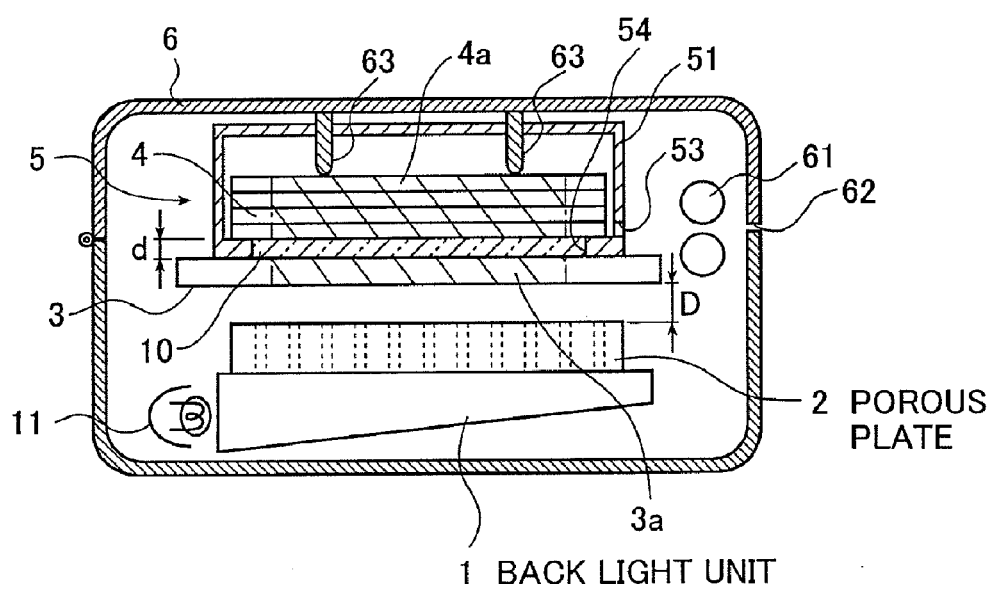
FIG. 12 is a schematic side sectional view showing an image transfer apparatus in accordance with the first embodiment of the third aspect of the present invention.
Figure 13:
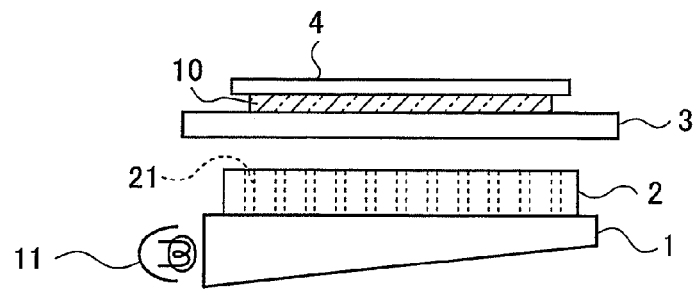
FIG. 13 is a schematic sectional view showing a main part of the image transfer apparatus in accordance with the first embodiment of this aspect of the present invention.

FIG. 12 is a schematic side sectional view showing an image transfer apparatus in accordance with the first embodiment of the third aspect of the present invention. FIG. 13 is a schematic sectional view showing a main part of the image transfer apparatus in accordance with the first embodiment of the third aspect of the present invention shown in FIG. 12. Note that the film case 51 is not shown in FIG. 13.

Here, the image transfer apparatus of the third aspect of the present invention shown in FIGS. 12 and 13 basically has the same structure as the image transfer apparatus of the second aspect of the present invention shown in FIGS. 7 and 8 except that a transparent member 10 is arranged between the LCD 3 and the photosensitive film 4 instead of the structure in which the outermost layer of the polarizing film 31 of the LCD 3 on the photosensitive film 4 side is comprised of a homogeneous material and its surface is formed of the protective film 31a having the smooth surface that is not matted. Thus, identical components are denoted by the identical reference symbols, and detailed descriptions of such components will be omitted and differences will be mainly described.

As shown in FIGS. 12 and 13, the image transfer apparatus of the third aspect of the present invention is constituted by a back light unit 1 serving as source, a porous plate 2 for generating substantially parallel rays, an LCD (liquid crystal display) 3 for displaying a digitally-recorded image, a film case 51 for accommodating a photosensitive film 4 serving as a photosensitive recording medium, a transparent member 10 to be arranged between the LCD 3 and the photosensitive film 4, and a main body case 6 for containing these back light unit 1, porous plate 2, LCD 3 and film case 51. Note that the LCD 3 corresponds to an image display device in the present invention. The film case 51 is provided with an outlet 53 on one side in a longitudinal direction of the photosensitive film 4. In addition, an opening portion 54 is formed on a surface of the film case 51 opposed to the LCD 3. Note that a shaded portion with oblique lines of the photosensitive film 4 shown in FIG. 12 indicates an area of the photosensitive film 4 on which an image should be formed (image forming area) 4a, and a shaded portion with oblique lines in the LCD 3 indicates an image display area (image display surface) 3*a* of the LCD 3.

Here, the porous plate 2, the LCD 3, the transparent member 10 and the photosensitive film 4 are arranged in series along a direction in which light from the back light unit 1 advances, and the image display area 3*a* (image display surface) of the LCD 3 and the image forming area 4*a* (photosensitive surface or recording surface) of the photosensitive film 4 are opposed to each other. The LCD 3 and the film case 51 are closely attached to each other. The transparent member 10 is provided between the image display surface of the LCD 3 and the recording surface of the photosensitive film 4 so as to coincide with the opening portion 54. The transparent member 10 assumes a substantially rectangular parallelepiped shape (plate shape) and is larger than the image display area 3*a* of the LCD 3 and larger than the opening portion 54 of the film case 51. A refractive index of this transparent member 10 is higher than that of the air. That is, the refractive index of the transparent member 10 is larger than 1. The transparent member 10 may be in contact with the photosensitive film 4 or may be spaced apart therefrom. In the case in which the transparent member 10 is in contact with the photosensitive film 4, if the transparent member 10 is comprised of, for example, glass or hard plastic, the surface of the transparent member 10 is not flawed even if the transparent member 10 and the photosensitive film 4 are rubbed.

The transparent member 10 is comprised of, for example, glass or a transparent resin. Examples of the glass include silica glass, soda lime glass, borosilicate glass, lead glass, and fluoride glass. In addition, examples of the transparent resin include polytetrafluoroethylene, poly-4-methylpenten-1, polymetyle methacrylate, polyvinyl alcohol, diethylene glycol bisallyl carbonate polymer, polycyclohexyl methacrylate, polyethylene, polyacrylonitrile, nylon 6, polybenzyl methacrylate, styrene-acrylonitrile copolymer, polyphenyl methacrylate, polydiallyl phthalate, polystyrene, polyvinyl chloride, polyvinyl naphthalene, and polyvinyl carbazole. In addition, in order to reduce chromatic aberration at the time when light is transmitted through the transparent member 10, a material with a large Abbe number is preferable. In this embodiment, the Abbe number is preferably not less than 30, and more preferably not less than 50. Moreover, a material with a small birefringent index is also more preferable. Note that, in this aspect of the present invention, "transparent" includes "colorless transparent", "colored transparent", "semitransparent" and the like. A colored transparent plate corresponding to a color of light irradiated by the light source 11 may be selected. Preferably, a colorless transparent plate is used.

Note that, if the photosensitive film 4 can be exposed in a short time with an amount of light for a display image of the LCD 3 that uses light emitted from the back light unit 1 as transmitted light, the porous plate 2 may not be arranged.

Note that, although the illuminating surface (light emitting surface) of the back light unit 1 in the illustrated example can be constituted in a size identical with the size of the image display area 3*a* of the LCD 3 or the photosensitive surface or image forming area 4*a* of the photosensitive film 4, the size of the light emitting surface of the back light unit 1 is not limited to this but may be slightly larger than the size of the image display area 3*a* of the LCD 3 or the photosensitive surface or image forming area 4*a* of the photosensitive film 4.

As the porous plate 2 used in this embodiment, the same porous plate 2 used in the second aspect can be basically used. Similarly, the porous plate 2 is a substantially parallel rays generating element that, if necessary, is arranged between the back light unit 1 and the LCD 3 and is used for making light from the back light unit 1 into substantially parallel rays (including parallel rays) to make the light entering the LCD 3 as parallel as possible, in which the large number of through-holes 21 of a predetermined size are provided in a rectangular plate of a predetermined thickness at a predetermined pitch such that, for example, a position of a vertex of a triangle becomes a center of each of the through-holes 21 as shown in FIG. 3A. A distance between edge portions of the respective through-holes 21 is 0.1 mm.

In the LCD 3 used in this embodiment, at least the total thickness t of the substrate 32 and the polarizing film 31 on the photosensitive film 4 side is desirably as thin as possible and desirably not more than 1.0 mm. Reasons for this will be described.

This condition of the total thickness corresponds to suppressing diffusion of light in a section from the back light unit 1 to the LCD 3. This leads to a result that a clearer transfer image can be obtained even if the LCD 3 and the photosensitive film 4, strictly speaking, the display surface of the LCD 3 and the photosensitive surface of the photosensitive film 4 are held in a non-contact state.

That is, in the image transfer apparatus in accordance with this aspect of the present invention, although the transparent member 10 is provided, the display surface of the LCD 3 and the photosensitive surface of the photosensitive film 4 are spaced apart from each other by a predetermined distance and held in the non-contact state. This condition of holding them in the non-contact state is a condition necessary for achieving the better usefulness and realizing an apparatus being actually easy to handle with a simple structure. However, this arrangement is rather disadvantageous from the viewpoint of obtaining a clear transfer image since it facilitates diffusion of light between the display surface of the LCD 3 and the photosensitive surface of the photosensitive film 4. Thus, in the present invention, the disadvantage due to the above-mentioned non-contact state (increase in diffusion of light) is suppressed by providing the transparent member 10 with a refractive index larger than one (refractive index higher than that of the air). Moreover, the disadvantage is recovered by the above-mentioned condition for the total thickness and an advantage of setting the thickness of the porous plate 2 not less than three times the diameter or the equivalent diameter of the through-holes 21.

Moreover, as described above, the LCD 300 with the thickness of approximately 2.8 mm is used in the conventional transfer apparatus shown in FIG. 42. As shown in FIG. 42, the LCD 300 is constituted by the two polarizing plates 301 and 305, the two substrates 302 and 304, and the liquid crystal layer 303 that is held by them. Although not disclosed in JP 11-242298 A, in general, since a thickness of a liquid crystal layer itself is defined as approximately 0.005 mm (see "Color TFT liquid crystal display" p207, published by Kyoritsu Shuppan), a thickness of one substrate 301 (305) and one polarizing plate 302 (304) on one side is considered to be approximately 1.3 mm to 1.4 mm.

Here, since a degree of diffusion of light is proportional to a distance, it is assumed that, when the above-mentioned thickness 1.3 mm to 1.4 mm is reduced to half, the degree of diffusion is also reduced to half, and the value of "expansion by approximately 0.09 mm for one side" described in the section of the related art is reduced to half of it, that is, approximately 0.04 mm to 0.05 mm. However, with the degree of diffusion in this order, overlapping of adjacent dots occurs in an LCD having a fine dot size such as the latest UXGA or XGA as described in the section of the related art.

That is, if the degree of diffusion is simply reduced to approximately 0.04 mm to 0.05 mm, overlapping of dots occurs, blurring of colors due to this arrangement is generated, and only an unclear image can be obtained. However, the inventors have found that, by reducing the total thickness of the substrate 32 and the polarizing film 31 on one side of the LCD 3 at least on the photosensitive film 4 side to not more than 1.0 mm as described in the above-mentioned US 2002-0067440 A (U.S. Ser. No. 09/972,964), blurring of colors due to overlapping of dots is eliminated and a clear transfer image can be obtained even in an LCD having a fine dot size such as UXGA or XGA. Moreover, as described above, by providing the transparent member 10 having a refractive index of more than one between the photosensitive film 4 and the LCD 3, a diffusion angle of light passing through the transparent member 10 is reduced according to a refractive index. The inventors have found that spread of an image can be further prevented by an amount of decrease in this diffusion angle. In addition, of light scattered on the surface of the LCD 3, light with an angle smaller than a critical angle of the transparent member 10 is not allowed to enter the photosensitive film 4. Thus, only a light component in a direction necessary for exposure and printing can be allowed to enter the photosensitive film 4. Consequently, in the LCD 3 having a fine dot size such as UXGA or XGA, blurring of colors due to overlapping of dots is further eliminated and a clear transfer image is obtained compared with the LCD 3 that has the equal distance between the LCD 3 and the photosensitive film 4 and does not have the transparent member 10.

In this embodiment, the image transfer apparatus is also constituted such that the photosensitive surface of the photosensitive film 4 is arranged on the display screen of the LCD 3 with a predetermined gap apart therefrom.

Further, in this embodiment, in the case in which the film pack 5 accommodating a plurality of photosensitive films 4 in the detachable film case 51 is used as it is, for example, an opening area of the opening portion 54 of the film case 51 is set larger than the image forming area 4a of the photosensitive film 4. It goes without saying that an area defined by an outward configuration of the LCD 3 is larger than the image display area 3a of the LCD 3. In this embodiment, the image display area 3a of the LCD 3 is preferably the same as the image forming area 4a of the photosensitive film 4. In this case, a size relationship among sizes of respective portions is as follows: the image forming area 4a of the photosensitive film 4≦the size of the transparent member 10≦the opening area of the opening portion 54 of the film pack 5. Usually, the area defined by the outward configuration of the LCD 3 is larger than the opening area of the opening portion 54 of the film pack 5. However, it is extremely preferable that the opening area of the opening portion 54 of the film pack 5 is larger than the area defined by the outward configuration of the LCD 3.

Moreover, in the transfer apparatus of this aspect of the present invention, as described before, again, based on the condition required for realizing an apparatus being actually easy to handle, the LCD 3 and the photosensitive film 4, strictly speaking, the display surface of the LCD 3 and the photosensitive surface of the photosensitive film 4 are spaced apart from each other by a predetermined distance in a non-contact state. In this aspect of the present invention, from the viewpoint of obtaining a clear transfer image, the disadvantage of increase in diffusion of light due to this arrangement is recovered by the advantage of suppression of diffusion of light by providing the transparent member 10 with a refractive index larger than one between the above-mentioned LCD 3 and the photosensitive film 4. Examples of the above-mentioned advantage of suppression of diffusion of light further include suppressing diffusion of light by setting the thickness of the porous plate 2 not less than three times the diameter or equivalent diameter of the through-holes 21. In addition, examples of the advantage also include suppressing diffusion of light by regulating the total thickness t of the substrate 32 and the polarizing film 31 on the photosensitive film 4 side of the LCD 3. Consequently, even if the LCD 3 and the photosensitive film 4 are spaced apart from each other by a predetermined distance, a clearer transfer image can be obtained.

In addition, in this embodiment, the thickness of the transparent member 10 is the same as the distance between the image display surface of the LCD 3 and the recording surface of the photosensitive film 4. However, the thickness of the transparent member 10 is not limited to this but may be any thickness ranging from a thickness that is 0.01 mm thinner than the distance between the image display surface of the LCD 3 and the recording surface of the photosensitive film 4 to a thickness that is approximately half of the distance between the image display surface of the LCD 3 and the recording surface of the photosensitive film 4. Note that the LCD 3 and the photosensitive film 4 are not required to be spaced apart from each other more than necessary. If the LCD 3 and the photosensitive film 4 are spaced apart from each other, the thickness of the image transfer apparatus increases so much more for that. In addition, in the case in which the LCD 3 and the photosensitive film 4 are brought close to each other, the transparent member 10 becomes unnecessary because blurring of an image is reduced. Thus, the thickness of the transparent member 10 is preferably set to 0.1 mm to 5 mm, and more preferably 0.5 mm to 3 mm.

In the transfer apparatus in accordance with this aspect of the present invention, the distance between (the image display surface of) the LCD 3 and (the photosensitive surface of) the photosensitive film 4 is also preferably 0.01 mm to 3 mm, and more preferably 0.1 mm to 3 mm. This is because, as described above, although this arrangement is rather disadvantageous from the viewpoint of obtaining a clear transfer image, it is a condition necessary for realizing an apparatus being actually easy to handle, and the disadvantage due to this arrangement can be compensated by an advantage of the suppression of light diffusion generated by providing, for example, a glass plate as the transparent member 10 between the above-mentioned LCD 3 and photosensitive film 4. Moreover, the effect can be further increased by regulating the thickness of the porous plate 2 and the LCD 3.

Figure 14:
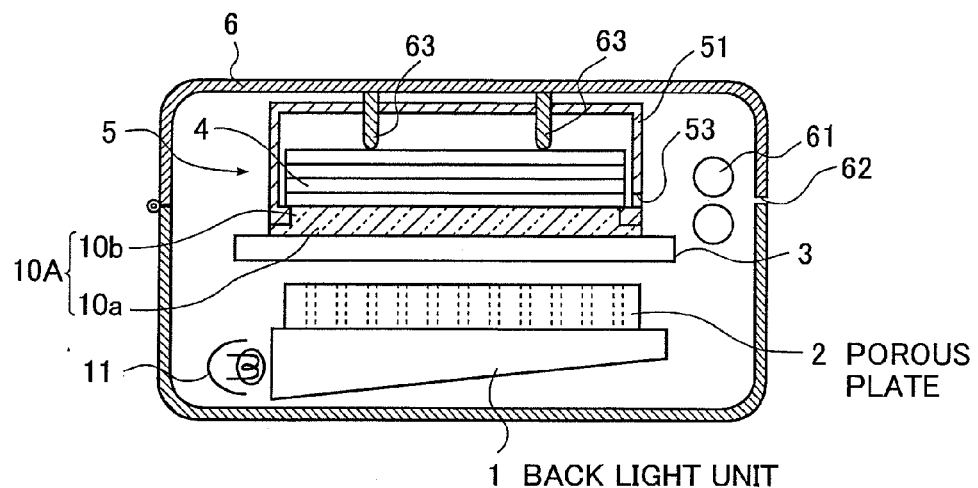
FIG. 14 is a schematic sectional view showing the first example of modification of the image transfer apparatus in accordance with the first embodiment of this aspect of the present invention.
Figure 15:
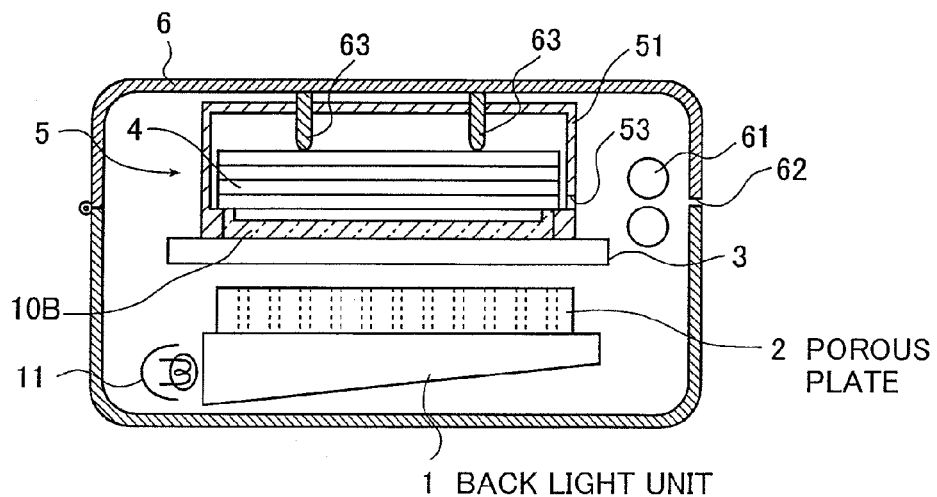
FIG. 15 is a schematic sectional view showing the second example of modification of the image transfer apparatus in accordance with the first embodiment of this aspect of the present invention.
Figure 16:
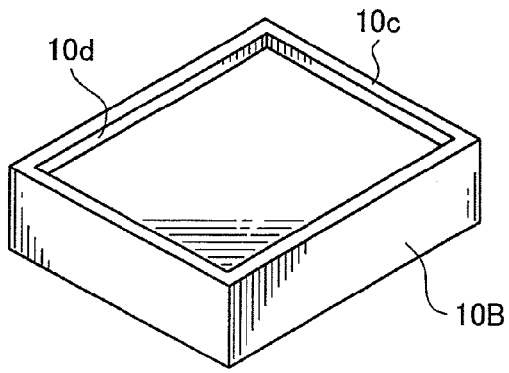
FIG. 16 is a perspective view showing a transparent member used in the image transfer apparatus shown in FIG. 15.

FIG. 14 is a schematic sectional view showing the first example of modification of the image transfer apparatus of the first embodiment of this aspect of the present invention. FIG. 15 is a schematic sectional view showing the second example of modification of the image transfer apparatus of the first embodiment of this aspect of the present invention. FIG. 16 is a perspective view showing a transparent member used in the image transfer apparatus of the second example of modification shown in FIG. 15.

In this embodiment, as the shape of the transparent member 10, in addition to the rectangular parallelepiped shape (plate shape), as shown in FIG. 14, the transparent member may be a transparent member 10A of a convex shape in its cross section, in which a projected portion 10b matching the opening portion 54 is formed on an upper surface of a base portion 10a of the same size as the film case 51. In the transparent member 10A, its projected portion 10b is fit in the opening portion 54, and the edge of the base portion 10a is in contact with the film case 51. The LCD 3 is arranged below the transparent member 10A. In this case, the film case 51 and the LCD 3 are spaced apart from each other.

In addition, in this embodiment, as shown in FIGS. 15 and 16, the transparent member may be a transparent member 10B in which a concave portion 10d is formed on an upper surface 10c of a rectangular parallelepiped opposed to the photosensitive film 4. In this case, the film case 51 and the LCD 3 are in contact with each other. In this way, the concave portion 10d is formed on the upper surface 10c opposed to the photosensitive film 4, whereby, even in the case in which the photosensitive film 4 is mounted on the surface of the transparent member 10B, the transparent member 10B and the photosensitive film 4 are in contact with each other only on an outer edge of the image forming area 4a. Thus, the image forming area 4a of the photosensitive film 4 is less likely to be flawed, which is more preferable.

The main body case 6 is a case for containing the respective components of the above-mentioned embodiment, that is, the back light unit 1, the porous plate 2, the LCD 3, the transparent member 10, the film pack 5 (or the film case 51), a pair of rollers 61 for transferring a film which has undergone exposure and for developing processing liquid, and the like.

Moreover, in this embodiment, an image supplied from the digital image data supply section is displayed on the LCD 3. Subsequently, the rod type lamp 11 is turned on to cause substantially parallel rays through the porous plate 2 to perpendicularly enter the display surface of the LCD 3. Then, the image displayed on the LCD 3 is exposed and printed on the photosensitive film 4. Consequently, a transfer image is formed on the photosensitive film 4.

Figure 17:
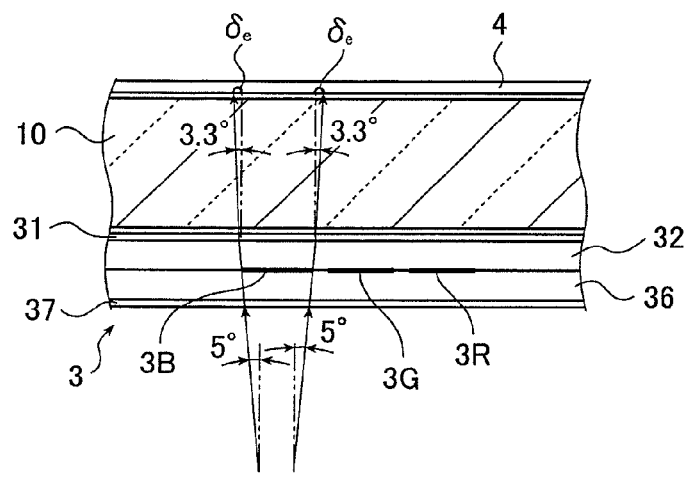
FIG. 17 is a schematic view illustrating an effect of the image transfer apparatus in accordance with an embodiment of this aspect of the present invention.
Figure 18:
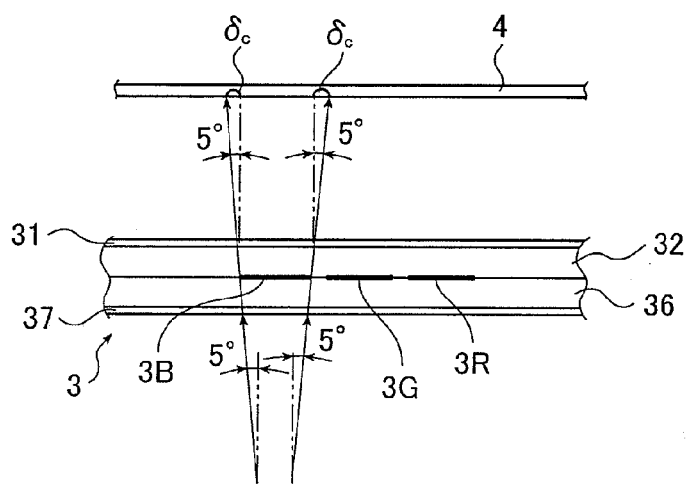
FIG. 18 is a schematic view showing the image transfer apparatus in accordance with an embodiment of this aspect of the present invention without a transparent member.

FIG. 17 is a schematic view illustrating an effect of the image transfer apparatus in accordance with the embodiment of the third aspect of the present invention. FIG. 18 is a schematic view showing the image transfer apparatus in accordance with the embodiment of this aspect of the present invention without a transparent member. The LCD 3 shown in FIGS. 17 and 18 is constituted such that a liquid crystal layer (not shown) is held by the glass substrates 32 and 36 to the surfaces of which the polarizing films 31 and 37 are attached. A plurality of sets of a red pixel 3R, a green pixel 3 G and a blue pixel 3B are provided in this LCD 3. Further, in FIGS. 17 and 18, only one set of a red pixel 3R, a green pixel 3G and a blue pixel 3B is shown.

As shown in FIG. 17, a case in which the LCD 3 and the photosensitive film 4 are arranged with a gap of 3 mm and a glass plate having a thickness substantially the same as this gap and a refractive index n of 1.5 is provided will be described. When a diffusion angle (i.e., angle of incidence on an object of high refractive index) on the surface of the LCD 3 is assumed to be θ and a diffusion angle in the object of high refractive index is assumed to be γ, the refractive index n is represented by the following expression (1). When a spread amount by the diffusion angle γ on the surface of the photosensitive film 4 is assumed to be δ, the spread amount δ is represented by the following expression (2).

$$\sin\gamma = \sin\theta/n \quad (1)$$

$$\delta = d \times \tan\gamma \quad (2)$$

In the above expression (2), d is a distance between the surface of the LCD 3 and the surface of the photosensitive film.

When diffused light spreading by, for example, 5° with respect to a direction perpendicular to the rear surface of the LCD 3 shown in FIG. 17 is caused to enter the blue pixel 3B of the LCD 3, of emitted light emitted from the surface of the LCD 3, light travelling toward the photosensitive film 4 from the surface of the LCD 3 is refracted by the transparent member 10 and a diffusion angle of the light from the surface of the LCD 3 is 3.3° according to expression (1). In this case, the spread amount δ=δe by the diffusion angle on the surface of the photosensitive film 4 is 0.17 mm according to expression (2). That is, an image is transferred with the size of the blue pixel 3B diffused by 0.34 mm in total. In this case, refraction in the LCD 3 and refraction by the gap between the transparent member 10 and the photosensitive film 4 and the gap between the transparent member 10 and the LCD 3 are to be neglected. In the example shown in FIG. 9, an image obtained by irradiating diffused light with the diffusion angle of 5° on the LCD 3 using the porous plate 2 with a hole diameter of 0.5 mm and a plate thickness of 5.75 mm and the transparent member 10 with the refractive index n of 1.5 was satisfactory from the practical point of view.

On the other hand, as shown in FIG. 18, a case in which the LCD 3 and the photosensitive film 4 are arranged with a gap of 3 mm and the transparent member 10 is not provided will be described. In the case in which substantially parallel rays with the diffusion angle of 5° enter the rear surface of the LCD 3 as described above, a diffusion angle of emitted light emitted from the surface of the LCD 3 does not change according to expression (1). In this case, the spread amount δ=δc by the diffusion angle on the surface of the photosensitive film 4 is 0.26 mm according to expression (2). That is, an image is transferred with the size of the blue pixel 3B diffused by 0.52 mm in total.

In this way, the transparent member 10 having the refractive index larger than one is provided, whereby a clear image can be obtained even if a diffusion angle of light entering the LCD 3 is a little too large. Note that, of light entering the LCD 3, incident light with an angle less than a critical angle of the glass substrate 3b of the LCD 3 cannot be emitted from the surface of the LCD 3. This also occurs in the transparent member 10. Thus, in this aspect of the present invention, in the case in which substantially parallel rays are caused to enter the LCD 3, influence of a diffusion angle of the substantially parallel rays can be suppressed and influence of scattered light by the LCD 3 can be reduced to cause the substantially parallel rays to enter the photosensitive film 4 compared with the case in which the transparent member 10 is not provided. In addition, in this aspect of the present invention, the transparent member 10 is provided, whereby the same effect as bringing the LCD 3 and the photosensitive film 4 close to each other in the case in which the transparent member 10 is not provided is realized. In the example shown in FIG. 17, the distance between the LCD 3 and the photosensitive film 4 is approximately 2 mm when it is made into a distance in the case in which the transparent member 10 is not provided. Note that the thickness of the transparent member 10 only has to be adjusted appropriately according to a resolution of the LCD 3.

From these facts, in this embodiment, in order to obtain an image quality equivalent to that in the case in which the transparent member 10 is not provided, a diffusion angle of substantially parallel rays may be slightly larger compared with the case in which the transparent member 10 is not provided. Consequently, a hole diameter of the through-holes 21 of the porous plate 2 can be enlarged or a plate thickness of the porous plate 2 can be reduced.

Moreover, in the example shown in FIG. 17, the hole diameter may be set to 0.75 mm in order to obtain an image having an image quality equivalent to that in the example shown in FIG. 18. Consequently, rigidity of pins for a mold used in molding the porous plate 2 can be increased. Therefore, breakage of the pins and the like is reduced significantly when the porous plate 2 is molded. Moreover, since the number of holes is reduced, the number of pins is also reduced, whereby a mold can be manufactured inexpensively.

In addition, for example, the effect of this embodiment can be confirmed as described below using the image transfer apparatus shown in FIG. 12. First, a digitally-recorded image displayed on the LCD 3 is recorded on the photosensitive film 4 to obtain a recorded image while changing a distance d between the LCD 3 and the photosensitive film 4, that is, changing the thickness of the transparent member 10. In addition, using the transfer apparatus shown in FIG. 12 with the transparent member 10 removed, a digitally-recorded image displayed on the LCD 3 is recorded on the photosensitive film 4 to obtain a recorded image while changing the distance d between the LCD 3 and the photosensitive film 4.

Note that, as the transparent member 10, a lead glass plate (refractive index n=1.48) and a high refractive index glass plate (refractive index n=1.80) are used. As the porous plate 2, a porous plate in which circular through-holes 21 with a diameter of 0.5 mm are provided at a pitch of 0.7 mm (represented by a thickness of a partition wall here; see FIG. 3A) in a close-packed state is used, which is subjected to blackening processing. Note that the thickness of the porous plate 2 is assumed to be 6 mm, and a distance D from the upper surface of the porous plate 2 to the LCD 3 is assumed to be 4 mm. In addition, in the above-mentioned respective transfer tests, a lighting time of a light source is adjusted such that densities of obtained transfer images are substantially identical.

When it was evaluated with what distance (mm) between the photosensitive film 4 and the LCD 3, in the case in which the transparent member 10 was not provided, an image in the same degree of clarity as an image obtained using the transparent member 10 of a predetermined thickness was obtained, results as shown in table 1 below were obtained. As the transparent member 10, a transparent member having a thickness substantially equal to the distance between the photosensitive film 4 and the LCD 3 is used.

the upper surface of the glass plate and the photosensitive film 4 are 0.2 mm and 1.5 mm, respectively), clarity of an image in the case in which the thickness of the glass plate is 2.8 mm is in the same degree as an image quality in the case in which the photosensitive film 4 and the LCD 3 are simply spaced apart by 1 to 2 mm. In addition, clarity of an image in the case in which the thickness of the glass plate is 1.5 mm is in the same degree as an image quality in the case in which the photosensitive film 4 and the LCD 3 are simply spaced apart by 2 mm.

Next, the second embodiment of the third aspect of the present invention will be described.

Figure 19:
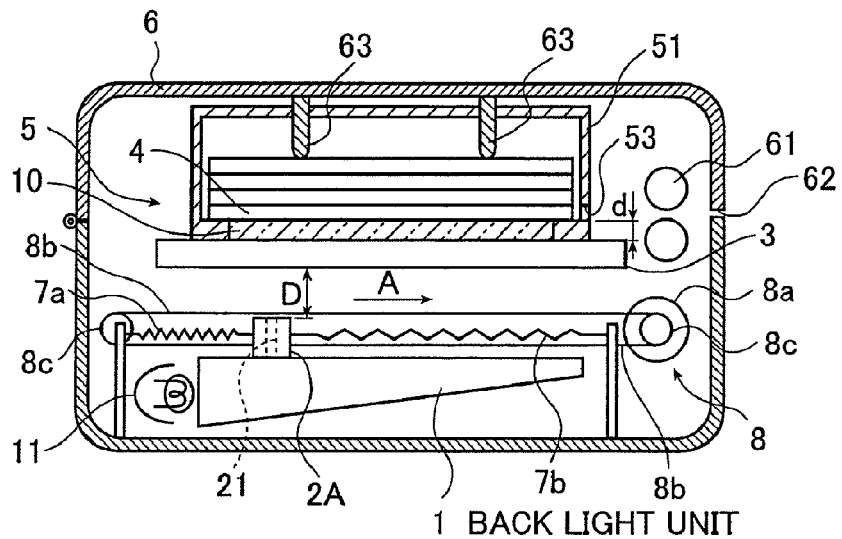
FIG. 19 is a schematic sectional view showing an image transfer apparatus in accordance with the second embodiment of this aspect of the present invention.
Figure 20:
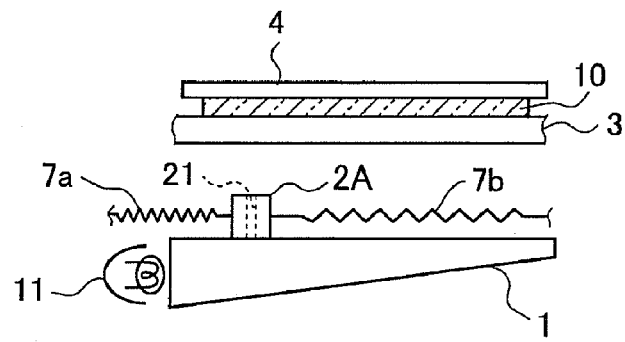
FIG. 20 is a schematic sectional view showing a main portion of the image transfer apparatus in accordance with the second embodiment of this aspect of the present invention.

FIG. 19 is a schematic sectional view showing an image transfer apparatus in accordance with the second embodiment of this aspect of the present invention. FIG. 20 is a schematic sectional view showing a main part of the image transfer apparatus shown in FIG. 19. In this embodiment, components identical with those in the first embodiment shown in FIGS. 12 to 18 are denoted by the identical reference symbols, and detailed descriptions of such components will be omitted.

Figure 21A:
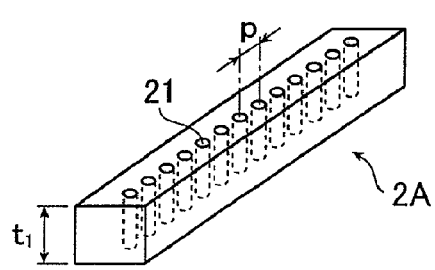
FIG. 21A is a perspective view showing a porous plate used in the image transfer apparatus of the second embodiment of this aspect of the present invention.

Compared with the first embodiment, this embodiment is the same as the first embodiment except that a porous plate 2A shown in FIG. 21A does not correspond to an entire surface of an image display area and is a porous plate in which the through-holes 21 are formed in one row, and a moving device for moving the porous plate 2A in a direction A perpendicular to an arrangement direction of the through-holes 21 is provided. The porous plate 2A can be moved along one side of the LCD 3 on the upper side of the emission surface of the back light unit 1 by the moving device 8. In front of and behind in the moving direction of the porous plate 2A, light shielding masks (films) 7a and 7b for shielding light other than light from the through-holes 21 of the porous plate 2A are provided. In addition, in FIG. 19 and FIG. 20 although the porous plate 2A and the back light unit 1 are in contact with

TABLE 1

| Distance d between an LCD element and a photosensitive film (mm) | Transparent member is provided (n = 1.48) | Transparent member is provided (n = 1.80) |
| --- | --- | --- |
| 0.5 | Close to contact in the case in which the transparent member is not provided | Close to contact in the case in which the transparent member is not provided |
| 1.0 | Equivalent to 0.5 mm in the case in which the transparent member is not provided | Equivalent to 0.5 mm in the case in which the transparent member is not provided |
| 2.0 | Equivalent to 1.0 mm in the case in which the transparent member is not provided | Equivalent to 0.5 mm in the case in which the transparent member is not provided |
| 3.0 | Equivalent to 1.0 to 2.0 mm in the case in which the transparent member is not provided | Equivalent to 1.0 mm in the case in which the transparent member is not provided |
| 4.0 | Equivalent to 2.0 mm in the case in which the transparent member is not provided | Equivalent to 1.0 to 2.0 mm in the case in which the transparent member is not provided |

As is seen from the above table 1, clarity of an image in the case in which the transparent member 10 is provided is in the same degree as an image that is obtained when the distance between the photosensitive film 4 and the LCD 3 is reduced to ½ to ⅓ compared with the case in which the transparent member 10 is not provided. In addition, in the case in which the distance d between the photosensitive film 4 and the LCD 3 is assumed to be 3 mm, glass plates (refractive index n=1.48) with thickness of 2.8 mm and 1.5 mm are inserted as the transparent member 10, and the transfer test is performed in the same manner as described above (the distances between each other, the porous plate 2A and the back light unit 1 are not necessarily in contact with each other in this embodiment.

Figure 21B:
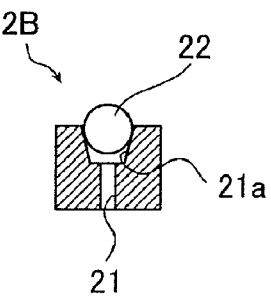
FIG. 21B is a schematic sectional view showing an example of modification of the porous transfer apparatus of the second embodiment of this aspect of the present invention.

FIG. 21A is a perspective view showing a porous plate used in the image transfer apparatus of the second embodiment of this aspect of the present invention. FIG. 21B is a schematic sectional view showing an example of modification of the porous plate used in the image transfer apparatus of the second embodiment of this aspect of the present invention. The porous plate 2A used in this embodiment is a light linearizing device that is arranged between the back light unit 1 and the LCD 3, and makes light from the back light unit 1 into substantially linear and parallel rays and makes the light enter the LCD 3 as parallel as possible to cause the light to perpendicularly enter the LCD 3. As shown in FIG. 21A, a large number of through-holes 21 of a predetermined size are provided in one row at a predetermined pitch on a rectangular plate of a predetermined thickness. Note that the through-holes 21 may be provided in a plurality of rows.

Note that, in the present invention, the light linearizing device has a function of making light from a light source into linear and substantially parallel rays to cause the light to perpendicularly enter a transmission type image display device and emits linear light having a predetermined length in a direction perpendicular to a moving direction (longitudinal direction) of this light linearizing device (scanning direction of a screen of a transmission type LCD).

Here, the light linearizing device may be of any type as long as it has the above-mentioned function. Taking into account the ease of production, it is preferable that it is formed as, as shown in FIG. 21A, a so-called "columnar porous plate" that has a large number of through-holes 21 arranged at least in one row along the longitudinal direction, and has a predetermined thickness and is small in width and thin (narrow and long).

In addition, in this embodiment, as in the first embodiment, the distance between the porous plate 2A and the LCD 3 is set at preferably 0.05 mm to 10 mm, and more preferably 0.1 mm to 5 mm. This measure is taken for the purpose of preventing a pattern of the through-holes 21 of the light linearizing device, typified by the columnar porous plate 2A, from appearing in the form of a "shadow" due to diffused light.

Further, as a material of the porous plate 2A, the same one as in the first embodiment can be used. Moreover, a shape of the through-holes 21 provided in the porous plate 2A can also be set to the same as in the first embodiment.

Figure 22A:
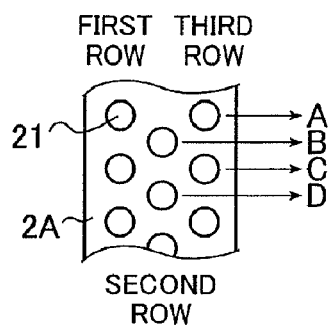
FIGS. 22A, 22B, 22C and 22D are front views showing arrangements of through-holes of the porous plate used in the image transfer apparatus of the second embodiment of this aspect of the present invention.
Figure 22B:
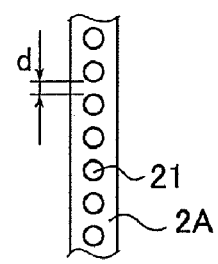
Figure 22C:
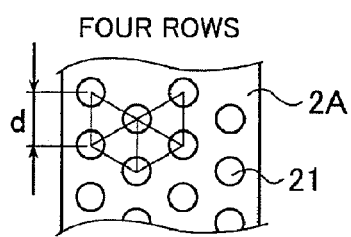
Figure 22D:
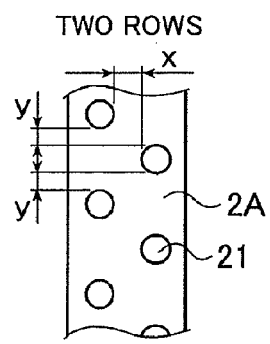

FIGS. 22A, 22B, 22C and 22D are front views showing arrangements of through-holes 21 of the porous plate 2A used in the image transfer apparatus of the second embodiment of this aspect of the present invention. FIG. 22A shows an arrangement in which through-holes are formed in three rows, FIG. 22B shows an arrangement in which through-holes are formed in one row, FIG. 22C shows an arrangement in which through-holes are formed in four rows, and FIG. 22D shows an arrangement in which through-holes are formed in two rows. In addition, there are no limitations regarding the number of rows of through-holes and a shape of arrangement at the time when the plurality of through-holes 21 are arranged in two or more rows. For example, the shape of arrangement may be a lattice shape or a zigzag shape (a close-packed shape), with the zigzag shape being preferable. In addition, the number of rows may be, for example, one or more, but when the through-holes are formed in more than one row and, particularly, in the zigzag arrangement, the number of rows is preferably even for. This is because, in the case of the porous plate 2A having the through-holes 21 in three rows, that is, odd number of rows as shown in FIG. 22A, the LCD 3 is bright because it is illuminated in lines A and C with the light from two through-holes 21 in the first and third rows, but in lines B and D, the LCD 3 is dark because it is illuminated only with the light from one through-hole 21 in the second row. Thus, dark streaks are formed in lines B and D.

In addition, the arrangement pitch p of the plurality of through-holes 21 provided in the porous plate 2A (see FIG. 21A) may be any pitch as long as the through-holes 21 are uniformly arranged and the display image of the LCD 3 can be clearly transferred to the photosensitive film 4. It may be set appropriately in accordance with the size of the through-holes 21 or the like. For example, the arrangement pitch p is preferably as small as possible.

Note that, in the present invention, there are no particular limitations regarding the distance d between the adjacent two through-holes 21. The distance is more important than the arrangement pitch p and the size of the through-holes 21. This is because, if the distance d between the adjacent two through-holes 21 is increased, the porous plate 2A is required to be spaced apart from the LCD 3 in order to prevent the pattern of the above-mentioned through-holes 21 from appearing in the form of a "shadow" due to the diffused light. Therefore, the distance d between the adjacent two through-holes 21 is, for example, preferably not more than 1 mm, more preferably not more than 0.5 mm, and most preferably not more than 0.2 mm in terms of a distance y in the longitudinal direction (arrangement direction). Note that there are no particular limitations regarding the lower limit value of the distance d between the adjacent two through-holes 21. However, the lower limit value of the distance d is preferably not less than about 0.05 mm taking into consideration the ease of production.

Note that the distance d between the adjacent two through-holes 21 in terms of the distance in the longitudinal direction refers to the distance d between the most adjacent two through-holes 21 in the case in which the through-holes 21 are formed in the porous plate 2A in one row as shown in FIG. 22B, or when the through-holes 21 are formed in more than one row (four rows in the illustrated example) in a close-packed shape as shown in FIG. 22C, and refers to the distance y in the longitudinal direction between the two through-holes 21 which are most adjacent when the light is projected from the direction perpendicular to the longitudinal direction in the case in which the through-holes 21 are arranged in more than one row (two rows in the illustrated example) in a zigzag shape as shown in FIG. 22D. Note that, a distance x in the direction perpendicular to the longitudinal direction in the case of the zigzag shape as shown in FIG. 22D has a larger tolerance than the distance y mentioned above. For example, the distance x is preferably not more than 2 mm, more preferably not more than 1 mm, and yet more preferably not more than 0.5 mm. As mentioned above, the distances x and y do not have to be set at similar values in the porous plate 2A used in the transfer apparatus of this embodiment. For example, while y may be equal to 0.2 mm, x may be equal to 0.5 mm or 1 mm. Thus, the present invention has an important characteristic that the production is facilitated by the reduction in the constraints on the production.

The thickness $t_1$ of this porous plate 2A (see FIG. 21A) is preferably not less than three times, preferably five times, and more preferably seven times the diameter or equivalent diameter of the through-holes 21. Note that the above-mentioned equivalent diameter is a dimension expressed as "4×area/total-sides-length (or total circumferential length)". The diameter or equivalent diameter of the through-holes 21 of the porous plate 2A is set to not more than 5 mm, and the thickness $t_1$ of the porous plate 2A is set to not less than three times the diameter or equivalent diameter of the through-holes 21 because these conditions are effective in obtaining parallel rays by means of the porous plate 2A.

In addition, of the entire surface of the porous plate 2A, it is preferable to construct at least the inner surfaces of the through holes 21 as low reflectance surfaces, and it is more preferable to construct the entire surface of the porous plate 2A as a low reflectance surface. Here, the low reflectance surface refers to a surface in which a reflectance of incident light is decreased, such as a blackened surface or a roughened surface. There are no particular limitations regarding methods of forming the blackened surface. The methods include, for example, a method of using a material that is black in itself as a material for forming the porous plate 2A, and a method of blackening the surface. Note that black materials include, for example, a material containing 1% or more (preferably 3% or more) of carbon black powder, and a material comprised of hardened carbon powder. Examples of the blackening processing include, for example, painting and chemical processing (plating, oxidization, electrolysis, etc.). On the other hand, there are no particular limitations regarding the roughening processing either. A method may be freely used such as a method of roughening a surface simultaneously with processing holes, or a method of roughening a surface by means of processing performed after a mechanical processing method such as sandblasting or after a chemical processing such as etching. In this case, as a degree to which the surface is roughened, for example, 1 µm to 20 µm in a center line average height is an effective range.

Note that, in this embodiment, the reflectance of at least the inner surface of the through-holes 21 of the porous plate 2A, preferably, the reflectance of the low reflectance surface comprising the entire surface of the porous plate 2A is preferably not more than 2%, and more preferably not more than 1%. This is because, if the reflectance is not more than 2%, the porous plate 2A can absorb effectively scattered light other than parallel rays entering from the back light unit 1, so that only substantially parallel rays (including parallel rays) can be effectively emitted from the back light 1 and allowed to enter the LCD 3.

As described above, the porous plate 2A is positioned between the back light unit 1 serving as the light source and the LCD 3, and is constituted to be movable laterally as seen in FIGS. 19 and 20 (in the longitudinal direction of the back light unit 1) together with the light shielding masks 7a and 7b arranged in front of and behind in the moving direction thereof. The movement of the porous plate 2A is effected for the purpose of shielding light from the back light unit 1 serving as a planar light source other than light from the through-holes 21 of the porous plate 2A and, at the same time, dividing the light linearly into linear light to successively send it to the LCD 3.

Note that the moving device 8 for moving this porous plate 2A includes a motor 8a arranged on the right end side of the back light unit 1 in the figure, a pulley 8c mounted on the motor 8a, another pulley 8c arranged on the left end side of the back light unit 1 in the figure, and an endless belt 8b which is stretched between the pulleys 8c and 8c and to which the longitudinal end portion of the porous plate 2A is attached. Note that it is preferable that, as this moving device 8, a set comprising the endless belt 8b and the pulleys 8c and 8c for stretching the endless belt 8b is mounted by attaching each of the pulleys on the each end of the porous plate 2A in the longitudinal direction, with the two endless belts 8b (only that of one end side is shown) being driven continuously in synchronous with each other.

In addition, a speed at which the porous plate 2A is moved by the moving device 8 varies according to brightness of the back light unit 1 serving as the light source, the size (diameter or equivalent diameter) or pitch of the through-holes 21 of the porous plate 2A, and the like. It is preferable to set the speed to several mm to several hundreds of mm per second.

The moving device 8 used in this embodiment is not limited to the above-described system, in which the end portions of the porous plate 2A in the longitudinal direction are attached to the endless belt 8b, and the endless belt 8b is driven. Any well-known moving system will be adopted such as a system in which the porous plate 2A is secured to a traveling nut and a drive screw threadedly engaged with the traveling nut is driven, or a system in which the porous plate 2A is secured to one end of a wire and the wire is taken up, as long as the system is a conventionally publicly-known moving method.

The light linearizing device used in this embodiment is not limited to the above-described columnar porous plate 2A. It is also possible to use a porous plate 2B as shown in FIG. 21B. In the porous plate 2B shown in FIG. 21B, continuous recesses 21a are provided above the through-holes 21 arranged in one row, and rod lenses 22 are set in the recesses 21a. In this porous plate 2B, light emitted from the through-holes 21 of the porous plate 2B is made into more parallel rays by the function of the rod lens 22.

Moreover, in this aspect of the present invention, instead of the porous plate 2A or 2B, it is also possible to use a slitted plate having a slit by which strip-like slit light can be obtained. However, since the slit cannot reduce scattering of light in a longitudinal direction thereof as a porous plate can do, the porous plate 2A shown in FIG. 21A and the porous plate 2B shown in FIG. 21B are more preferable than the slit plate. However, in the case in which there is little light diffusion component from the light source, or in the case in which the requisite level of clarity is not so high, the slit plate may be used.

Note that a predetermined gap is provided between the LCD 3 and the porous plate 2A. As stated above, this gap is preferably 0.05 mm to 10 mm, and more preferably 0.1 mm to 5 mm. It is preferable that the gap be adjustable to an arbitrary dimension.

In the transfer apparatus of this embodiment, as described above, in order to satisfy the conditions required for realizing an apparatus being actually easy to handle, the LCD 3 and the photosensitive film 4, strictly speaking, the display surface of LCD 3 and the photosensitive surface of the photosensitive film 4 are spaced apart from each other by a predetermined distance in a non-contact state. In this embodiment, from the viewpoint of obtaining a clear transfer image, a disadvantage of increase in light diffusion due to the above arrangement is compensated by an advantage of the suppression of light diffusion by providing the transparent member 10 comprised of transparent glass or film, or the like of a predetermined thickness between the display surface of the LCD 3 and the photosensitive surface of the photosensitive film 4. The above-mentioned advantage of suppression of light diffusion further includes suppressing light diffusion by increasing a ratio of the thickness of the porous plate 2A with respect to the diameter or equivalent diameter of the through-holes 21 of the porous plate 2A not less than three times. Additionally, the advantage also includes suppressing light diffusion by regulating the total thickness t of the substrate 32 and the polarizing film 31 on the photosensitive film 4 side of the LCD 3. Consequently, a clearer transfer image can be obtained even if the LCD 3 and the photosensitive film 4 are spaced apart by a predetermined distance.

The effect of this embodiment can be confirmed as described below using the image transfer apparatus shown in FIG. 19. First, a digitally-recorded image displayed on the LCD 3 is recorded on the photosensitive film 4 to obtain a recorded image while changing a distance d between the LCD 3 and the photosensitive film 4, that is, changing the thickness of the transparent member 10. In addition, using the transfer apparatus shown in FIG. 19 with the transparent member 10 removed, a digitally-recorded image displayed on the LCD 3 is recorded on the photosensitive film 4 to obtain a recorded image while changing the distance d between the LCD 3 and the photosensitive film 4. Note that, as the transparent member 10, the same one as in the above-mentioned first embodiment is used. In addition, as the porous plate 2A, one in which the circular through-holes 21 with the diameter of 0.5 mm are provided linearly at the pitch (p) of 0.7 mm is used, on which blackening processing is performed. Note that the thickness of the porous plate 2A is assumed to be 6 mm, and the distance D from the upper surface of the porous plate 2A to the LCD 3 is assumed to be 4 mm. In addition, the speed at which the porous plate 2A is moved by the moving device 8 is assumed to be 150 mm/sec. Note that, in the above-mentioned respective transfer tests, a lighting time of the light source is adjusted such that densities of transfer images to be obtained would be substantially identical.

When it was evaluated with what distance (mm) between the photosensitive film 4 and the LCD 3, in the case in which the transparent member 10 was not provided, an image in the same degree of clarity as an image obtained using the transparent member 10 of a predetermined thickness was obtained, results as shown in table 2 below were obtained. As the transparent member 10, a transparent member having a thickness substantially equal to the distance between the photosensitive film 4 and the LCD 3 was used.

invention. FIG. 24A is a schematic view showing operation of the image transfer apparatus of this embodiment. FIG. 24B is a schematic view showing an example of modification of operation of the image transfer apparatus of this embodiment. Note that, in this embodiment, components identical with those in the second embodiment shown in FIGS. 19 to 22 are denoted by the identical reference symbols, and detailed descriptions of such components will be omitted.

Compared with the second embodiment, this embodiment is the same as the second embodiment except that a light source and a moving device are different. That is, whereas the image transfer apparatus in accordance with the second embodiment uses the back light unit 1 serving as a planer light source and uses the porous plate 2A serving as a light linearizing device to generate linear and substantially parallel rays, in this embodiment, for example, a straight cold-cathode tube is used as a rod type lamp serving as the linear light source 11a as shown in FIG. 23.

Figure 23:
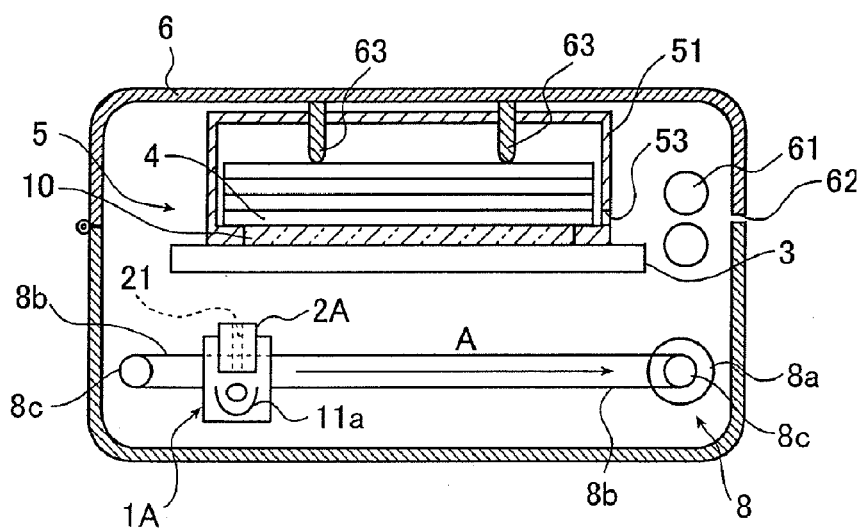
FIG. 23 is a schematic sectional view showing an image transfer apparatus in accordance with the third embodiment of this aspect of the present invention.

The image transfer apparatus of this embodiment shown in FIGS. 23, 24A and 24B has the same structure as the image transfer apparatus of the second embodiment except that the linear light source 11a and the porous plate 2A are integrated

TABLE 2

| Distance d between an LCD element and a photosensitive film (mm) | Transparent member is provided (n = 1.48) | Transparent member is provided (n = 1.80) |
| --- | --- | --- |
| 0.5 | Close to contact in the case in which the transparent member is not provided | Close to contact in the case in which the transparent member is not provided |
| 1.0 | Equivalent to 0.5 mm in the case in which the transparent member is not provided | Equivalent to 0.5 mm in the case in which the transparent member is not provided |
| 2.0 | Equivalent to 1.0 mm in the case in which the transparent member is not provided | Equivalent to 0.5 mm in the case in which the transparent member is not provided |
| 3.0 | Equivalent to 1.0 to 2.0 mm in the case in which the transparent member is not provided | Equivalent to 1.0 mm in the case in which the transparent member is not provided |
| 4.0 | Equivalent to 2.0 mm in the case in which the transparent member is not provided | Equivalent to 1.0 to 2.0 mm in the case in which the transparent member is not provided |

As is seen from the table 2, clarity of an image in the case in which the transparent member 10 is provided is in the same degree as an image that is obtained when the distance between the photosensitive film 4 and the LCD 3 is reduced to ½ to ⅓ compared with the case in which the transparent member 10 is not provided. In addition, in the case in which the distance d between the photosensitive film 4 and the LCD 3 is assumed to be 3 mm, glass plates (refractive index n=1.48) with thickness of 2.8 mm and 1.5 mm are inserted as the transparent member 10, and the transfer test is performed in the same manner as described above (the distances between the upper surface of the glass plate and the photosensitive film 4 are 0.2 mm and 1.5 mm, respectively), clarity of an image in the case in which the thickness of the glass plate is 2.8 mm is in the same degree as an image quality in the case in which the photosensitive film 4 and the LCD 3 are simply spaced apart by 1 to 2 mm. In addition, clarity of an image in the case in which the thickness of the glass plate is 1.5 mm is in the same degree as an image quality in the case in which the photosensitive film 4 and the LCD 3 are simply spaced apart by 2 mm.

Next, the third embodiment of the third aspect of the present invention will be described. FIG. 23 is a schematic sectional view showing an image transfer apparatus in accordance with the third embodiment of this aspect of the present as the linear substantially-parallel-rays generating unit (light source unit) 1A and that the light shielding masks 7a and 7b are not provided.

In the transfer apparatus shown in FIG. 23, the linear substantially-parallel-rays generating unit 1A is a unit formed by integrally combining the linear light source 11a comprising a rod type lamp (e.g., the straight cold-cathode tube) and the columnar porous plate 2A serving as the light linearizing device. It has a function of making light from the linear light source 11a into linear and substantially parallel rays to cause the light to perpendicularly enter the transmission type LCD 3. It emits linear light having a width in a direction perpendicular to the direction (longitudinal direction) in which the linear substantially-parallel-rays generating unit 1A and the transmission type LCD 3 are moved relatively (the scanning direction on the display screen of the transmission type LCD 3).

As shown in FIG. 24A, in this embodiment, the linear substantially-parallel-rays generating unit 1A moves against the stationary transmission type LCD 3. In addition, as an example of modification of this embodiment, as shown in FIG. 24B, the LCD 3 integrated with the photosensitive film 4 may move against the stationary linear substantially-parallel-rays generating unit 1A. In this way, this example of modification requires a space for the two photosensitive films 4. Thus, the embodiment shown in FIG. 24A, in which the linear substantially-parallel-rays generating unit 1A moves, is more preferable, since the structure of the apparatus can be made compact.

The linear light source 11a used in the linear substantially-parallel-rays generating unit 1A has a rod type lamp such as a cold-cathode tube, and a reflection plate such as a reflector or a diffusion film, and is adapted to uniformly diffuse light from the rod type lamp by using the diffusion film, reflection plate, or the like. However, this embodiment is not limited to this. Any type of light source will do as long as it provides strip-like light. For example, a rod type light source, an elongate organic or inorganic EL panel, and the like may be combined with each other to obtain strip-like slit light by using a light source or the like of a predetermined length and a slitted plate. Alternatively, LEDs or the like may be arranged in a row to obtain light dots in a row. In the latter case, it is preferable to keep the LEDs in alignment with the positions of the through-holes 21 of the porous plate 2A.

Note that, in this embodiment, it goes without saying that the porous plates 2A and 2B shown in FIGS. 21A and 21B can be used as the light linearizing device used in the linear substantially-parallel-rays generating unit 1A. Apart from this, what is applicable to the image transfer apparatus of the second embodiment shown in FIG. 19 is applicable to this embodiment without exception.

In addition, in this embodiment, as shown in FIG. 23, the linear substantially-parallel-rays generating unit 1A itself formed by integrating the linear light source 1 with the porous plate 2A is attached to the endless belt 8b of the moving device 8, which is different from the second embodiment shown in FIG. 11 in which the light linearizing device (porous plate 2A) is attached to the endless belt 8b of the moving-device 8. It goes without saying, however, that there is no difference between the two embodiments in the function and operation of the moving device 8 or in the function and operation of the light linearizing device (porous plate) moved by the moving device 8. As in the transfer apparatus of the second embodiment shown in FIG. 19, in the transfer apparatus of this embodiment shown in FIG. 23, the linear substantially-parallel-rays generating unit 1A is moved by the moving device 8 to thereby successively irradiate linear light from the linear substantially-parallel-rays generating unit 1A to the LCD 3 and illuminate an image displayed on the LCD 3 through scanning exposure via the transparent member 10. Consequently, an image can be transferred to the photosensitive film 4 in substantially the same size as the image displayed on the LCD 3 even if a diffusion angle of substantially parallel rays is a little too large.

Note that, compared with the transfer apparatus in accordance with the second embodiment shown in FIG. 19, in the transfer apparatus of this embodiment shown in FIG. 23, a structure of the apparatus can be made more compact because a size of a light source can be reduced.

FIG. 25 is a schematic view showing another example of modification of the transfer apparatus in accordance with the third embodiment of this aspect of the present invention. Note that, in FIG. 25, only a linear substantially-parallel-rays generating unit 1B, the photosensitive film 4, the transparent member 10 and the LCD 3 are shown, and other components are not shown. In this example of modification, the linear substantially-parallel-rays generating unit 1B is arranged such that a direction A in which the linear substantially-parallel-rays generating unit 1B moves and an axial direction of the through-holes 21 are parallel to each other. On an end face on the emission side of the porous plate 2A, a mirror 24 is arranged at an angle of 45° with respect to the direction A so as to allow emitted light from the porous plate 2A to enter the LCD 3. With the structure of this example of modification, the same effect as the third embodiment can be obtained and, at the same time, the apparatus can be made more compact than that of the third embodiment.

Note that details of the linear substantially-parallel-rays generating unit 1B will be described later.

In all the above-mentioned embodiments of this aspect of the present invention, an image excellent in an image quality can be obtained by providing the transparent member 10 even if the LCD 3 and the photosensitive film 4 are spaced apart from each other. Consequently, restriction on a shape of a frame case is relaxed. In addition, although the porous plates 2, 2A and 2B are used as a substantially parallel rays generating element, the substantially parallel rays generating element is not limited to these and, for example, a SELFOC lens or the like may be used. In addition, in the second and third embodiments, the transparent members 10A and 10B shown in the first and second examples of modification of the first embodiment can also be applied to the transparent member 10. Further, it goes without saying that, in the second and third embodiments, an image area (not shown) of the photosensitive film 4 and an image area (not shown) of the LCD 3 can be same as in the first embodiment.

The image transfer apparatus in accordance with the third aspect of the present invention is basically constituted as described above.

Now, an image transfer apparatus in accordance with the fourth aspect of the present invention will be described with reference to FIGS. 26 to 34.

FIG. 26 is a schematic side sectional view showing an image transfer apparatus in accordance with the first embodiment of the fourth aspect of the present invention.

Here, the image transfer apparatus of the fourth aspect of the present invention shown in FIG. 26 basically has the same structure as the image transfer apparatus of the third aspect of the present invention shown in FIG. 12 except that prism sheets 40 are arranged on a surface on a light irradiation side of the back light unit 1 instead of the structure in which the transparent member 10 is arranged between the LCD 3 and the photosensitive film 4. Thus, identical components are denoted by the identical reference symbols, and detailed descriptions of such components will be omitted and differences will be mainly described.

As shown in FIG. 26, the image transfer apparatus of the embodiment of the fourth aspect of the present invention is constituted by the back light unit 1 serving as a light source, the LCD (liquid crystal display element) 3 for displaying a digitally-recorded image, the film case 51 for accommodating the photosensitive film 4 serving as a photosensitive recording medium, and the main body case 6 for containing these back light unit 1, LCD 3 and film case 51. Note that the LCD 3 corresponds to an image display device in the present invention. The film case 51 is provided with the outlet 53 on one side in a longitudinal direction of the photosensitive film 4. The opening portion 54 is formed on a surface on the back light unit 1 side of the film case 51. The LCD 3 is fit in this opening portion 54. Note that a shaded portion with oblique lines of the photosensitive film 4 shown in FIG. 26 indicates the image forming area 4a of the photosensitive film 4, and a shaded portion with oblique lines in the LCD 3 indicates the image display area 3a of the LCD 3.

In the embodiment of this aspect of the present invention, the LCD 3 and the photosensitive film 4 are arranged in series along a direction in which light from the back light unit 1 advances, and the image display area 3a (image display surface) of the LCD 3 and the image forming area 4a (recording surface) of the photosensitive film 4 are closely attached to each other.

The back light unit 1 serving as a light source is for irradiating uniform light over the entire surface of the LCD 3 from behind thereof, and is a planar light source having a light emission surface (illuminating surface) substantially the same as the display screen of the LCD 3. The back light unit 1 has a light guide plate 12 for introducing light emitted from the rod type lamp 11 such as a cold-cathode tube in a predetermined direction, and a reflection plate 13 for reflecting the light introduced to the light guide plate 12 in a substantially perpendicular direction is provided on the rear surface of the light guide plate 12. A diffusion plate 14 for uniformalizing the light reflected by the reflection plate 13 is provided on the surface of the light guide plate 12. The first prism sheet 40 is provided on the surface of the diffusion plate 14.

Figure 27A:
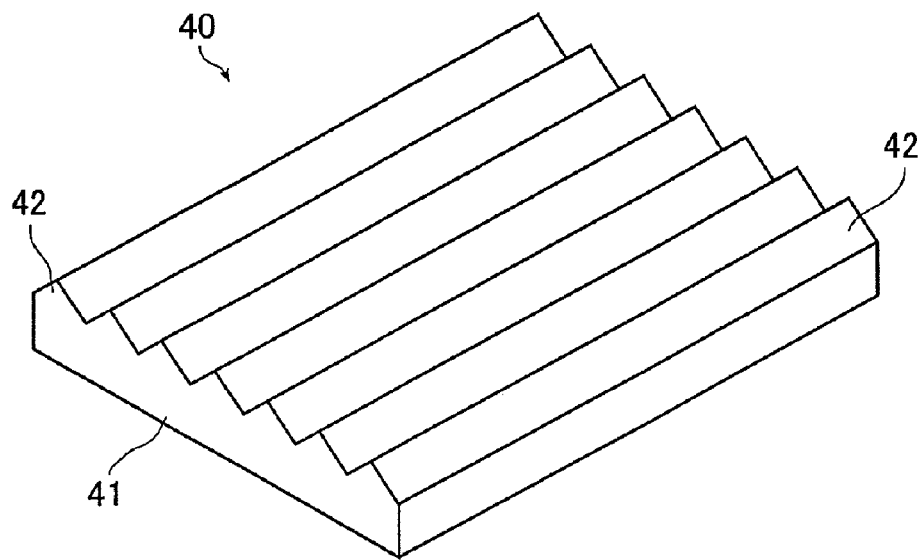
FIG. 27A is a perspective view showing a prism sheet of this embodiment.
Figure 27B:
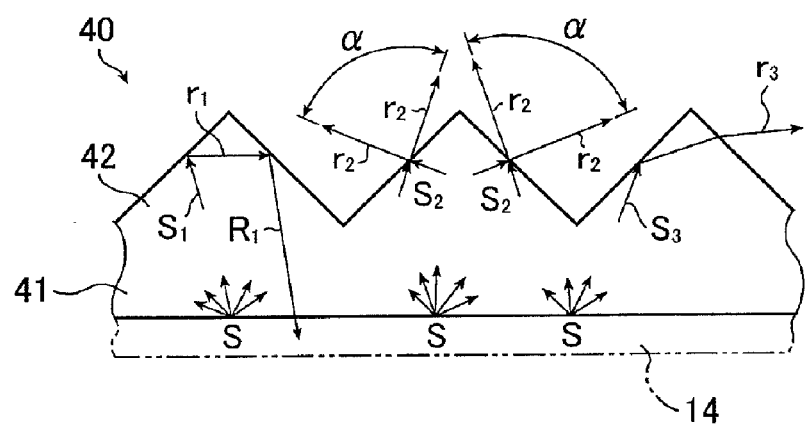
FIG. 27B is a schematic view illustrating an action of the prism sheet of this embodiment.

FIG. 27A is a perspective view showing a prism sheet of this embodiment. FIG. 27B is a schematic view illustrating an action of the prism sheet of this embodiment. As shown in FIG. 27A, in the prism sheet 40, a plurality of prism portions 42 whose ridge lines extend in one direction are formed on a surface of a base portion 41 of the prism sheet 40 such that the ridge lines are parallel with each other at a predetermined interval in a direction perpendicular to the one direction. The second prism sheet 40 is provided on an upper surface of the first prism sheet 40 such that ridge lines of the second prism sheet 40 are perpendicular to the ridge lines of the first prism sheet 40.

Next, behavior of a scattered light S (diffused light) scattered (diffused) by the diffusion plate 14 in the case in which the scattered light S enters the prism sheet 40 as shown in FIG. 27B will be described. Of the scattered light S that has entered the base portion 41, scattered light $S_1$ with an angle smaller than a critical angle of the prism portion 42 is reflected on a slope of the prism portion 42, changed to reflected light $r_1$ and reflected on the slope again to be changed to a reflected light $R_1$. Then, reflected light $R_1$ is reflected on the bottom surface of the base portion 41 again to enter the prism portion 42. In this case, if an angle of the re-reflected light exceeds the critical angle of the prism portion 42, the light is emitted to the LCD 3 side from the prism sheet 40. In addition, scattered light $S_2$ with an angle larger than the critical angle of the prism portion 42 is emitted to the LCD 3 side from the slope as emitted light $r_2$ within a range of an angle α. The angle a is for example 90°. On the other hand, reflected light $r_3$ reflected on the slope like scattered light S3 may be emitted from another slope opposed to the slope in an arrangement direction of the prism portion 42. However, the prism sheet 40 can condense light from the back light unit 1 in a direction of a tip end of the prism portion 42 without loss by aligning the scattered light S in a predetermined direction. Consequently, the prism sheet 40 can increase luminance of light entering the LCD 3. If the prism sheet 40 is, for example, BEF II (trade name: manufactured by Sumitomo 3M), luminance can be improved by 100%. Note that the prism sheet 40 is not limited to this and a well-known prism sheet can be used. In general, the prism sheet 40 is provided in a back light unit of a liquid crystal display apparatus and is used for increasing luminance of a display screen to display the image clearly. It is a characteristic of the prism sheet 40 that it shows a significant effect in that not only luminance is increased but also clarity of an image to be transferred is extremely improved by using it in this image transfer apparatus.

In addition, as in this embodiment, the two prism sheets 40 are overlapped such that their ridge lines are perpendicular to each other, whereby light emitted in the arrangement direction of the prism portions 42 in the lower prism sheet 40 is also caused to form a part of light travelling to the LCD 3 by the upper prism sheet 40. In this way, luminance of light entering the LCD 3 can be further increased. Note that, if light emitted from the prism sheets 40 is caused to enter a scattering plate or a diffusion plate, the effect of the present invention cannot be obtained. Therefore, if a scattering plate or a diffusion plate is used, the scattering plate or the diffusion plate is provided between the back light unit 1 and the prism sheets 40.

In addition, since intensity of light irradiated from the front of the prism sheets 40 is increased by the prism sheets 40 as described above, luminance of light entering the LCD 3 increases. Consequently, an applied voltage of the rod type lamp 11 can be lowered. Thus, power consumption can be reduced. Therefore, for example, if the rod type lamp 11 is lighted by a battery, consumption of the battery can be suppressed. In addition, if a cold-cathode tube is used as the rod type lamp 11, a voltage of this cold-cathode tube can be reduced by, for example, 20 to 40%. Moreover, a lighting time (exposure time) of the rod type lamp 11 can also be reduced by 20 to 40%, and power consumption can be saved.

In this embodiment, as a result of providing the above-mentioned prism sheets 40, clarity of an image transferred to the photosensitive film 4 by the LCD 3 becomes extremely high. In addition, as a result of providing the above-mentioned prism sheets 40, transmittance of light of a wavelength of a blue component decreases and a tone of a transfer image deviates to a red direction (long wavelength direction). Consequently, a tone of an image formed on the photosensitive film 4 can be controlled. In addition, in this aspect of the present invention, since light with a large amount of components in a direction required for exposure and printing can be extracted, the above-mentioned effect can be obtained even if the back light unit 1 and the LCD 3 are brought closer to each other.

In addition, there are no particular limitations regarding the back light unit 1 used in this embodiment. It may be of any type as long as it is a planar light source that uniformly diffuses light emitted by the rod type lamp 11 using a back light assembly comprising the light guide plate 12, the reflection plate 13, the diffusion plate 14, and the prism sheets 40. A publicly known back light unit for an LCD can be used. The size of the illuminating surface (light emission surface) may be the same as the size of the image display area 3a of the LCD 3 or the image forming area 4a of the photosensitive film 4. However, the size of the illuminating surface is not limited to this. It may be somewhat larger than the size of the image display area 3a of the LCD 3 or the image forming area 4a of the photosensitive film 4.

An LED array light source, a light source using an organic or inorganic EL panel or the like can be utilized as the back light unit 1 used in this embodiment as long as it is a planar light source that is provided with the prism sheets 40 on its light irradiation surface and is capable of emitting light of a desired intensity.

In this aspect of the present invention, the same LCD 3, photosensitive film 4 as well as film case 51 for accommodating it, and main body case 6 as those in the case of the third aspect of the present invention can also be used. Further, in the embodiment shown in FIG. 26, since the LCD 3 is tightly fit in the opening portion 54 of the film case 51 of the film pack 5, the photosensitive film 4 is arranged such that its photosensitive surface is closely attached to the display screen of the LCD 3.

Incidentally, in the image transfer apparatus of this embodiment, the display surface of the LCD 3 and the photosensitive surface of the photosensitive film 4 are brought into contact with each other. A clearer transfer image can be obtained by providing at least one prism sheet 40 in the back light unit 1.

In addition, in this embodiment, the two prism sheets 40 are arranged with the ridge lines of the prism portions 42 perpendicular to each other. However, the number of prism sheets 40 is not limited to this, and the effect of the present invention can be obtained even if only one prism sheet 40 is used.

Further, the main body case 6 is a case for containing the respective components of the above-mentioned embodiment, that is, the back light unit 1, the LCD 3, the film pack 5 (or the film case 51), a pair of rollers 61 for transferring a film which has undergone exposure and for developing processing liquid, and the like.

Incidentally, in this embodiment, an image supplied from the digital image data supply section is displayed on the LCD 3. Subsequently, the rod type lamp 11 is turned on to allow light to enter the display surface of the LCD 3 through the prism sheets 40 for a predetermined time (exposure time). Then, the image displayed on the LCD 3 is exposed and printed on the photosensitive film 4. Consequently, a transfer image is formed on the photosensitive film 4.

Figure 28:
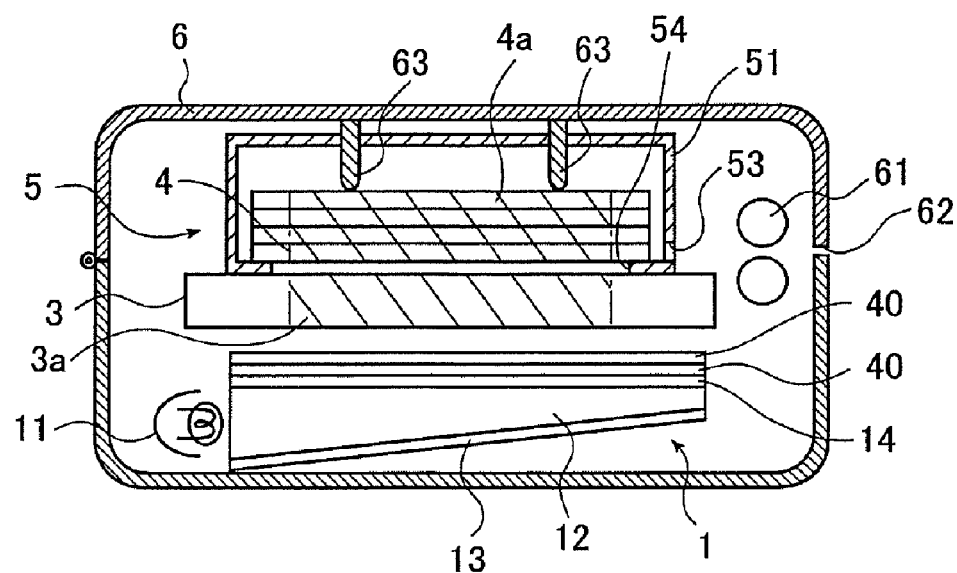
FIG. 28 is a schematic sectional view showing an image transfer apparatus in accordance with the second embodiment of this aspect of the present invention.
Figure 29:
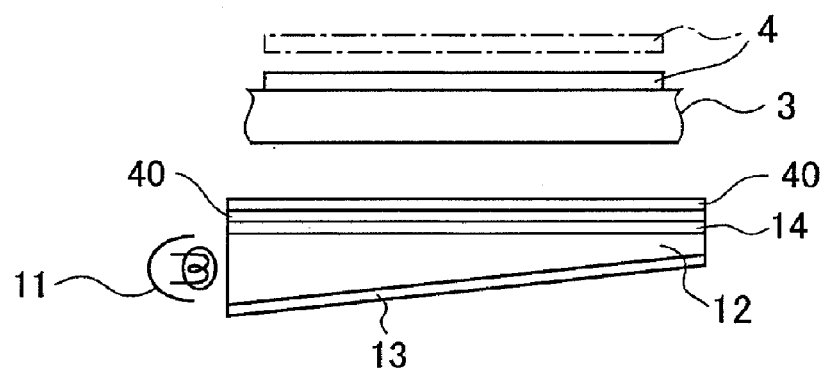
FIG. 29 is a schematic view showing a main portion of the image transfer apparatus in accordance with the second embodiment of this aspect of the present invention.

Next, the second embodiment of the fourth aspect of the present invention will be described. FIG. 28 is a schematic sectional view showing an image transfer apparatus of the second embodiment of this aspect of the present invention. FIG. 29 is a schematic view showing a main part of the image transfer apparatus in accordance with the first embodiment of this aspect of the present invention. In FIG. 29, the film case 51 is not shown. Note that, in the second embodiment shown in FIGS. 28 and 29, components identical with those in the first embodiment shown in FIGS. 26 to 27B are denoted by the identical reference symbols, and detailed descriptions of such components will be omitted.

As shown in FIG. 28, the image transfer apparatus of this embodiment has the same structure as the first embodiment except that a size of the exterior of the LCD 3 is larger than the opening area of the opening portion 54, and the image display area 3a of the LCD 3 and the image forming area 4a of the film 4 are spaced apart from each other compared with the first embodiment. In addition, as a transfer method, an image supplied from the digital image data supply section is displayed on the LCD 3 as in the first embodiment. Subsequently, the rod type lamp 11 is turned on to cause light to enter the display surface of the LCD 3 through the prism sheets 40. Consequently, a transfer image is formed on the photosensitive film 4.

In the image transfer apparatus in accordance with this embodiment, as described before, based on the condition required for realizing an apparatus being actually easy to handle, the LCD 3 and the photosensitive film 4, strictly speaking, the display surface of the LCD 3 and the photosensitive surface of the photosensitive film 4 are spaced apart from each other by a predetermined distance in a non-contact state. In this embodiment, from the viewpoint of obtaining a clear transparent image, the disadvantage of increase in diffusion of light due to this arrangement is compensated by the advantage of suppression in diffusion of light by providing at least one prism sheet 40 in the back light unit 1 as described above. Examples of the advantage of diffusion suppression further include suppressing diffusion of light by regulating the total thickness t of the substrate 32 and the polarizing film 31 on the photosensitive film 4 side of the LCD 3 as in the aforementioned third aspect of the present invention. Consequently, even if the LCD 3 and the photosensitive film 4 are spaced apart from each other by a predetermined distance, a clear transfer image can be obtained. Note that, as in the image transfer apparatus described in the above-mentioned first embodiment, even in the case in which the display surface of the LCD 3 and the photosensitive surface of the photosensitive film 4 are closely attached, a clearer transfer image can be obtained as in this embodiment by constituting the image transfer apparatus as described above, for example, by further regulating a condition of a total thickness.

In this embodiment, as in the case of the aforementioned third aspect of the present invention, it is preferable to set the total thickness t of the substrate 32 and the polarizing film 31 on the photosensitive film 4 side at not more than 1.0 mm. The reason for this is also generally the same as the case of the aforementioned third aspect of the present invention.

This condition of the total thickness corresponds to suppressing diffusion of projected light in a section from the back light unit 1 to the LCD 3. In the image transfer apparatus of this embodiment, for the purpose of achieving good usefulness with a simple structure and actually realizing an image transfer apparatus easier to handle, the display surface of the LCD 3 and the photosensitive surface of the photosensitive film 4 are spaced apart by a predetermined distance and held in a non-contact state. However, this arrangement is rather disadvantageous from the viewpoint of obtaining a clear transfer image, since diffusion of light is facilitated between the display surface of the LCD 3 and the photosensitive surface of the photosensitive film 4. Thus, in this aspect of the present invention, at least one prism sheet 40 for improving luminance of light entering the LCD 3 and reducing components of scattered light adversely affecting an image quality is provided in the back light unit 1 instead of the transparent member 10 provided in the third aspect of the present invention, whereby the above-mentioned disadvantage due to the non-contact state (increase in diffusion of light) is compensated for and the increase in diffusion of light is suppressed.

In addition to the finding that a clear transfer image can be obtained by reducing at least the total thickness of the substrate 32 and the polarizing film 31 on one side of the LCD 3 according to the third aspect of the present invention on the photosensitive film 4 side to not more than 1.0 mm, the inventors have found that, as described above, of light from a light source, light with a large amount of components in a direction required for exposure and printing can be allowed to enter the LCD 3 by providing at least one prism sheet 40 on the surface of the back light unit 1, since luminance of light entering the LCD 3 is increased and light with an angle smaller than a critical angle of the prism sheet 40 is not allowed to enter the LCD 3. According to these findings, blurring of colors due to overlapping of dots is further eliminated and a clearer transfer image is obtained even in the LCD 3 having a fine dot size such as UXGA or XGA compared with the image transfer apparatus that has the equal distance between the LCD 3 and the photosensitive film 4 and is not provided with the prism sheet 40. In addition, in this aspect of the present invention, since light with a large amount of components in a direction required for exposure and printing can be extracted, the effect can be obtained even if the back light unit 1 and the LCD 3 are brought closer to each other. Further, as shown in the above-mentioned first embodiment, even in the case in which the LCD 3 and the photosensitive film 4 are closely attached to each other, blurring of colors due to overlapping of dots in the LCD having a fine dot size is eliminated, and the above-mentioned effect can be obtained.

In addition, in the image transfer apparatus in accordance with this embodiment, as shown in FIG. 29, the distance between (the image display surface of) the LCD 3 and (the photosensitive surface of) the photosensitive film 4 is preferably set to 0.01 mm to 3 mm, and more preferably 0.1 mm to 3 mm. As stated above, this arrangement is rather disadvantageous from the viewpoint of obtaining a clear transfer image. However, it is a condition necessary for realizing an apparatus being actually easy to handle. The disadvantage due to this arrangement can be compensated by the advantage of the suppression of light diffusion, which can be achieved by providing at least one prism sheet 40 in the back light unit 1.

Next, the third embodiment of the fourth aspect of the present invention will be described.

Figure 30:
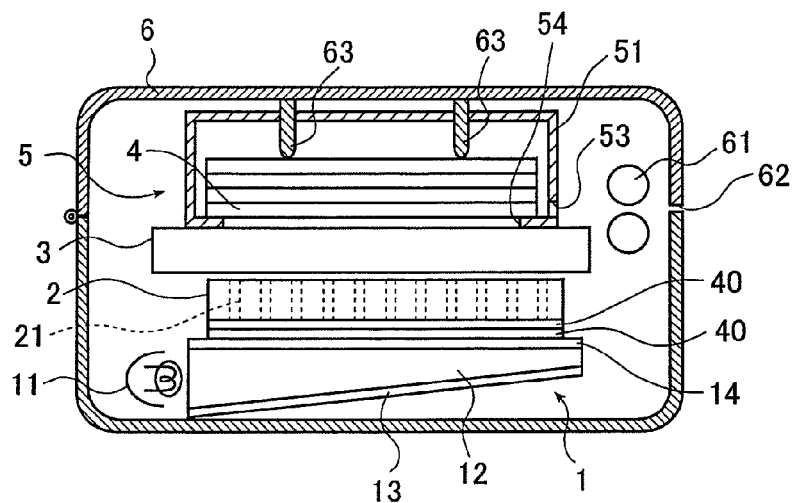
FIG. 30 is a schematic sectional view showing an image transfer apparatus in accordance with the third embodiment of this aspect of the present invention.
Figure 31:
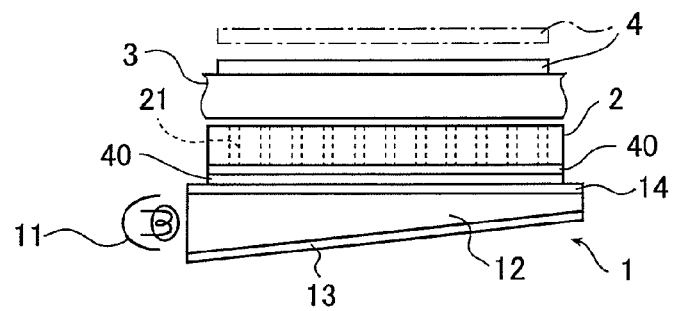
FIG. 31 is a schematic view showing a main portion of the image transfer apparatus in accordance with the third embodiment of this aspect of the present invention.

FIG. 30 is a schematic sectional view showing an image transfer apparatus in accordance with the third embodiment of this aspect of the present invention. FIG. 31 is a schematic view showing a main part of the image transfer apparatus in accordance with the third embodiment of this aspect of the present invention. In this embodiment, components identical with those in the second embodiment shown in FIGS. 28 and 29 are denoted by the identical reference symbols, detailed descriptions of the components will be omitted. Compared with the second embodiment, this embodiment is the same as the second embodiment except that the porous plate 2 having the plurality of through-holes 21 is provided on the upper surface of the prism sheet 40 as shown in FIGS. 30 and 31.

In the embodiment of this aspect of the present invention, the porous plate 2 used in the aforementioned each aspect of the present invention can be used in the same manner. The porous plate 2 used in this embodiment is a substantially-parallel-rays generating element that is provided on the upper surface of the prism sheet 40, if necessary, and is used for making light from the back light unit 1 into substantially parallel rays (including parallel rays) and making light entering the LCD 3 as parallel as possible. In this embodiment, a predetermined gap is provided between the LCD 3 and the porous plate 2. As described above, this gap is preferably 0.05 mm to 10 mm, and more preferably 0.1 mm to 5 mm. However, it is preferable that the gap be adjustable to an arbitrary dimension.

In this embodiment, since the prism sheets 40 are also provided, decrease in luminance is suppressed even if the porous plate 2 is provided. Moreover, since the prism sheet 40 is provided below the porous plate 2, parallelism of light allowed to enter the LCD 3 is further increased. Thus, clarity of an obtained transfer image is further increased. In addition, by regulating the thickness of the porous plate 2 and the LCD 3, diffusion of light is further suppressed and clarity of an obtained transfer image is further increased.

Next, the fourth embodiment of the fourth aspect of the present invention will be described.

Figure 32:
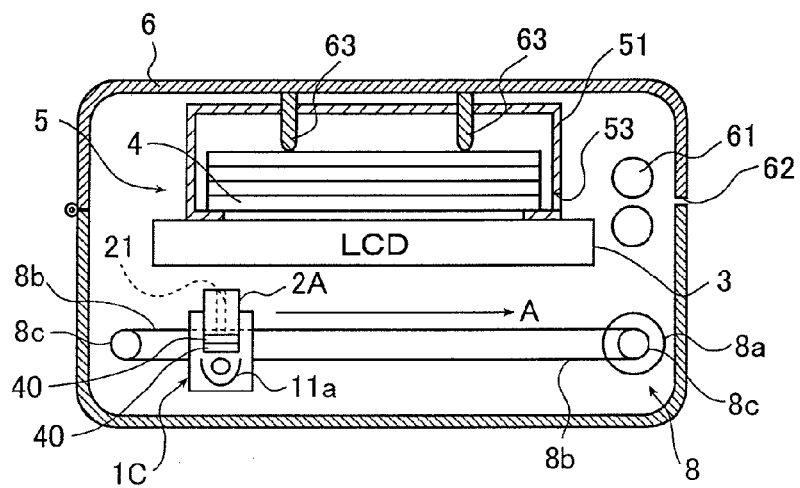
FIG. 32 is a schematic sectional view showing an image transfer apparatus in accordance with the fourth embodiment of this aspect of the present invention.

FIG. 32 is a schematic sectional view showing an image transfer apparatus in accordance with the fourth embodiment of this aspect of the present invention. In this embodiment, components identical with the third embodiment shown in FIGS. 30 and 31 are denoted by the identical reference symbols, and detailed descriptions of such components will be omitted.

Compared with the third embodiment, in this embodiment, the porous plate 2A is not provided over the entire surface of the image display area of the LCD 3, and one row of the through-holes 21 are formed in the porous plate 2A. The linear light source 11a is provided below the porous plate 2A, and the porous plate 2A and the linear light source 11a are integrated into a linear substantially-parallel-rays generating unit 1C. The two prism sheets 40 are arranged on an incidence surface (lower surface) of the porous plate 2A for receiving light from the linear light source 11a such that ridge lines of the respective prism sheets 40 are perpendicular to each other.

In addition, the image transfer apparatus of this embodiment has the same structure as the third embodiment except that the moving device 8 for moving the porous plate 2A in a direction A perpendicular to the arrangement direction of the through-holes 21A is provided in a lower part in the main body case 6. The porous plate 2A is moved along one side of the LCD 3 by the moving device 8.

In the image transfer apparatus shown in FIG. 32, as described above, the linear substantially-parallel-rays generating unit 1C constituted by the linear light source 11a comprising the rod type lamp (e.g., straight cold-cathode tube), the two prism sheets 40 and the columnar porous plate 2A as a light linearizing device, which are integrally combined as a unit, and has a function of making light transmitted through the two prism sheets 40 from the linear light source 11a into linear and substantially parallel rays to cause the light to perpendicularly enter the transmission type LCD 3. The linear substantially-parallel-rays generating unit 1C is for emitting linear light having a width in a direction (longitudinal direction) perpendicular to the direction in which the linear substantially-parallel-rays generating unit 1C and the transmission type LCD 3 are moved relatively (the scanning direction on the display screen of the transmission type LCD 3).

In this embodiment, as the moving device 8 for moving the porous plate 2A, the same one as in the image transfer apparatus of the third aspect of the present invention shown in FIG. 23 can be used. In the image transfer apparatus of this embodiment, the linear substantially-parallel-rays generating unit 1C is moved by the moving device 8 to thereby successively irradiate linear light from the linear substantially-parallel-rays generating unit 1C to the LCD 3 and to illuminate an image displayed on the LCD 3 through scanning exposure to expose the photosensitive film 4. Consequently, an image can be transferred to the photosensitive film 4 in substantially the same size as the image displayed on the LCD 3 even if a diffusion angle of substantially parallel rays is a little too large.

As the light linearizing device used in this embodiment, in addition to the above-mentioned columnar porous plate 2A shown in FIG. 21A, the porous plate 2B as shown in FIG. 21B can also be used as in the case of the third aspect of the present invention. In addition, as an arrangement of the through-holes 21 of the porous plate 2A, the same arrangement as shown in FIGS. 22A to 22D can also be used.

In addition, as a material of the porous plate 2A, the same one as in the second embodiment can be used. Moreover, a shape of the through-holes 21 to be provided in the porous plate 2A can be the same as that in the second embodiment. Clarity of an image increases even if the porous plate 2A is used as in this embodiment. For example, as the porous plate 2A, a porous plate in which the through-holes 21 with a thickness of 6 mm and a diameter of 0.5 mm are formed at a pitch of 0.7 mm in a close-packed shape is used. In this case, geometrically, a diffusion angle of light from the through-holes 21 is approximately 4.7°. On the other hand, the prism sheets 40 condenses light in a range approximately ±40° from the center, which is approximately ten times as large as a diffusion angle of light passing through the porous plate 2A. Thus, it is considered that parallelism of light and quality of a transfer image can be determined only by the porous plate 2A. However, a transfer image with an excellent quality can be obtained by providing the prism sheets 40.

In the image transfer apparatus of this embodiment, as described before, again, based on the condition required for realizing an apparatus being actually easy to handle, the LCD 3 and the photosensitive film 4, strictly speaking, the display surface of the LCD 3 and the photosensitive surface of the photosensitive film 4 are spaced apart from each other by a predetermined distance in a non-contact state. In this embodiment, from the viewpoint of obtaining a clear transfer image, the disadvantage of increase in diffusion of light due to this arrangement is recovered by the advantage of increase in luminance of the LCD 3 and suppression of diffusion of light by arranging the two prism sheets 40 below the porous plate 2A such that ridge lines of the respective prism sheets 40 are perpendicular to each other. Examples of the above-mentioned advantage of suppression of diffusion of light further include suppressing diffusion of light by setting the ratio of the porous plate 2A not less than three times the diameter or the equivalent diameter of the through-holes 21. In addition, examples of the advantage also include suppressing diffusion of light by regulating the total thickness t of the substrate 32 and the polarizing film 31 on the photosensitive film 4 side of the LCD 3. Consequently, even if the LCD 3 and the photosensitive film 4 are spaced apart from each other by a predetermined distance, a clearer transfer image can be obtained.

Figure 33A:
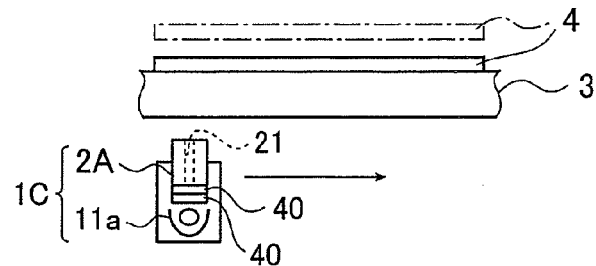
FIG. 33A is a schematic view showing an operation of the image transfer apparatus of this embodiment.
Figure 33B:
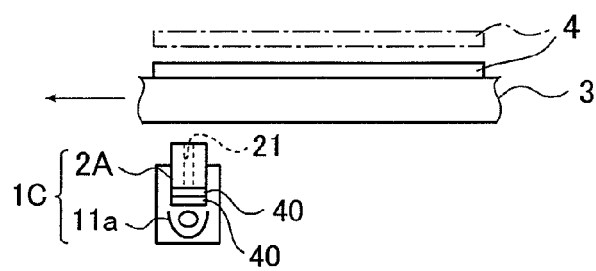
FIG. 33B is a schematic view showing an example of modification of the operation of the image transfer apparatus of this embodiment.

FIG. 33A is a schematic view showing operation of the image transfer apparatus of this embodiment. FIG. 33B is a schematic view showing an example of modification of the operation of the image transfer apparatus of this embodiment. As shown in FIG. 33A, in this embodiment, the linear substantially-parallel-rays generating unit 1C moves against the stationary transmission type LCD 3. In addition, as an example of modification of this embodiment, as shown in FIG. 33B, the LCD 3 integrally formed with the photosensitive film 4 may move against the stationary linear substantially-parallel-rays generating unit 1C. In this way, this example of modification requires a space for the two photosensitive films 4. Thus, the embodiment shown in FIG. 33A, in which the linear substantially-parallel-rays generating unit 1C moves, is more preferable in that the size of the apparatus can be made compact.

Next, the fifth embodiment of the fourth aspect of the present invention will be described.

Figure 34:
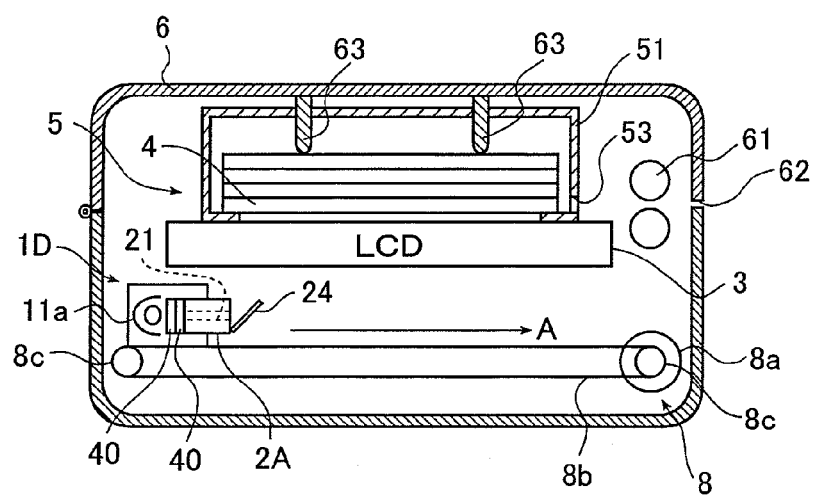
FIG. 34 is a schematic sectional view showing an image transfer apparatus in accordance with the fifth embodiment of this aspect of the present invention.

FIG. 34 is a schematic sectional view showing an image transfer apparatus in accordance with the fifth embodiment of this aspect of the present invention. In this embodiment, components identical with those in the fourth embodiment shown in FIGS. 32 and 33 are denoted by the identical reference symbols, and detailed descriptions of such component will be omitted.

Compared with the fourth embodiment, this embodiment is the same as the third embodiment except that a linear and substantial-parallel-rays generating unit 1D are arranged such that the direction A in which the linear substantially-parallel-rays generating unit 1D moves and the axial direction of the through-holes 21 are in parallel with each other, and a mirror 24 is arranged to an end face on the emission side of the porous plate 2A at an angle of 45° with respect to the direction A so as to allow emitted light from the porous plate 2A to enter the LCD 3. In this embodiment, since the two prism sheets 40 are arranged such that ridge lines of the respective prism sheets 40 are perpendicular to each other, the same effect as the fourth embodiment can be obtained. In addition, in this embodiment, since a thickness in a stacking direction of the porous plate 2A and the photosensitive film 4 can be reduced by changing the arrangement direction of the linear substantially-parallel-rays generating unit 1D and providing the reflective mirror 24, the image transfer apparatus of the fourth embodiment can be made more compact.

Note that, in this embodiment, it goes without saying that the porous plates 2A and 2B shown in FIGS. 21A and 21B can be used as the light linearizing device used in the linear substantially-parallel-rays generating unit 1D. Apart from this, what is applicable to the image transfer apparatus of the fourth embodiment shown in FIGS. 32 and 33 is applicable to this embodiment without exception.

In the above-mentioned second to fifth embodiments, an image with an excellent quality can be obtained even if the LCD 3 and the photosensitive film 4 are spaced apart by providing the prism sheet 40. Thus, restriction on a shape of a film case is relaxed. In addition, although a porous plate is used as a substantially parallel rays generating element, the substantially parallel rays generating element is not limited to this and, for example, a SELFOC lens or the like may be used. In addition, in the third to fifth embodiments, the display surface of the LCD 3 and the photosensitive surface of the photosensitive film 4 may be closely attached. In this case, a transfer image with higher clarity can be obtained compared with the case in which the display surface of the LCD 3 and the photosensitive surface of the photosensitive film 4 are not closely attached.

EXAMPLE

Results of comparing characteristics of an image transfer apparatus of an example of the fourth aspect of the present invention with those of an image transfer apparatus of a comparative example will be hereinafter described.

First Example

As an example, the image transfer apparatus shown in FIG. 26 was used. A transfer image was formed on the photosensitive film 4 by this image transfer apparatus. In addition, as a comparative example, the image transfer apparatus shown in FIG. 26 with the prism sheet 40 removed was used. A transfer image was formed on the photosensitive film 4 by this image transfer apparatus. Further, a cold-cathode tube was used as the rod type lamp 11, and BEF II (trade name: manufactured by Sumitomo 3M) was used as the prism sheet 40. Then, clarity of transfer images obtained by the example and the comparative example was evaluated.

Next, the evaluation of transfer images will be described. In the example in which the two prism sheets 40 were provided, clarity was high compared with the comparative example in which the prism sheet 40 was not provided. The clarity of the transfer image in this example was in the same degree as that of a transfer image obtained in the case in which a porous plate with a ratio of its thickness and a diameter of through-holes of 2 to 4 was provided between the LCD 3 and the photosensitive film 4. In addition, in the example, brightness of an image equivalent to that of the comparative example could be obtained even if a voltage of the cold-cathode tube was decreased by 10% compared with the comparative example. Judging from these results, in the image transfer apparatus of this example, a thickness of the apparatus can be reduced compared with the image transfer apparatus using the porous plate, and power consumption can be suppressed.

Second Example

As an example, the image transfer apparatus shown in FIG. 30 was used. Further, as the porous plate 2, a porous plate in which through-holes with a diameter of 0.5 mm were formed in a zigzag shape at a pitch of 0.7 mm on a base with a thickness of 6 mm was used. In addition, nonreflective coating was applied to the porous plate 2. A cold-cathode tube was used as the rod type lamp 11, and BEF II (trade name: manufactured by Sumitomo 3M) was used as the prism sheet 40. The distance between the porous plate 2 and the LCD 3 was set to 4 mm. Using this image transfer apparatus, transfer images were formed on the photosensitive films 4 under respective conditions that the distance between the display surface of the LCD 3 and the photosensitive surface of the photosensitive films 4 was 0, 1, 2 and 3 mm respectively as shown in FIG. 31. In addition, as a comparative example, the image transfer apparatus shown in FIG. 30 with the prism sheet 40 removed was used. Transfer images were formed on the photosensitive films 4 under the same conditions as the above-mentioned example. Clarity of images obtained from the example and the comparative example was evaluated.

Next, the evaluation of transfer images will be described. The image transfer apparatus in which the distance between the LCD 3 and the photosensitive film 4 was 0 mm (First Example), that is, the LCD 3 and the photosensitive film 4 were closely attached, had higher clarity of a transfer image compared with the image transfer apparatus in which the prism sheet 40 was not provided and the distance between the LCD 3 and the photosensitive film 4 was 0 mm (First Comparative Example).

In addition, second, third and fourth examples in which the distance between the display surface of the LCD 3 and the photosensitive surface of the photosensitive film 4 was 1, 2 and 3 mm, respectively, had higher clarity compared with second, third and fourth comparative examples in which the prism sheet 40 was not provided and the distance between the display surface of the LCD 3 and the photosensitive surface of the photosensitive film 4 was 1, 2 and 3 mm, respectively. The clarity of the transfer images in the second to fourth examples was in the same degree as clarity of an image at the time when the distance between the display surface of the LCD 3 and the photosensitive surface of the photosensitive film 4 was reduced by approximately 0.5 to 1 mm in the case in which the prism sheet 40 was not provided. From these results, the clarity of the transfer images was in the following order: First example>first comparative example≧second example>second comparative example≧third example>third comparative example≧fourth example>fourth comparative example. That is, the clarity of the transfer images was the highest in the first example, which was higher than that in the first comparative example. In the second example, the clarity was higher than that in the second comparative example but equal to or lower than that in the first comparative example. In the third example, the clarity was higher than that in the third comparative example but equal to or lower than that in the second comparative example. In the fourth example, the clarity was higher than that in the fourth comparative example but equal to or lower than that in the third comparative example.

Moreover, the transfer images in the first to fourth examples had slightly increased tinge of red and skin colors in the transfer images were closer to the skin color of the human. In addition, voltages of the cold-cathode tube or lighting time (exposure time) of the light source could be reduced by 20 to 40%.

Furthermore, image qualities in the examples improved from those in the comparative examples. Thus, if it is attempted to obtain an image quality equivalent to that of the comparative examples, the thickness of the porous plate 2 can be reduced. In this example, the thickness can be reduced by approximately 0.5 to 1.5 mm. Consequently, the image transfer apparatus can be made compact. In addition, it is attempted to obtain an image quality equivalent to that of the comparative examples, the diameter of the through-holes 21 of the porous plate 2 can be increased from 0.5 mm to 0.55 to 0.7 mm. Consequently, the porous plate 2 can be manufactured easily. Judging from these findings, since the diameter of the through-holes 21 of the porous plate 2 can be increased or the thickness of the porous plate 2 can be reduced, an amount of light to be emitted from the porous plate 2 can be increased, and luminance on the emission side of the porous plate 2 is improved. Consequently, since the voltage of the cold-cathode tube can be decreased or the lighting time (exposure time) of the cold-cathode tube can be shortened, power saving can be realized.

The image transfer apparatus in accordance with the fourth aspect of the present invention is basically constituted as described above.

Now, an image transfer apparatus in accordance with the fifth aspect of the present invention will be described with reference to FIGS. 35 to 41.

Figure 35:
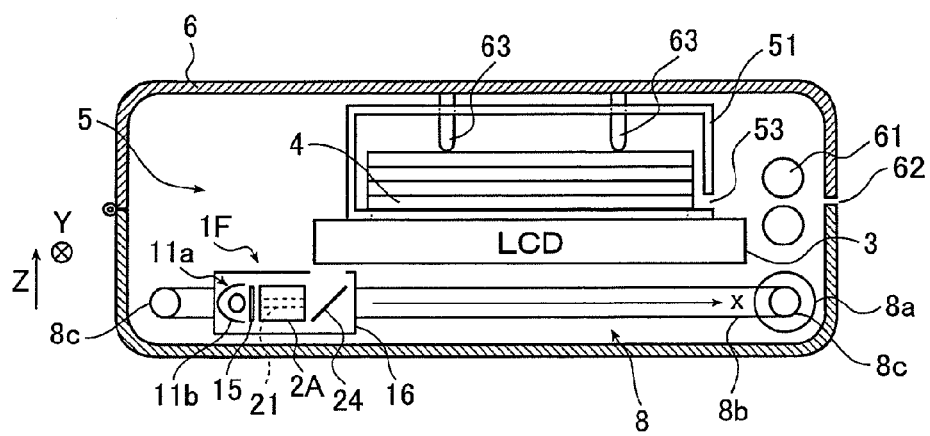
FIG. 35 is a schematic side sectional view of an embodiment of an image transfer apparatus in accordance with the fifth aspect of the present invention.
Figure 36:
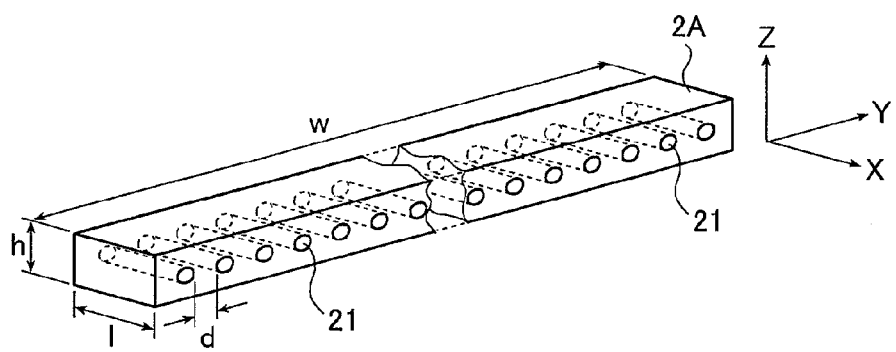
FIG. 36 is a perspective view of an embodiment of a porous plate used in the image transfer apparatus shown in FIG. 35.

FIG. 35 is a schematic side sectional view of an embodiment of the image transfer apparatus in accordance with the fifth aspect of the present invention.

Here, compared with the image transfer apparatus of the fourth aspect of the present invention shown in FIG. 34, the image transfer apparatus of the fifth aspect of the present invention shown in FIG. 35 basically has the same structure except that structures of a linear substantially-parallel-rays generating unit 1D and a linear substantially-parallel-rays generating unit 1F, and a state of attachment to the moving device (mechanism) 8 are different. Thus, identical components are denoted by the identical reference symbols, and detailed descriptions of such components will be omitted and differences will be mainly described.

As shown in FIG. 35, the image transfer apparatus of the present invention includes the linear light source 11a, the porous plate 2A having the through-holes 21 that serves as a parallel rays generating element, the reflection mirror 24, the LCD (liquid crystal display) 3 for displaying a digitally-recorded image that serves as a transmission type image display device, the film case 51 for accommodating the photosensitive film 4 that serves as a photosensitive recording medium, and the main body case 6 for containing these members.

Here, the linear light source 11a, the porous plate 2A and the reflection mirror 24 are arranged in series along a direction in which light from the linear light source 11a advances and along the image display surface of the LCD 3. The linear light source 11a, the porous plate 2A and the reflection mirror 24 are integrally incorporated in a housing 16 to constitute a light source unit 1F functioning as a linear substantially-parallel-rays generating unit. It is desirable that the light source unit 1F, the LCD 3 and the photosensitive film 4 are arranged in series, and preferably at least the LCD 3 and the photosensitive film 4 are arranged in a non-contact state. Further, the light source unit 1F can be moved along one side of the LCD 3 on the opposite side of the arrangement position of the photosensitive film 4 across the LCD 3 by the moving mechanism 8. That is, the linear light source 11a, the porous plate 2A and the reflection mirror 24 are provided inside the housing 16 for shielding light from anywhere other than the reflection mirror 24, and are moved integrally in the width direction of the LCD 3 (X direction) by the moving mechanism 8.

Note that the aforementioned linear substantially-parallel-rays generating unit 1B has substantially the same structure and substantially the same function as the light source unit 1F of this aspect of the present invention.

The linear light source 11a includes a rod type lamp (straight cold-cathode tube) such as a cold-cathode tube, a reflection plate 11b such as a reflector that is arranged around the rod type lamp, and a diffusion film (diffusion plate) 15 that is arranged between the rod type lamp and the porous plate 2A, and uniformly diffuses light from the rod type lamp using the reflection plate 11b, the diffusion film 15, and the like.

Note that the present invention is not limited to this. Any type of light source will do as long as it provides strip-like light. For example, a rod type light source, an elongate organic or inorganic EL panel, and the like may be combined with each other to obtain strip-like slit light by using a light source or the like of a predetermined length and a slitted plate. Alternatively, LEDs or the like may be arranged in a row to obtain light dots in a row. In the latter case, it is preferable to keep the LEDs in alignment with the positions of the through-holes 21 of the porous plate 2A. In particular, the LEDs can be effectively used as the linear light source 11a because uniformity of light entering the porous plate 2A increases.

An emission surface of the linear light source 11a is constituted so as to face a direction that is parallel to the image display surface of the LCD 3 as shown in FIG. 35.

The porous plate 2A is a parallel rays-generating element that is arranged in front of the emission surface of the linear light source 11a. The porous plate 2A is used for making light from the linear light source 11a into substantially strip-like and substantially parallel rays and making light entering the LCD 3 as parallel as possible, and arranged in parallel along the image display surface of the LCD 3 together with the linear light source 11a.

The porous plate 2A is a rectangular columnar member extending by a length equal to or larger than a size of the image display surface of the LCD 3 in a Y direction (vertical direction in FIG. 35) perpendicular to the X direction of the LCD 3. In the porous plate 2A, opening portions of a plurality of through-holes 21 of a predetermined size face the X direction and are provided in parallel in the Y direction at a predetermined pitch.

That is, the porous plate 2A serving as a parallel rays generating element is a columnar porous plate that has a through-hole rows in which the plurality of through-holes 21 pierced toward the direction along the image display surface of the LCD 3 (X direction) are arranged in parallel with each other in the direction perpendicular to the moving direction (X direction) by the moving mechanism 8 (Y direction). Therefore, since the linear light source 11a and the porous plate 2A are arranged in parallel with each other along the image display surface of the LCD 3, substantially parallel rays generated by the porous plate 2A is made into parallel strip-like rays along the image display surface of the LCD 3 and is caused to enter the reflection mirror 24.

Note that the parallel rays generating element may be of any type as long as it has the same function as the above-mentioned porous plate 2A. However, taking into account the ease of production, it is preferable that it is formed as a so-called "columnar porous plate" that has a large number of through-holes 21 arranged along the longitudinal direction (Y direction) of the porous plate 2A, and has a predetermined length along the through-holes 21 and is thin in thickness and elongate (narrow and long). Note that the porous plate 2A used in the second to fourth aspects of the present invention can be used in the same manner.

In addition, in this aspect of the present invention, again, there are no particular limitations regarding the sectional configuration of the through-holes 21 provided in the porous plate 2A. However, in order to facilitate production, it is preferable that the cross section of the through-holes 21 be circular or polygonal. In addition, there are no particular limitations regarding a size of the through-holes 21 either. However, a diameter (in the case of a circle) or an equivalent diameter (in the case of an ellipse, a polygon, etc.) is preferably not more than 5 mm, more preferably not more than 3 mm, and yet more preferably not more than 1.5 mm. There are no limitations regarding a lower limit value. However, taking into account ease of production, it is preferably not less than approximately 0.2 mm.

In addition, in the porous plate 2A in the above-mentioned example, a through-hole row in which the plurality of through-holes 21 are arranged in the Y direction is formed in one stage in a Z direction in FIG. 35. However, in the present invention, a through-hole row comprised of the plurality of through-holes 21 in the Y direction may be provided in a plurality of stages (plurality of rows) in the Z direction in FIG. 35. That is, a through-hole row comprised of the through-holes 21 as shown in FIGS. 22A, 22C and 22D may be arranged to form a plurality of rows in the Z direction in FIG. 35.

Note that, in this aspect of the present invention, there are no particular limitations regarding the arrangement pitch p, the size of the through-holes 21 and the distance d between the adjacent two through-holes as in the cases of the aforementioned second to fourth aspects of the present invention. The distance d is more important than the arrangement pitch p and the size of the through-holes 21.

In addition, a length l of this porous plate 2A (see FIG. 36) is not less than three times, preferably not less than five times, and more preferably not less than seven times the diameter or equivalent diameter of the through-holes 21. An example of dimensions of the porous plate 2A includes the length l of 6 to 10 mm, a width w in the Y direction of 67 mm, a height h of 3 mm, and the diameter of the through-holes 21 of 0.5 mm. In this way, in the porous plate 2A, the length l is larger than the height h in order to generate substantially parallel rays.

Further, in this aspect of the present invention, as in the cases of the aforementioned other aspects of the present invention, it is preferable to construct, of the entire surface of the porous plate 2A, at least the inner surfaces of the through holes 21 as low reflectance surfaces, and it is more preferable to construct the entire surface of the porous plate 2A as a low reflectance surface.

The reflection mirror 24 is a reflection device for projecting substantially parallel rays, which have been emitted along the image display surface of the LCD 3 from the opening)portions of the through-holes 21 facing the X direction in FIG. 35, perpendicularly toward the image display surface of the LCD 3.

Light emitted from the linear light source 11a passes through the through-holes 21, whereby light that has entered the through-holes 21 at a predetermined angle or more is absorbed in the inner surfaces of the through-holes 21. Thus, light that has entered the through-holes 21 at a predetermined angle or less passes through the through-holes 21 to be substantially parallel rays with little diffusion component. Therefore, as in the light source unit 1F shown in FIG. 37, light reflected on the reflection mirror 24 also diffuses a little in the same manner as the light that has passed through the through-hole 21, but the light becomes substantially parallel rays with little diffusion component.

Note that the substantially parallel rays refer to rays in which a degree of spread of light beam within a range of a distance from the image display surface of the LCD 3 to the film surface of the photosensitive film 4, for example, more than tens mm is narrower than spread of light beams that decreases clarity of an image. The spread of light beams that decreases clarity of an image is set according to a resolution of the LCD 3.

Figure 38:
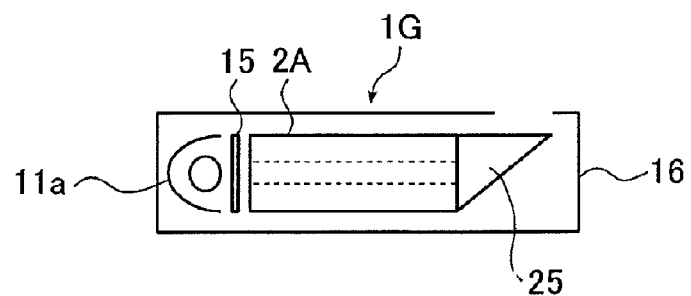
FIG. 38 is a schematic side sectional view of another embodiment of the light source unit used in the image transfer apparatus in accordance with this aspect of the present invention.

Note that a reflection prism 25 may be used as in a light source unit 1G shown in FIG. 38 as the reflection device in the present invention instead of the reflection mirror 24.

Figure 37:
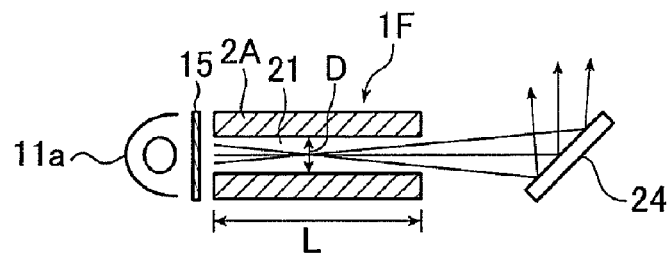
FIG. 37 is a view for illustrating generation of substantially parallel rays in a light source unit using a schematic side sectional view of a light source unit used in the image transfer apparatus shown in FIG. 35.
Figure 39:
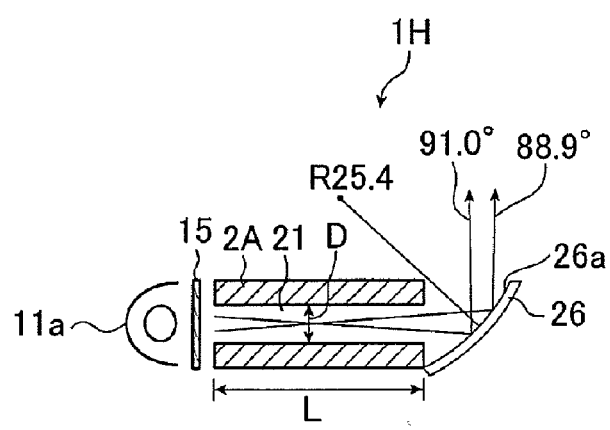
FIG. 39 is a schematic side sectional view of another embodiment of the light source unit used in the image transfer apparatus in accordance with this aspect of the present invention.

Note that, although the reflection device in the present invention reflects substantially parallel rays that have passed through the through-holes 21 on a flat reflection surface in the reflection mirror 24 shown in FIG. 37 and the reflection prism 25 shown in FIG. 38, the present invention is not limited to this, and a reflection surface may be a curved surface. FIG. 39 shows, as the reflection device of the present invention, a light source unit 1H using a reflection member 26 having a reflection surface 26a constituted by a curved surface with a predetermined curvature. The light source unit 1H shown in FIG. 39 has completely the same structure as the light source unit 1F shown in FIG. 37 except that the reflection member 26 is used instead of the reflection mirror 24. Thus, the reflection member 26 will be mainly described.

The reflection member 26 used in the light source unit 1H shown in FIG. 39 has a cylindrical surface extending in the Y direction of the porous plate 2A as the reflection surface 26a.

Here, assuming that a length L of the through-hole 21 of the porous plate 2A is 6 mm, a hole diameter D is 0.5 mm, and a distance from an emission opening of the through-hole 21 to the reflection mirror 24 neglected, rays emitted from the through-hole 21 and reflected on the reflection mirror 24 pass through the center of the through-hole 21, and diffuse at a maximum angle of approximately ±4.5° ($\tan^{-1}(0.5/6)$) with respect to rays reflected at an angle of 90° on the reflection mirror 24.

On the other hand, assuming that a curvature radius of the cylindrical surface serving as the reflection curved surface 26a of the reflection member 26 shown in FIG. 39 is 25.4 mm, the reflection member 26 is arranged such that rays that have passed through the center of the through-hole 21 are reflected at an angle of 90° and, when the porous plate 2A having the through-hole 21 with the length L of 6 mm and the hole diameter D of 0.5 mm is used as in the above description, the distance from the emission opening of the through-hole 21 to the reflection member 26 is neglected, rays emitted from the through-hole 21 and reflected on the reflection member 26 pass through the center of the through-holes 21 and diffuse at a maximum angle of approximately ±1.1° ($\tan^{-1}(0.5/25.4)$) with respect to rays reflected at an angle of 90° on the reflection mirror 26. Thus, a degree of diffusion can be reduced to ¼ compared with the above-mentioned case of the reflection mirror 24. That is, of rays that pass through the through-hole 21 of each row of the multistage through-hole rows and diffuse most, rays that enter from the upper end and the lower end of the entrance of the through-hole 21 and are emitted from the lower end and the upper end of the outlet (emission opening), respectively, diffuse most. A reflection angle by the reflection member 26 is approximately 88.9° and 91.1°.

However, in the reflection member 26 shown in FIG. 39, rays that have passed through the through-hole 21 in parallel with the center line of the through-hole 21, which do not diffuse on the reflection mirror 24 shown in FIG. 37, also diffuse at a maximum angle of approximately 11.1°. Thus, an overall degree of diffusion is roughly estimated to be reduced to ½.

Further, rays that diffuse at a maximum angle of approximately ±4.7° ($\tan^{-1}(0.5/6)$) on the reflection mirror 24 shown in FIG. 37 can be theoretically made into rays which are parallel with rays that have passed through the center of the through-hole 21 and reflected at an angle of 90°, by using the reflection member 26 having the reflection curved surface 26a that has a cylindrical surface with a curvature radius of 6 mm. Conversely, as described above, rays that do not diffuse by nature and have passed through in parallel with the central line of the through-hole 21 diffuse at a maximum angle of approximately ±4.7° in the same manner. Thus, it is desirable to set a curvature radius of the reflection curved surface 26a of the reflection member 26 taking into account a degree of diffusion of the entire rays that pass through the through-holes 21.

That is, it is desirable to decide a curvature of the reflection curved surface 26a of the reflection member 26 taking into account a degree of diffusion with respect to all light beams passing through the through-holes 21 and an intensity of the light beams. It is preferable to find the curvature as a profile curve of the reflection curved surface 26a or a quadric curve such as a circle, an ellipse, a parabola, or the like, that is, a quadric surface.

Figure 40:
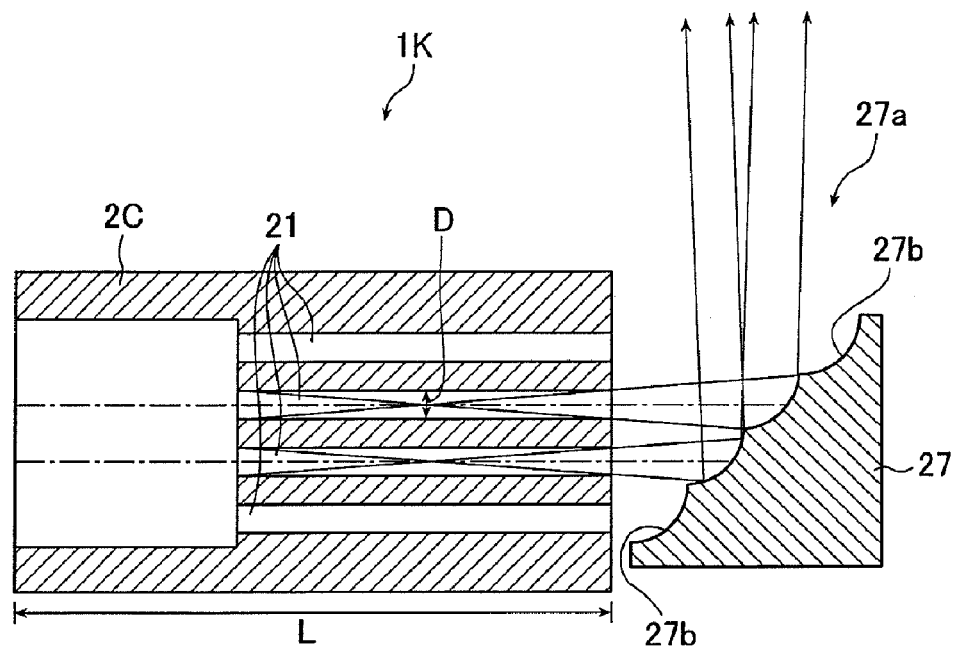
FIG. 40 is a schematic side sectional view of another embodiment of the light source unit used in the image transfer apparatus in accordance with this aspect of the present invention.

In addition, as in a light source unit 1K shown in FIG. 40, in the case in which there are multiple rows (multiple stages) of through-holes 21 (through-hole rows) of a porous plate 2C, it is preferable to have a reflection curved surface 27a in which each sub-reflection curved surface 27b is slightly deviated with respect to each through-hole row of the through-holes 21 of the porous plate 2C to be arranged in multiple stages as in a reflection member 27. For example, the reflection curved surface 27a preferably has the sub-reflection curved surfaces 27b arranged in multiple rows along a line slanted at an angle of approximately 45°.

Note that each of the sub-reflection curved surfaces 27b of the reflection member 27 is provided so as to correspond to a size of the through-hole 21 at each stage of the multistage through-hole rows. However, of rays that pass through the through-holes 21 at each stage and diffuse most, rays that enter from the upper end and the lower end of the entrance of the through-holes 21 and are emitted from the lower end and the upper end of the outlet (emission opening), respectively, (rays slanting upwards and rays slanting downwards) diffuse most. Thus, depending upon a distance between the through-holes 21 of the adjacent two stages, rays that diffuse most enter the sub-reflection curved surfaces 27b provided in association with the through-holes 21 of different stages (adjacent stages), for example, rays passing through the through-holes 21 of the row in the upper stage (rays slanting downwards) and rays passing through the through-holes 21 of the row in the lower stage (rays slanting upwards) may interfere with each other.

In this case, it is preferable to arrange each of the sub-reflection curved surface 27b of the reflection member 27 such that the interference of both the rays becomes as small as possible or a degree of diffusion is averaged in each stage. It goes without saying that it is possible to increase the distance between the through-holes 21 of the adjacent stages to reduce the intereference of both the rays if an amount of light (light intensity) of the linear light source 11a is sufficiently large. However, since an amount of light (light intensity) of a light source that can be used for transfer decreases when the distance between the through-holes 21 of the adjacent stages is increased, it is necessary to take into account transmissivity of the LCD 3, sensitivity of the photosensitive film 4, and the like.

The light source units 1H and 1K shown in FIGS. 39 and 40 can be used instead of the light source unit 1F shown in FIG. 37. That is, the reflection members 26 and 27 that have the reflection curved surfaces 26a and 27a, respectively, can be used instead of the reflection mirror 24.

Again, as shown in FIG. 35, the linear light source 11a, the porous plate 2A and the reflection mirror 24 are contained in the housing 16 and integrated into a unit as the light source unit 1F, moved integrally by the moving mechanism 8 in the X direction in FIG. 35, that is, a direction along one side of the image display surface of the LCD 3 with respect to the LCD 3 and the photosensitive film 4, and scans the image display surface of the LCD 3 to scan and expose the photosensitive film 4.

As in the case of the other aspects of the present invention, the moving mechanism 8 includes the motor 8a arranged on the right end side of the linear light source 11a in FIG. 35, the pulley 8c mounted on the motor 8a, the pulley 8c arranged on the left end side of the linear light source 11a in FIG. 35, and the endless belt 8b that is stretched between the pulleys 8c and to which the end in the Y direction of the housing 16 is attached. Note that it is preferable that, as this moving mechanism 8, two sets comprising the endless belt 8b and the pulleys 8c for stretching the endless belt 8b are mounted on both end sides in the Y direction of the housing 16, respectively, with the two endless belts 8b (only that on one end side is shown) being driven continuously in synchronous with each other.

Note that the moving mechanism 8 used in the present invention is not limited to the above-described system, in which the end portions in the Y direction of the housing 16 are attached to the endless belts 8b, and the endless belts 8b are driven. Any conventionally publicly known moving method may be used as in the case of the other aspects of the present invention.

The moving mechanism 8 in this embodiment is constituted to move relatively to the LCD 3 by moving the light source unit 1F. However, in the present invention, the moving mechanism 8 may be constituted to move the light source unit 1F relatively to the LCD 3 by moving the LCD 3 against the stationary light source unit 1F. In this case, it is necessary to move the photosensitive film 4 integrally with the LCD 3.

In this aspect of the present invention, from the viewpoint of realizing a simple and compact structure of the apparatus, a structure of the apparatus having a moving mechanism for moving the light source unit 1F is preferable.

In addition, in this aspect of the present invention, it is desirable to arrange the porous plate 2A, the reflection mirror 24 and the LCD 3 such that the distance between the porous plate 2A and the LCD 3 formed via the reflection mirror 24 is preferably 0.1 mm to 0.5 mm, and more preferably 0.1 mm to 0.2 mm. This measure is taken for the purpose of preventing a pattern of the through-holes 21 of the porous plate 2A, typified by the columnar porous plate 2A, from appearing in the form of a "shadow" due to diffused light. Note that the above-mentioned distance set here is in a condition under which the above-mentioned "shadow" can be prevented but clarity of the transfer image is not decreased.

In addition, a speed at which the light source unit 1F is moved by the moving mechanism 8 varies according to brightness of the linear light source 11a, a size (diameter or equivalent diameter) or an arrangement pitch of the through-holes 21 of the porous plate 2A, the number of stages of the through-holes 21 and the like. It is preferable to set the speed to several mm to Several hundreds of mm per second. The through-holes 21 are provided in a plurality of stages as shown in FIG. 22C or 22D, whereby an exposure time for exposing the photosensitive film 4 can be shortened, and the light source unit 1F can be moved faster. For example, under a condition of illuminance of 17,600 cd/m$^2$ (measured by a spectroradiometer CS1000 of Minolta Co., Ltd.) with an applied voltage of 7.5 V given to a cold-cathode ray tube with a diameter of 2 mm, in the case of the through-holes 21 of the one stage for which the moving speed has to be 20 to 30 mm/sec, the moving speed can be increased to 150 to 200 mm/sec and the exposure time by scan exposure can be made six to seven times shorter by increasing the number of stages to four as shown in FIG. 22C.

In this way, in the housing 16 in which the linear light source 11a, the porous plate 2A and the reflection mirror 24 are integrated into a unit as the light source unit 1F and incorporated, the linear light source 11a and the porous plate 2A are arranged along the image display surface of the LCD 3, the through-holes 21 of the porous plate 2A are provided in a direction parallel to the image display surface of the LCD 3, and substantially parallel rays that have passed the through-holes 21 are caused to enter in a vertical direction to the image display surface of the LCD 3 using the reflection mirror 24. Thus, it is unnecessary to arrange the lattice 200 which act as a parallel rays generating element, the spacer 201 and the back light 100, superposed in series on the opposite side of the LCD 300 with respect to the photosensitive film 4 as in the apparatus shown in FIG. 43. Therefore, the image transfer apparatus can be made thin and compact.

Figure 41:
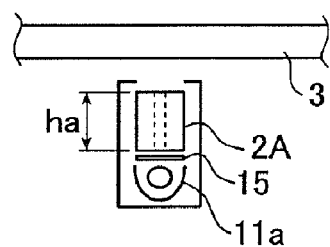
FIG. 41 is a view illustrating a main portion of an image transfer apparatus different from the image transfer apparatus of this aspect of the present invention.

For example, as shown in FIG. 41, in the case of the light source unit 1 L in which the linear light source 11a and the porous plate 2A are vertically placed with respect to the image display surface of the LCD 3 and arranged to be superposed in series, a height ha must be increased in order to generate substantially parallel rays by the porous plate 2A. Thus, since the linear light source 11a and the porous plate 2A are arranged to be superposed in series with respect to the image display surface, the image transfer apparatus becomes thicker so much more for that. For example, when the height ha of the porous plate 2A is assumed to be 6 to 10 mm and the height of the linear light source is assumed to be 2 to 4 mm, the thickness of this part is 8 to 14 mm. On the other hand, as in FIG. 35, the linear light source 11a and the porous plate 2A are arranged sideways along the image display surface of the LCD 3, whereby the thickness of this part is only the height h of the porous plate 2A, for example, 3 mm, and thinning of the image transfer apparatus can be realized.

The parallel rays generating element used in this aspect of the present invention is not limited to the above-mentioned columnar porous plate 2A, and the porous plate 2B as shown in FIG. 21B can be used as the parallel rays generating element. Moreover, in the present invention, it is also possible to use a slitted plate having a slit by which strip-like slit light can be obtained instead of a porous plate. However, since the slitted plate cannot reduce scattering of light in a longitudinal direction thereof as a porous plate can do, the porous plate 2A shown in FIG. 36 and the porous plate 2B shown in FIG. 9 are preferable to the slitted plate. The slitted plate may be used in the case in which a diffusion component of light from the linear light source 11a is little or in the case in which demands for clarity is not high.

Note that, as the moving mechanism 8 of the light source unit excluding the light source units 1F, 1G, 1H and 1K, the LCD 3, the photosensitive film 4, the film pack 5 containing the film case 51 for accommodating the photosensitive film 4, and the main body case 6 for containing these members, the same ones as those in the second to fourth aspects of the present invention can be used.

In such an image transfer apparatus, for example, if the light source unit 1F is used, light of the linear light source 11a is emitted to the porous plate 2A side via a reflection plate and is allowed to enter the through-holes 21 of the porous plate 2A. Since the inner surfaces of the through-holes 21 are constructed as low reflectance surfaces, light irradiated on the inner surfaces is absorbed. Therefore, as the light emitted from the through-holes 21, substantially parallel rays whose diffused light component is regulated according to the length 1 of the porous plate 2A and the diameter or the equivalent diameter of the through-holes 21 are generated in parallel along the image display surface of the LCD 3.

Strip-like substantially parallel rays emitted from the through-holes 21 are caused to enter the reflection mirror 24, reflected in the vertical direction of the image display surface of the LCD 3, and projected on the image display surface of the LCD 3 perpendicularly in a strip-like shape.

On the other hand, the housing 16 in which the linear light source 11a, the porous plate 2A and the reflection mirror 24 are incorporated constitutes the light source unit 1F, which moves in the X direction in FIG. 35 by the moving mechanism 8.

The light source unit 1F first starts its movement from a predetermined movement start position, reaches a predetermined speed, and applies a predetermined voltage to the linear light source 11a to turn it on before reaching an end position of the photosensitive surface of the photosensitive film 4. Thereafter, the light source unit 1F maintains lighting until passing the other end position of the photosensitive film 4, turns it off after passing this end position, and stops in a movement end position. Such a movement of the light source unit 1F is controlled by rotation of a motor for driving the moving mechanism 8. Alternatively, a limit switch is provided in the moving mechanism 8, and the movement is controlled by this limit switch.

The light source unit 1F projects light irradiated from the light source unit 1F while moving on the image display surface of the LCD 3. Since this projected light is made into strip-like substantially parallel rays, strip-like substantially parallel rays carrying information of a display image transmitted through the LCD 3 reach the photosensitive film 4 and expose the photosensitive film 4. In this way, the photosensitive film 4 is scanned and exposed by the substantially parallel rays and the display image of the LCD 3 is transferred thereto.

Note that, when the transfer of the display image of the LCD 3 that the light source unit 1F performs while moving ends, the light source unit 1F promptly returns to the above-mentioned predetermined movement start position in a state in which the linear light source 11a is turned off.

In the above-mentioned embodiment, a display image is transferred to the photosensitive film 4 at the time of movement of the light source unit 1F in one direction from the movement start position to the movement end position. However, a display image may be transferred at the time of movement of the light source unit 1F returning from the movement end position to the movement start position.

As described above, in the light source unit 1F in which the linear light source 11a, the porous plate 2A and the reflection mirror 24 are integrated into a unit and incorporated in the housing 16, the linear light source 11a and the porous plate 2A are arranged in parallel along the image display surface of the LCD 3, the through-holes 21 of the porous plate 2A are pierced and provided in a direction in parallel with the image display surface of the LCD 3, and substantially parallel rays that have passed through the through-holes 21 are caused to enter in a vertical direction of the image display surface of the LCD 3 using the reflection mirror 24. Thus, it is unnecessary to arrange the lattice 200 which act as a parallel rays generating element, the spacer 201 and the back light 100, superposed in series with respect to the LCD 300 as in the apparatus shown in FIG. 43. Therefore, the image transfer apparatus can be made thin and compact.

In addition, the image transfer apparatus of the present invention adopts a system for generating strip-like substantially parallel rays from a linear light source and performing scan exposure using the substantially parallel rays. However, in the case of a surface exposure system for exposing a photosensitive film at one time using planar light source, a porous plate having two-dimensionally arranged through-holes at a predetermined pitch has to be used. For example, in the case in which the above-mentioned "instax mini" is used as a photosensitive film, a porous plate with a size of 46 mm×62 mm has to be used, and approximately 7,000 to 8,000 through-holes have to be provided in this porous plate. Since such a porous plate having an extremely large number of through-holes leads to very high processing costs, reduction in cost of the image transfer apparatus cannot be realized. However, in the image transfer apparatus by scan exposure of the present invention, the number of stages of through-holes (rows) is only one or, even in the case of a plurality of stages, only about four stages at most. Thus, the number of through-holes to be processed is only several hundreds. Therefore, processing costs of a porous plate can be controlled, and a low-cost image transfer apparatus can be realized. Moreover, reduction in weight can be realized. Furthermore, since a linear light source used as a light source for scan exposure can be reduced in size compared with a light source for plarnar exposure, a structure of the apparatus can be made more compact and low power consumption can also be realized.

The image transfer apparatus in accordance with the fifth aspect of the present invention is basically constituted as described above.

The image transfer apparatus in accordance with the present invention has been described in detail with reference to various embodiments and examples of various aspects of the present invention. However, the present invention is not limited to these embodiments and examples, and it goes without saying that various improvements and alterations may be made without departing from the scope of the present invention. For example, a digitally-recorded image (digital image data) used in the present invention may be a digitally-recorded image that is read by a scanner or the like from a transparent original such as a photograph film, e.g., a negative film and a reversal film, or a reflective original such as a photograph. In addition, as a linear light source, or an LCD serving as an image display device, and the like, those with various functions may be used to the practical extent. Further, it is also possible to use a cylindrical lens, or a spherical or semispherical lens instead of the rod lens shown in FIG. 21B.

As describe above in detail, according to the first aspect of the present invention, substantially parallel rays generated using a parallel rays generating element is used as projected light to perform transfer of an image while moving this parallel rays generating element. Thus, a high-definition image with high clarity can be obtained without a shadow due to an arrangement pattern of the parallel rays generating element falling inside a transfer image. Moreover, since the parallel rays generating element moves during exposure, a spacer for setting a distance between the parallel rays generating element and a liquid crystal display to a predetermined range becomes unnecessary, and a thin, compact and lightweight image transfer apparatus can be realized.

As described above in detail, according to the second aspect of the present invention, at least an outermost layer arranged on a side where transmitted light emitted of a liquid crystal display is formed of a homogeneous material and this outermost layer is formed as a flat and smooth surface. Thus, an image transfer apparatus that transfers a highly clear image to a photosensitive recording medium can be realized with a simple structure compared with that in the past.

As described above in detail, according to the third aspect of the present invention, a transparent member having a refractive index larger than one is provided between an image display surface of an image display device, for example, an LCD, and a recording surface of a photosensitive recording medium, for example, a photosensitive film. Thus, it is possible to realize a transfer apparatus that actually allows reduction in size and weight, reduction in power consumption and reduction in costs with a simple structure.

Note that the effect can be further increased by adding the aforementioned additional conditions to the above-mentioned basic structure.

In addition, according to the third aspect of the present invention, various liquid crystal displays ranging from a liquid crystal display of an ordinary pixel density to a liquid crystal display having a high-definition screen of a high pixel density are allowed to be used, a transfer image of desired clarity ranging from a photograph image of clarity at a satisfactory degree from the practical point of view to a high-definition transfer image of high clarity can be obtained.

As described above in detail, according to the fourth aspect of the present invention, at least one prism sheet is provided between a light source and an image display device, for example, an LCD, whereby parallelism and luminance of light caused to enter the image display device are improved. In this way, clarity of an obtained transfer image can be extremely improved with a simple structure. In addition, it is also possible to actually realize reduction in size and weight, reduction of power consumption and reduction in costs. Moreover, a tone of an image can be adjusted. Note that the effect can be further increased by adding the aforementioned additional conditions to the above-mentioned basic structure.

In addition, according to the fourth aspect of the present invention, various liquid crystal displays ranging from a liquid crystal display of an ordinary pixel density to a liquid crystal display having a high-definition screen of a high pixel density are allowed to be used, and a transfer image of desired clarity ranging from a photograph image of clarity at a satisfactory degree from the practical point of view to a high-definition transfer image of high clarity can be obtained.

As described above in detail, according to the fifth aspect of the present invention, a linear light source and a parallel rays generating element are arranged in parallel along an image display surface of an image display device such as an LCD, and substantially parallel rays generated by the parallel rays generating element are caused to enter in a vertical direction with respect to the image display surface by a reflection device. Thus, reduction in size and weight, reduction in power consumption and reduction in costs can be actually realized with a thinned and compact structure of an apparatus compared with a structure of an apparatus that arranges a parallel rays generating element and a light source in series in the past. The apparatus can be made portable as well.

In addition, according to the fifth aspect of the present invention, light is converted into strip-like substantially parallel rays by a parallel rays generating element such as a porous plate. Thus, even in an image display device having a large display screen, it is unnecessary to use a lattice or the like of a large area (large size) that is difficult to manufacture and costly, and costs can be reduced.

Further, according to the fifth aspect of the present invention, strip-like substantially parallel rays are generated by the parallel rays generating element. Therefore, as compared with the case in which a planar light source (back light) which is difficult to emit uniform light from the entire plane is used, this is more advantageous for obtaining light having a more uniform intensity in the longitudinal direction easily. Further, it is possible to use the fluorescent tube itself as the linear light source, so that there is no need to use an expensive planar light source (back light) which necessitates a large number of components such as a light guide plate (member), a reflection sheet, a lens sheet, a prism sheet, and a diffusion sheet, thereby achieving reduction in cost of light source itself.

Furthermore, in the fifth aspect of the present invention, in the case in which a reflection member having a reflection curved surface is used as a reflection device, a degree of diffusion of substantially parallel rays generated by a parallel rays generating element can be suppressed, and a high-definition transfer image with higher clarity can be obtained.

What is claimed is:

1. An image transfer apparatus comprising:
a transmission type image display device for forming a display image on an image display screen thereof by transmitted light that has transmitted through said image display screen;
a light source that is provided on an opposite side of the image display screen of the image display device and irradiates light substantially perpendicularly on said image display screen in order to obtain said transmitted light;
a parallel rays generating element that is provided between said light source and said image display device and makes the light irradiated from said light source into substantially parallel rays; and
a moving device for moving said parallel rays generating element and said image display device relatively while said display image displayed on the image display screen is being transferred onto a photosensitive recording medium by exposing the photosensitive recording medium using said transmitted light that has transmitted through said image display device,
wherein said parallel rays generating element is a porous plate provided with a plurality of through-holes formed in a substantially perpendicular direction with respect to said image display screen of the image display device.

2. The image transfer apparatus according to claim 1, wherein said moving device moves said parallel rays generating element relatively to the image display device along an arrangement direction of said plurality of through-holes during exposure, and a moving distance in the arrangement direction of said parallel rays generating element is shorter than a pitch interval in the arrangement direction.

3. The image transfer apparatus according to claim 1, wherein relative movement of said parallel rays generating element and said image display device by said moving device and exposure of said photosensitive recording medium by said transmitted light in a stationary state of said parallel rays generating element and said image display device are repeatedly performed to transfer said display image of said image display device to the photosensitive recording medium.

4. An image transfer apparatus comprising a light source, a transmission type image display device of a structure for holding a liquid crystal layer by substrates from both sides thereof and a photosensitive recording medium are arranged in series along a direction in which light from said light source advances,
wherein an image display screen of said image display device and a recording surface of said photosensitive recording medium opposed to each other, and a display image that has passed said transmission type image display device is transferred to said recording surface of said photosensitive recording medium, and
wherein a transparent member having a refractive index larger than one, which covers at least said image display screen, is provided and filled between a surface of an outermost layer of said image display device and said recording surface of said photosensitive recording medium, and said first outermost layer of said image display device has said image display screen and is arranged on an exit side of transmitted light of said image display device.

5. The image transfer apparatus according to claim 4, further comprising: a substantially parallel rays generating element that is provided between said light source and said transmission type image display device and makes light from said light source into substantially parallel rays before causing them to enter perpendicularly said image display screen of said image display device.

6. The image transfer apparatus according to claim 4, further comprising: a light linearizing device that makes light from said light source into linear and substantially parallel rays before causing them to enter perpendicularly said image display screen of said image display device and, at the same time, scans relatively said image display screen of the image display device with said linear and substantially parallel rays.

7. The image transfer apparatus according to claim 4, wherein said transparent member is a plate-like member having fixed thickness.

8. An image transfer apparatus comprising:
  a transmission type image display for forming a display image of an image display screen thereof by transmitted light that has transmitted through said image display screen thereof;
  a linear light source for emitting light in parallel with said image display screen of said image display device;
  a parallel rays generating element for making emitted light from said linear light source into substantially parallel rays;
  a reflection device for reflecting said substantially parallel rays from said parallel rays generating element so as to transmit said substantially parallel rays through said image display screen substantially perpendicular thereto; and
  a moving device for moving said linear light source, said parallel rays generating element and said image display device relatively with respect to said image display device and in parallel with said image display screen to scan and expose a photosensitive recording medium,
  wherein said display image of said image display surface is transferred by exposing said photosensitive recording medium using said transmitted light that has transmitted through said image display screen of said image display device,
  wherein said reflection device is a reflection plate that is arranged to be inclined at 45° with respect to said image display screen and has a reflection plane for reflecting the substantially parallel rays from said parallel rays generating element substantially perpendicularly toward said image display screen.

9. An image transfer apparatus comprising:
  a transmission type image display device for forming a display image of an image display screen thereof by transmitted light that has transmitted through said image display screen thereof;
  a linear light source for emitting light in parallel with said image display screen of said image display device;
  a parallel rays generating element for making emitted light from said linear light source into substantially parallel rays;
  a reflection device for reflecting said substantially parallel rays from said parallel rays generating element so as to transmit said substantially parallel rays through said image display screen substantially perpendicular thereto; and
  a moving device for moving said linear light source, said parallel rays generating element and said image display device relatively with respect to said image display device and in parallel with said image display screen to scan and exposed a photosensitive recording medium,
  wherein said display image of said image display surface is transferred by exposing said photosensitive recording medium using said transmitted light that has transmitted through said image display screen of said image display device,
  wherein said reflection device is a reflection member having a reflection curved surface for reflecting said substantially parallel rays from said parallel rays generating element substantially perpendicularly toward said image display screen, and
  wherein said reflection curved surface is a quadratic curved surface or a curved surface having a predetermined curvature.

* * * * *